(12) United States Patent
Imbrecht et al.

(10) Patent No.: US 10,287,054 B2
(45) Date of Patent: May 14, 2019

(54) LOAD BEARING STRUCTURE

(71) Applicant: Airdex Corporation, Henderson, NV (US)

(72) Inventors: Rick Imbrecht, Henderson, NV (US); Chi Kong Lin, Las Vegas, NV (US)

(73) Assignee: Airdex Corporation, Henderson, NV (US)

( * ) Notice: Subject to any disclaimer, the term of this patent is extended or adjusted under 35 U.S.C. 154(b) by 234 days.

(21) Appl. No.: 15/321,179

(22) PCT Filed: Jun. 24, 2015

(86) PCT No.: PCT/US2015/037535
§ 371 (c)(1),
(2) Date: Dec. 21, 2016

(87) PCT Pub. No.: WO2015/200549
PCT Pub. Date: Dec. 30, 2015

(65) Prior Publication Data
US 2017/0197752 A1    Jul. 13, 2017

Related U.S. Application Data

(60) Provisional application No. 62/017,079, filed on Jun. 25, 2014.

(51) Int. Cl.
*B29C 63/04*    (2006.01)
*B29C 65/00*    (2006.01)
(Continued)

(52) U.S. Cl.
CPC ......... *B65D 19/18* (2013.01); *B65D 19/0018* (2013.01); *B65D 19/0026* (2013.01);
(Continued)

(58) Field of Classification Search
CPC .......... B65D 19/18; B65D 2519/00034; B65D 2519/00044; B29C 63/04; B29C 65/02; B29C 65/08
See application file for complete search history.

(56) References Cited

U.S. PATENT DOCUMENTS 2,676,703 A    4/1954    Charman
2,893,588 A    7/1959    Martin
(Continued)

FOREIGN PATENT DOCUMENTS

CH          404185 A       6/1966
DE          2045712 A1     3/1972
(Continued)

OTHER PUBLICATIONS

Supplemental European Search Report for EP 07 75 7079.
(Continued)

*Primary Examiner* — Daniel J Rohrhoff
(74) *Attorney, Agent, or Firm* — Quan & Associates; Nancy Quan; Christopher Quan

(57) ABSTRACT

The present invention provides a movable load bearing structure with a surface that includes antimicrobial agents capable of eliminating, preventing, retarding or minimizing the growth of microbes and also minimizing cross-contamination when the load bearing structure is being reused for cargos that differ from a previously transported cargo, for example, different food types, such as poultry, fresh vegetables, and fresh fruit. The load bearing structure may be a dunnage platform or a container for storing and/or shipping cargo.

20 Claims, 25 Drawing Sheets

(51) Int. Cl.
  *B29C 65/02* (2006.01)
  *B29C 65/08* (2006.01)
  *B29C 65/48* (2006.01)
  *B29C 65/50* (2006.01)
  *B29C 65/54* (2006.01)
  *B29L 31/00* (2006.01)
  *B65D 19/00* (2006.01)
  *B65D 19/18* (2006.01)
  *B65D 19/44* (2006.01)

(52) U.S. Cl.
  CPC .............. *B65D 19/44* (2013.01); *B29C 63/04* (2013.01); *B29C 65/02* (2013.01); *B29C 65/08* (2013.01); *B29C 65/48* (2013.01); *B29C 65/5042* (2013.01); *B29C 65/5057* (2013.01); *B29C 65/542* (2013.01); *B29C 66/0382* (2013.01); *B29C 66/0384* (2013.01); *B29C 66/112* (2013.01); *B29C 66/1122* (2013.01); *B29C 66/1142* (2013.01); *B29C 66/135* (2013.01); *B29C 66/43* (2013.01); *B29C 66/5326* (2013.01); *B29C 66/836* (2013.01); *B29L 2031/7178* (2013.01); *B65D 2519/00034* (2013.01); *B65D 2519/00044* (2013.01); *B65D 2519/00059* (2013.01); *B65D 2519/00064* (2013.01); *B65D 2519/00069* (2013.01); *B65D 2519/0082* (2013.01); *B65D 2519/00129* (2013.01); *B65D 2519/00134* (2013.01); *B65D 2519/00139* (2013.01); *B65D 2519/00174* (2013.01); *B65D 2519/00208* (2013.01); *B65D 2519/00268* (2013.01); *B65D 2519/00273* (2013.01); *B65D 2519/00288* (2013.01); *B65D 2519/00318* (2013.01); *B65D 2519/00323* (2013.01); *B65D 2519/00333* (2013.01); *B65D 2519/00338* (2013.01); *B65D 2519/00437* (2013.01); *B65D 2519/00467* (2013.01); *B65D 2519/00502* (2013.01); *B65D 2519/00562* (2013.01); *B65D 2519/00587* (2013.01); *B65D 2519/00611* (2013.01); *B65D 2519/00641* (2013.01); *B65D 2519/00661* (2013.01); *B65D 2519/00711* (2013.01); *B65D 2519/00805* (2013.01); *B65D 2519/00815* (2013.01); *B65D 2571/00111* (2013.01)

(56) References Cited

U.S. PATENT DOCUMENTS

| | | |
|---|---|---|
| 3,088,619 A | 5/1963 | Boucher |
| 3,266,656 A | 8/1966 | Kridle |
| 3,424,364 A | 1/1969 | Grafslund |
| 3,511,191 A | 5/1970 | Barry |
| 3,581,681 A | 6/1971 | Newton |
| 3,654,012 A | 4/1972 | Schlager |
| 3,903,023 A | 9/1975 | Boutillier |
| 3,915,089 A | 10/1975 | Schubert |
| 4,010,865 A | 3/1977 | Wilgus |
| 4,244,411 A | 1/1981 | Karlström |
| 4,397,246 A | 8/1983 | Ishida |
| 4,627,539 A | 12/1986 | Chang |
| 4,661,302 A | 4/1987 | Park |
| 4,705,811 A | 11/1987 | Park |
| 4,719,028 A | 1/1988 | James |
| 4,734,441 A | 3/1988 | Park |
| 4,796,540 A | 1/1989 | Pelfrey |
| 5,026,321 A | 6/1991 | Benson |
| 5,098,498 A | 3/1992 | Hale |
| 5,156,094 A | 10/1992 | Johansson |
| 5,238,733 A | 8/1993 | Joseph |
| 5,266,396 A | 11/1993 | Howard |
| 5,362,436 A | 11/1994 | Wagner |
| 5,369,135 A | 11/1994 | Campbell |
| 5,401,456 A | 3/1995 | Alesi |
| 5,417,167 A | 5/1995 | Sadr |
| 5,447,783 A | 9/1995 | Horn |
| 5,482,765 A | 1/1996 | Bradley |
| 5,492,504 A | 2/1996 | Wolters |
| 5,525,636 A | 6/1996 | Henn |
| 5,544,568 A | 8/1996 | Potgieter |
| 5,555,980 A | 9/1996 | Johnston |
| 5,558,241 A | 9/1996 | Huffstutler |
| 5,598,675 A | 2/1997 | Pruss |
| 5,601,202 A | 2/1997 | Meacham |
| 5,601,912 A | 2/1997 | Ellingson |
| 5,685,644 A | 11/1997 | Taylor |
| 5,711,444 A | 1/1998 | Meacham |
| 5,829,595 A | 11/1998 | Brown |
| 5,833,796 A | 11/1998 | Matich |
| 5,868,080 A | 2/1999 | Wyler |
| 5,882,667 A | 3/1999 | Jones |
| 6,019,237 A | 2/2000 | Durham |
| 6,021,916 A | 2/2000 | Stolzman |
| 6,029,583 A | 2/2000 | LeTrudet |
| 6,030,158 A | 2/2000 | Tatina |
| 6,076,693 A | 6/2000 | Reiter |
| 6,123,032 A | 9/2000 | Ohanesian |
| 6,191,228 B1 | 2/2001 | Nosker |
| 6,216,608 B1 | 4/2001 | Woods |
| 6,224,706 B1 | 5/2001 | Matich |
| 6,294,114 B1 | 9/2001 | Muirhead |
| 6,326,408 B1 | 12/2001 | Jura |
| 6,380,294 B1 | 4/2002 | Babinec |
| 6,395,791 B1 | 5/2002 | Chaudhary |
| 6,431,372 B1 | 8/2002 | Aoyama |
| 6,432,547 B1 | 8/2002 | Kroll |
| 6,446,563 B1 | 9/2002 | Ohanesian |
| 6,458,232 B1 | 10/2002 | Valentinsson |
| 6,467,625 B2 | 10/2002 | Baker |
| RE38,076 E | 4/2003 | Brennan |
| 6,622,642 B2 | 9/2003 | Ohanesian |
| 6,659,020 B1 | 12/2003 | Ball |
| 6,718,888 B2 | 4/2004 | Muirhead |
| 6,745,703 B2 | 6/2004 | Torrey |
| 6,748,876 B2 | 6/2004 | Preisler |
| 6,786,992 B2 | 9/2004 | Dummett |
| 6,824,860 B2 | 11/2004 | Edwards |
| 6,899,347 B2 | 5/2005 | Neal |
| 6,941,877 B2 | 9/2005 | Dickner |
| 6,943,678 B2 | 9/2005 | Muirhead |
| 6,955,129 B2 | 10/2005 | Moore |
| 6,976,436 B1 | 12/2005 | Sugihara |
| 6,984,695 B2 | 1/2006 | Brown |
| 7,025,208 B2 | 4/2006 | Baker |
| D521,208 S | 5/2006 | France |
| 7,044,066 B1 | 5/2006 | Miller |
| 7,121,457 B2 | 10/2006 | Michal, III |
| 7,128,797 B2 | 10/2006 | Dummett |
| 7,259,678 B2 | 8/2007 | Brown |
| 7,273,172 B2 | 9/2007 | Olsen, III |
| 7,308,857 B2 | 12/2007 | Moore |
| 7,311,216 B2 | 12/2007 | Donnelly |
| 7,342,496 B2 | 3/2008 | Muirhead |
| 7,413,698 B2 | 8/2008 | Bearse |
| 7,544,262 B2 | 6/2009 | Dummett |
| 7,602,288 B2 | 10/2009 | Broussard |
| 7,611,596 B2 | 11/2009 | Dummett |
| 7,689,481 B2 | 3/2010 | Seagle |
| 7,699,826 B2 | 4/2010 | Werenicz |
| 7,752,980 B2 | 7/2010 | Muirhead |
| 7,789,024 B2 | 9/2010 | Muirhead |
| 7,804,400 B2 | 9/2010 | Muirhead |
| 7,908,978 B1 | 3/2011 | Pelton |
| 7,910,649 B2 | 3/2011 | Ganapathiappan |
| 7,923,087 B2 | 4/2011 | Dummett |
| 7,927,677 B2 | 4/2011 | Dummett |
| 7,948,371 B2 | 5/2011 | Muirhead |
| 7,963,397 B2 | 6/2011 | Seagle |
| 8,215,518 B2 | 7/2012 | Hyde |
| 8,215,835 B2 | 7/2012 | Hyde |

(56) References Cited

U.S. PATENT DOCUMENTS

| | | | |
|---|---|---|---|
| 8,221,668 B2 * | 7/2012 | DiNello | B29C 41/18 264/279 |
| 8,224,602 B2 | 7/2012 | Lory | |
| 8,224,719 B2 | 7/2012 | Seagle | |
| 8,224,721 B2 | 7/2012 | Seagle | |
| 2002/0015811 A1 | 2/2002 | Gusavage | |
| 2002/0097282 A1 | 7/2002 | Maltseff | |
| 2002/0097283 A1 | 7/2002 | Askren | |
| 2002/0125090 A1 | 9/2002 | Mercado | |
| 2005/0108988 A1 | 5/2005 | Dickner | |
| 2005/0274296 A1 | 12/2005 | Dickner | |
| 2007/0115125 A1 | 5/2007 | Lyon | |
| 2007/0137531 A1 | 6/2007 | Muirhead | |
| 2009/0120823 A1 | 5/2009 | Seagle | |
| 2009/0242552 A1 | 10/2009 | Myers | |
| 2013/0014676 A1 * | 1/2013 | Imbrecht | B65D 19/18 108/57.25 |

FOREIGN PATENT DOCUMENTS

| | | |
|---|---|---|
| DE | 8429708 U1 | 7/1985 |
| DE | 102005051570 A1 | 4/2007 |
| EP | 0422542 A2 | 4/1991 |
| EP | 0480451 A1 | 4/1992 |
| EP | 0520508 A1 | 12/1992 |
| EP | 1500599 A1 | 1/2005 |
| EP | 1516823 A1 | 3/2005 |
| FR | 2697801 A1 | 5/1994 |
| GB | 1308036 A | 2/1973 |
| GB | 2375096 A | 11/2002 |
| WO | WO9523682 A1 | 9/1995 |
| WO | WO0238471 A2 | 5/2002 |
| WO | WO03099668 A1 | 12/2003 |
| WO | WO03099676 A1 | 12/2003 |
| WO | WO03099689 A1 | 12/2003 |
| WO | WO2004026713 A1 | 4/2004 |
| WO | WO2004041516 A1 | 5/2004 |
| WO | WO2005016643 A1 | 2/2005 |
| WO | WO2005105590 A1 | 11/2005 |
| WO | WO2005105599 A1 | 11/2005 |
| WO | WO2006104622 A2 | 10/2006 |
| WO | WO2009023645 A1 | 2/2009 |
| WO | WO2010151106 A1 | 12/2010 |

OTHER PUBLICATIONS

Supplemental European Search Report for EP 07 76 3073.
Kempfer, L., "Lighten the Load," Material Handling Management, pp. 26-31 (Aug. 2006).

* cited by examiner

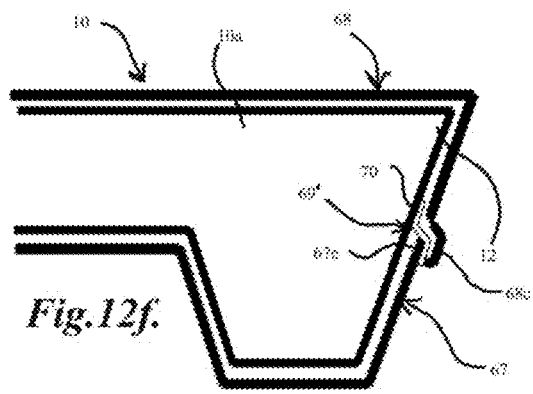
Fig.12f.
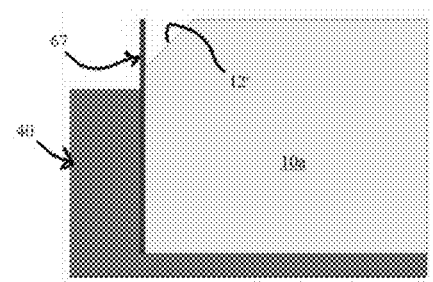
Fig.12h.
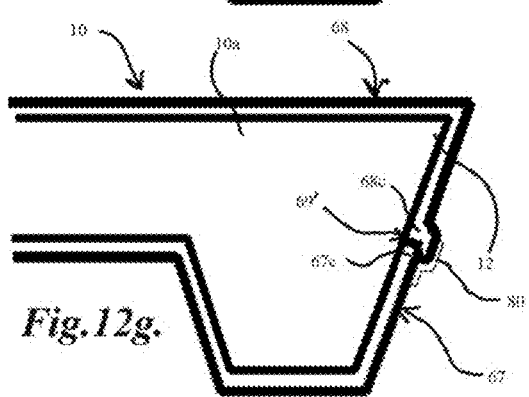
Fig.12g.
Fig.12f-1.
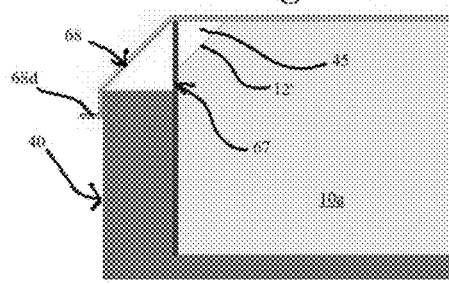
Fig.12i.
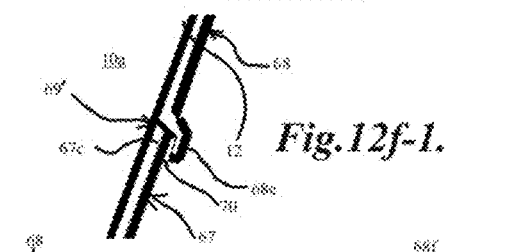
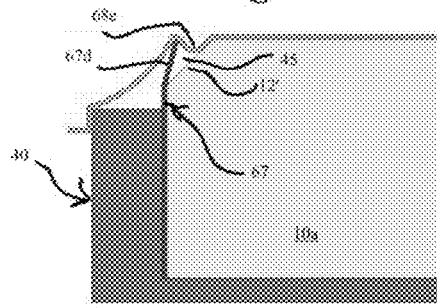
Fig.12j.
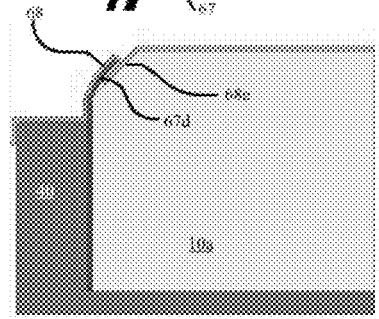
Fig.12k.
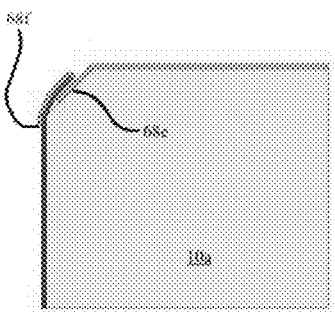
Fig.12l.
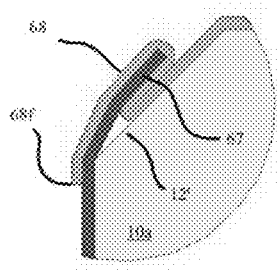
Fig.12m.

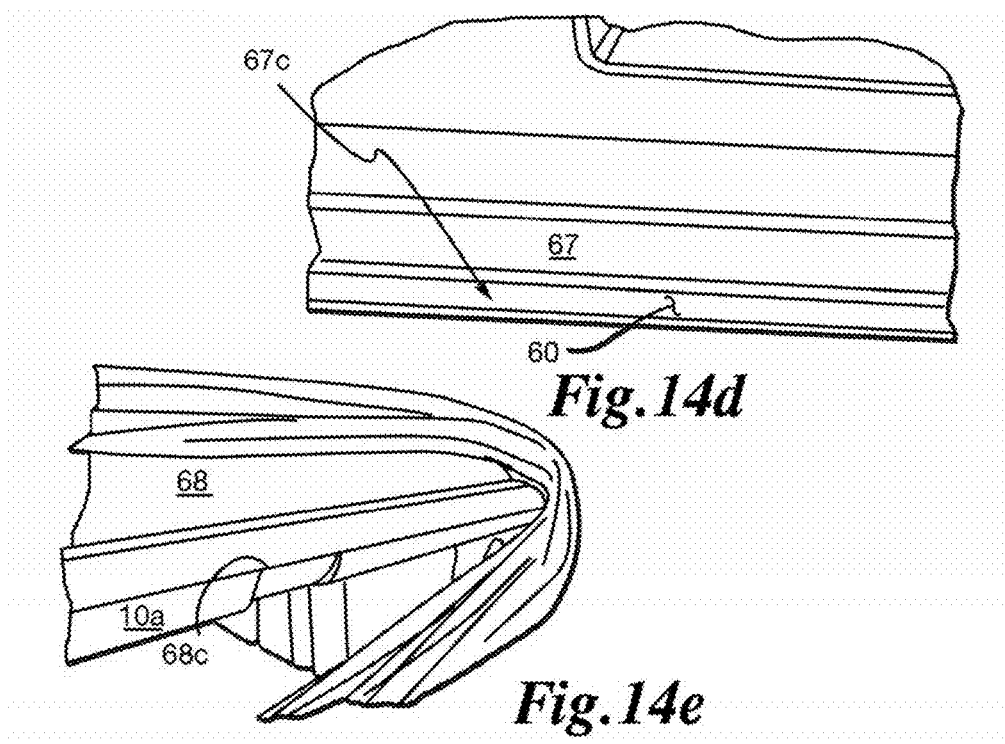

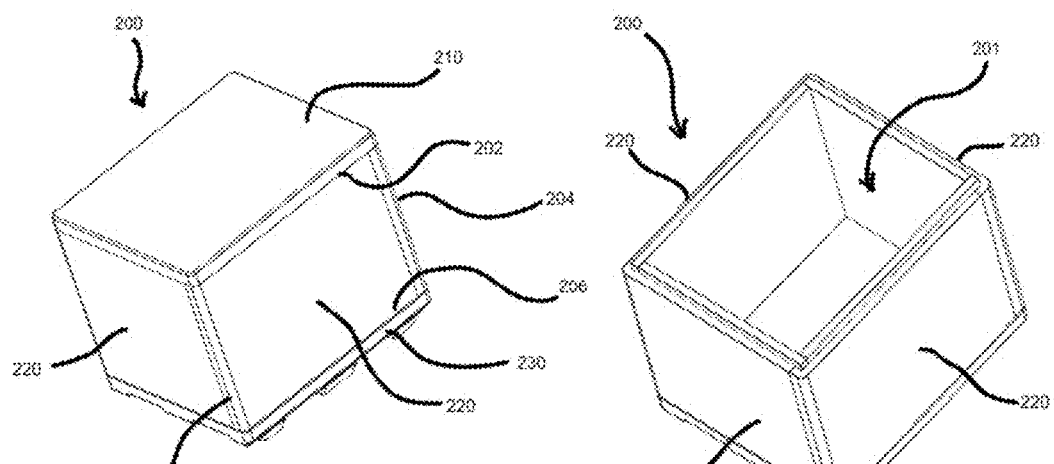
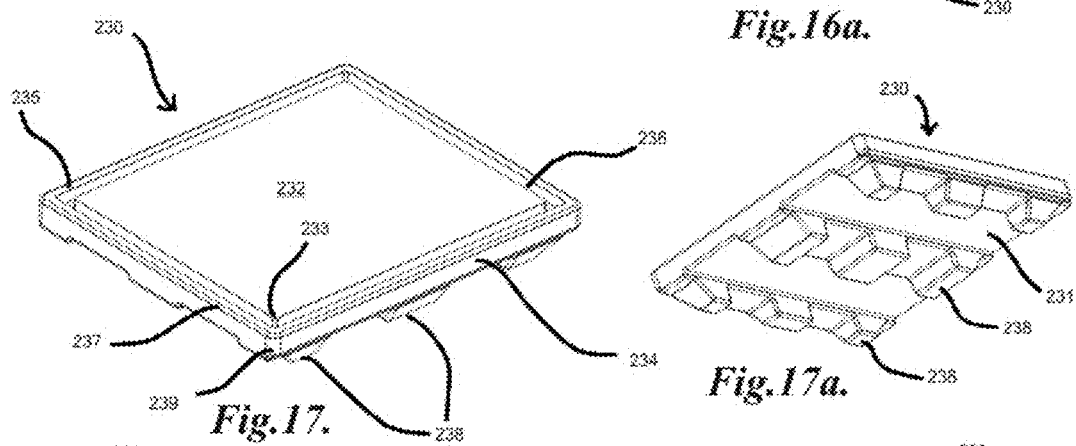
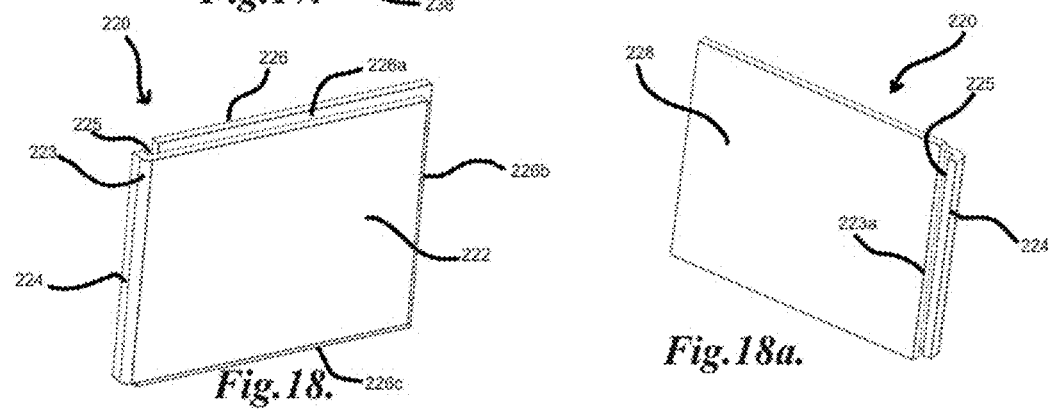

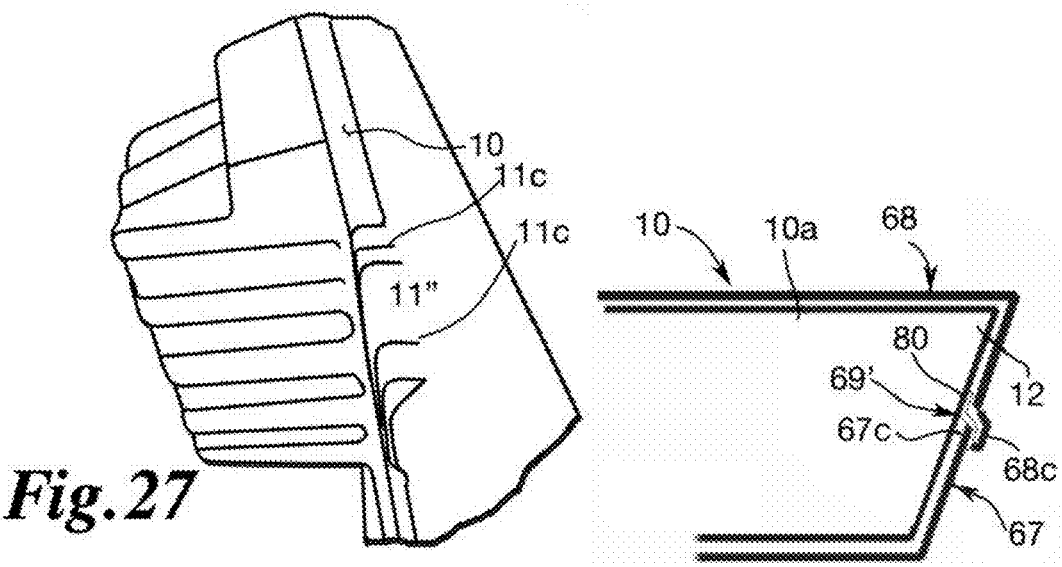
Fig. 27
Fig. 15f
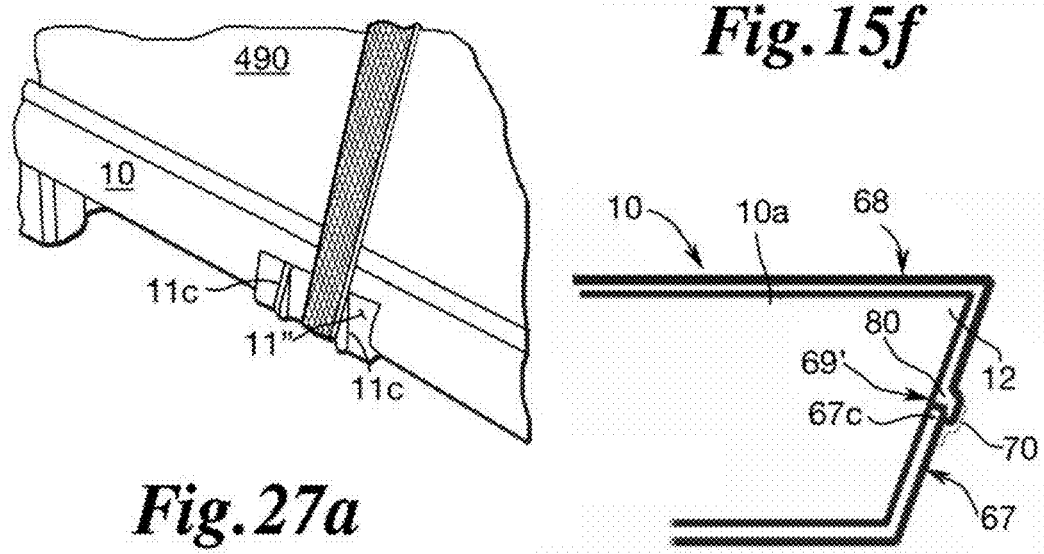
Fig. 27a
Fig. 15g
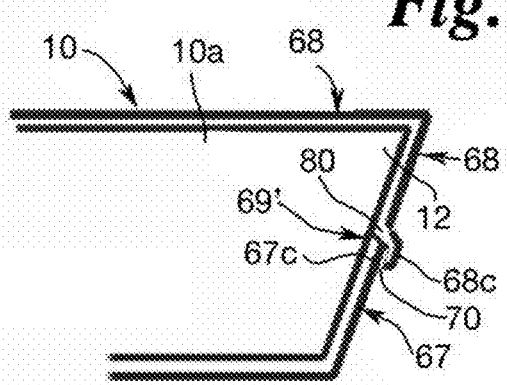
Fig. 15h

LOAD BEARING STRUCTURE

CROSS-REFERENCE TO RELATED APPLICATIONS

This is a U.S. national stage application of a PCT international application Ser. No. PCT/US15/37535, filed Jun. 24, 2015, entitled "LOAD BEARING STRUCTURE", which claims the priority and benefit of U.S. provisional patent application Ser. No. 62/017,079, filed Jun. 25, 2014, entitled "A LOAD BEARING STRUCTURE", the contents of such applications are hereby incorporated by reference in their entireties.

FIELD OF THE INVENTION

This invention is in the general field of load-bearing structure and, more particularly, a load bearing structure for loading, storing and/or transporting goods.

BACKGROUND OF THE INVENTION

A shipping pallet is a well known load-bearing, moveable platform whereon articles are placed for shipment. The pallet usually is loaded with a multiplicity of items, such as cartons or boxes. The loaded pallet is movable with either a pallet truck or a forklift.

The adoption of International Standardized Phytosanitary Monitoring (ISPM)-15 for wood packaging material (WPM) requires kiln dry treatment of all wood used in shipping crates and dunnage platforms (pallets). The United States in cooperation with Mexico and Canada began enforcement of the ISPM 15 standard on Sep. 16, 2005. The North American Plant Protection Organization (NAPPO) strategy for enhanced enforcement will be conducted in three phases. Phase 1, Sep. 16, 2005 through Jan. 31, 2006, call for the implementation of an informed compliance via account managers and notices posted in connection with cargo that contains noncompliant WPM. Phase 2, Feb. 1, 2006 through Jul. 4, 2006, calls for rejection of violative crates and pallets through re-exportation from North America. Informed compliance via account managers and notices posted in cargo with other types of non-compliant WPM continues to remain enforce. Phase 3, Jul. 5, 2006, involves full enforcement on all articles of regulated WPM entering North America. Non-compliant regulated WPM will not be allowed to enter the United States. The adoption of ISPM-15 reflects the growing concern among nations about wood shipping products enabling the importation of wood-boring insects, including the Asian Long horned Beetle, the Asian Cerambycid Beetle, the Pine Wood Nematode, the Pine Wilt Nematode and the Anoplophora Glapripwnnis.

Thus the wooden dunnage platform has become unattractive for the international shipment of products. Further, the wooden surface is not sanitary since it potentially can harbor in addition to insects, mould and bacteria. Thus, the wooden crate is generally ill-suited for the shipment of foodstuffs and other produce requiring sanitary conditions. In addition, with the concern for carbon emission, lighter weight platforms and containers are more desirable.

Plastic dunnage platforms or pallets are known, see U.S. Pat. No. 3,915,089 to Nania, and U.S. Pat. No. 6,216,608 to Woods et al., which are herein incorporated by reference in their entirety. Thermoplastic molded dunnage platforms are known, see for example U.S. Pat. Nos. 6,786,992, 7,128, 797, 7,927,677, 7,611,596, 7,923,087, 8,142,589, 8,163,363 and 7,544,262, to Dummett, which is herein incorporated by reference in its entirety, discloses applying thermoplastic sheets to a preformed rigid structure for manufacturing dunnage platforms.

While the plastic surface of the plastic pallet obviates some of the sanitary problems encountered with wood pallets, because of the required repetitive use, the surface can become unsanitary. Thus, when used for the shipment of foodstuffs, drugs, pharmaceuticals, electronic parts and other products requiring sanitary conditions, the plastic pallet may require that the plastic surface be cleaned and kept clean prior to use. Also, for most pallets, any bonding imperfections, either between the thermoplastic cover and the core, or the thermoplastic cover and thermoplastic cover, may lead to places where moisture, dirt, left over products, and microbes that thrive on either moisture, dirt or left over products may hide, grow and/or accumulate. These areas are usually hidden and are also more difficult to dry or clean than exposed surfaces.

SUMMARY OF THE INVENTION

The present invention relates to a load bearing structure having a top side and a bottom side with a width having a thickness therebetween joining the top side and the bottom side. The load bearing structure may or may not include a plurality of supports, and if present, they extend from the bottom side of the load bearing structure. The load bearing structure may be constructed of a light weight polymeric core covered by or combined with one or more polymeric sheets or film with the edges of the sheets being adhered to either the polymeric core or to another polymeric sheet by a sealing feature including those formed, for example, using a sealing liquid, a chemical sealing composition, a sealing tape or by mechanical and/or heat sealing, which may include, for example, by ultrasonic sealing device. The sealing by the sealing feature is at the, for example, peripheral of the outer edges of the polymeric sheet or sheets. For example, about 4 millimeters to about 12 millimeters from the edge, more for example, about 5 millimeters to about 10 millimeters from the edge, and more for example, about 5 millimeters to about 8 millimeters from the edge, of a polymeric sheet is sealed with the sealing feature. The rest of the bonded area of the polymeric sheet including the outer edges is substantially bonded with heat and/or pressure in the manufacturing process of the load bearing structure.

The shape of the core determines the shape of the load bearing structure. The core may include a top side and a bottom side with a width having a thickness therebetween joining the top and bottom side, and in some instances, may or may not include a plurality of extensions extending from the bottom side of the core. If the plurality of extensions are present, they form the supports of the load bearing structure. The bottom side and the extensions, if present, may be covered or combined with a polymeric sheet or film, with the sheet or film extending to envelope the bottom side, the extensions, if present, and either the entire thickness of the width and at least a portion of the top, if only one polymeric sheet or film is used, or one sheet or film may extend to cover one side and at least a portion of the thickness of the width while the second sheet or film may cover the rest of the exposed surfaces, if two polymeric sheets or film are used to cover the top side, the entire thickness of the width, and the bottom side and may include some overlap of the sheets about the width. The polymeric sheet or sheets are bonded to the core to a substantial extent or if one polymeric sheet is used, substantially almost all of the sheet is bonded to the core. The bonding may be achieved by heat and/or pressure.

When the core is covered by one polymeric sheet, the sheet covers the bottom, the entire thickness of the width and at least a portion of the top side, the outer edge portions of the polymeric sheet on the top side of the core may be firmly sealed to a portion of the top surface of the core by use of a sealing tape, a sealing chemical composition, a sealing liquid, or a mechanical and/or heat seal, and may include, for example, an ultrasonic sealing device. The sealing tape, sealing liquid, sealing chemical composition, or mechanical and/or heat sealing device may be used to aid in sealing the edge portion to the top side of the core, though it may also aid in sealing, but not necessarily, the rest of the sheet to the bottom of the core, the extensions if present, the entire thickness of the width and part of the top surface of the core.

When the core is covered by two polymeric sheets, the bottom sheet covers the bottom side of the core, the extensions if present, and at least a portion of the thickness of the width of the core, while the top sheet covers the top side of the core, and at least a portion of the thickness of the width, creating a small overlapping of the bottom sheet and the top sheet about the width of the core, if desired. At least a portion of the overlap portions of the first sheet and the second sheet, for example, at least a portion of the overlapping portions near the edges of the sheet or sheets, may be firmly sealed together by a sealing feature, for example, by the use of a sealing tape, a sealing solvent, a sealing chemical composition or a mechanical and/or heat seal, and may include, for example, an ultrasonic sealing device. The sealing tape, sealing liquid, a sealing chemical composition or a mechanical and/or heat seal, and may include, for example, with an ultrasonic sealing device, is used for aiding in sealing the edges of the overlapping portions of the first and second sheet, and may also aid in sealing, though not necessarily, the rest of the first and second sheets to the core and to each other.

The edges of the sheet or film may be the outer edges of the sheet or film, or a folded edge when some edge folding is present.

The polymeric sheet or film may be made from any film forming material that may impart strength to the core material, for example, any thermoplastic material including but not limited to high impact polystyrene; polyolefins such as polypropylene, low density polyethylene, high density polyethylene, polyethylene, polybutylene; polycarbonate; acrylonitrile butadiene styrene; polyacrylonitrile; polyphenylene ether; polyphony ether alloyed with high impact polystyrene (HIPS); polyester such as PET (polyethylene terephthalate), APET, and PETG; lead free PVC; copolymer polyester/polycarbonate; copolymers of any of the above mentioned polymers; or a composite HIPS structure.

In general, the edges of the load bearing structure may include a polymeric core covered by a polymeric sheet or film, as described above. In some embodiments, additional features may be present intermittently or continuously around some of the edges. The features may include edge protectors, as described below. The edge protectors may be present on the core or on the polymeric sheet. When present on the core, the polymeric sheet or sheets may or may not be combined or bonded to the edge protectors. If the edge protectors are not combined or bonded to the polymeric sheet or sheets, the outer edges of the sheet may be bonded to the edge protector by the sealing feature. the edge protectors are combined or bonded to the polymeric sheet or sheets, the outer edges of the sheet may also be bonded to the edge protector by the sealing feature.

In these embodiments, the load bearing structure may be reinforced with some edge protectors. These may be desired when cargo loaded on the structure may be held down with cargo-holding items, for example, using straps, tiedowns, cables, ropes and/or other items to aid in holding the cargo in place to minimize movement, particularly during transport. The bottom edge and portion of the width close to the bottom edge of the load bearing structure generally bear substantially the full force of the, for example, straps, when used. In one embodiment, the protectors may be present intermittently at predetermined position on the load bearing structure where reinforcement may be needed. Straps may be used at these same predetermined locations to help keep the cargo in place to minimize movement. In another embodiment, the edge protectors may be present continuously around the edges of the structure. In a further embodiment, protectors may be present both at the bottom and upper edges, either continuously or intermittently. According to one embodiment, the edge protectors may have an L-shaped cross-section and may be present either intermittently or continuously around at least a portion of the bottom and portions of the width of the core in a fashion that they envelope a portion of the bottom side near the outer edge to wrap around the edge and extending to cover a portion of the width close to the bottom side. According to another embodiment, the edge protectors may have a substantially C-shaped cross-section with square edges and may be present either intermittently or continuously around a portion of the bottom, width and top of the core in a fashion that they envelope a portion of the bottom side near the outer edge to wrap around the edge and extending to cover the width and a portion of the top side close to the width. According to a further embodiment, the edge protectors comes in pairs each having a substantially L-shaped cross-section, and may be present either intermittently or continuously around a portion of the bottom, width and top of the core in a fashion that one of the pair envelopes a portion of the bottom side near the outer edge to wrap around a portion of the edge and at least a portion of the width close to the bottom side; and the other of the pair extending to cover a portion of the width near the top side and a portion of the top side close to the width.

In one embodiment, the edge protector may be present on the core prior to the covering of the core by the polymeric sheet. In one aspect, the core may be indented to accommodate the one or more protectors so that the one or more protectors are flushed with the rest of the core so that the sheet may cover the core with the one or more protectors as if the protectors are not present. In another aspect, the core may be indented but not sufficiently to accommodate the entire thickness of the one or more protectors so that after covering with the sheet, there may be a slight bulge where the protectors are present. The slight bulge may serve as an indicator or how to locate the holding devices. In another embodiment, the protectors may be added after the core is covered with the polymeric sheet or sheets and may be flushed with the rest of the load bearing structure or protruding to form a slight bulge.

When the protectors are added prior to covering of the core by the polymeric sheet, the core may be indented, as mentioned above, and the protector may not be easily discernible after covering the core with the polymeric sheet. In instances like these, some guiding features may be present on the load bearing structure for better positioning of the holding features such as straps used in securing the cargo.

The guiding features may include marking, slight bumps, protrusion or ridges for better defining the location for the straps.

The protectors may be constructed from any polymeric or metallic materials, or combinations thereof, that may be easily molded or cast into the desired shape and are rigid, substantially rigid, or possess sufficient reinforcement for the edges. In one embodiment, when the protectors are present on the core prior to the covering of the core by the polymeric sheet or sheets, the protectors may be made of same or material having similar bonding properties as the sheet to facilitate the bonding of the protector both to the sheet and/or core at the bonding temperature of the sheet to the core. However, as noted above, the protectors made of any other material may still be bonded to the outer edges of the sheet using the sealing feature. In another embodiment, when the protectors are added to the load bearing structure after bonding of the sheet or sheets to the core, any material may be used for the protectors.

To aid to keep the protectors on the core prior to bonding and during the bonding process, a tacky material, for example, an adhesive or double-coated adhesive tape may be used. Examples of the adhesive may include pressure sensitive adhesive, for example, a hot melt pressure sensitive adhesive or a non-hot melt pressure sensitive adhesive. Examples of double-coated tape may include double coated pressure sensitive adhesive tape, for example, a double-coated hot melt pressure sensitive tape or a double-coated non-hot melt pressure sensitive tape. The thickness of the adhesive or tape may be thin so that it does not contribute to the thickness of the edge protectors substantially. In some embodiments, the adhesive or tape may be substantially melted during the bonding process.

To keep the edge protectors firmly in place when the protectors are present after the bonding process, a structure adhesive may be used, such as those used in edge sealing described above or later, so that the edge protectors do not detach or move about during and after strapping to keep the cargo in place.

The protectors may have any thickness, as long as they provide the needed reinforcement for the edges. Some materials possess higher rigidity than others and therefore thinner protectors may have sufficient rigidity. For those that are more flexible, thicker components may be needed to provide sufficient rigidity or strength to withstand the force of any cargo holding means such as straps.

The edge protectors may be manufactured by molding or casting. In one embodiment, the edge protectors may be made in bulk and then cut to size. In another embodiment, the edge protectors may be individually made to size or sizes.

Whether the load bearing structure is made with or without edge protectors, edge sealing as described above may be used, as noted before.

The bonding between the core and the polymeric sheet or sheets may be accomplished with heat or heat and pressure, as noted above. In some embodiments, the bonding between the core and the thermoplastic sheet, and between the polymeric sheets generally includes portions of the core proximal to its surface to be sufficiently combined with portions proximal to the surface of the polymeric sheet, or portions of one polymeric sheet proximal to its surface to be sufficiently combined with portions of the second polymeric sheet proximal to its surface, so that any attempts at separating the two components may generally not result in a clean separation of the components, but may result in some cohesive failure near the interface. The bonding process for producing this usually occurs at a relatively high temperature, for example, a temperature sufficient to soften the polymeric material. This temperature is also dependent on the type of polymer used in producing the sheet or sheets.

When the polymeric core is covered with one polymeric sheet, the edges of the polymeric sheet are bonded to the surface of the core with heat or heat and pressure. When the core is covered with two polymeric films and the edges of the two films overlapped with one another, the edges of one sheet may be bonded to the second sheet with heat or heat and pressure. Though the bonding process bonds the sheet to the core or sheet to sheet thoroughly, it may be difficult to bond the edges so perfectly that no adhesive or cohesive failure may manifest at the interface due to, for example, some imperfection in the bonding. Also, any such failure may generally manifest more at the edges which may also due to repeat catching of the edges.

When the polymeric core is covered with one polymeric sheet or film, any unbounded portions of the film may be trimmed after the bonding process. When the core is covered with two polymeric films and the edges of the two films overlapped with one another, any unbounded portions of the second film may be trimmed and removed. However, the trimming process in general may not be sufficiently efficient to completely trim off the unbounded wanted portions. Some portions of the unbonded edges may be left on the load bearing structure. For example, for the two polymeric films to be bonded at the edge, part of the edge that is not firmly bonded may be trimmed as close to the bond line as possible, but may not be possible to trim all the unbound portions without excessive cost or care. For the bonding of one film to the core, it is equally difficult to trim the unbound portions. Also, though there is strong bonding between either the core and the polymeric film or between the two polymeric films, as discussed above, for example, it may be difficult to bond the edges thoroughly so that no trimming is needed, any adhesive or cohesive failure at the interface due to, for example, repeat catching of the edges and/or some imperfection in the bonding or cohesive failure, may also generally manifest more at the edges.

For folding edges, the fold is the edge and though no trimming may be done, some imperfection in bonding of the folded edge may still be present.

When the surface or surfaces are to be bonded together, the smoother or more even they are, the more complete a bond may be formed with fewer defects. Without wishing to be bound by a theory, it is surmised that even though the surface or surfaces of the core and/or polymeric sheets are made as uniformly smooth as possible, the surface or surfaces of the core and/or of the polymeric sheets may still be uneven and may thus defects in bonding may be present, unless costly or extraordinary steps are taken to smooth the surface or surfaces. After manufacturing of the core and/or sheets are completed, an easy way to smooth out the surfaces may be by heating the surfaces to a temperature high enough to melt the surface so that the molten material may flow to cover up any defects that make the surface and/or surfaces uneven or not smooth. Such high temperature treatment may tend to damage the core and/or sheets unnecessarily.

When such imperfection or unevenness is present on the surface or surfaces of the core or sheets away from the edges, it is less likely for moisture, dirt and/or left over products from previous cargo, and microbes that thrive on the same to accumulate as those surfaces are less likely to be exposed to them. However, any such imperfections at the edges may be more likely to attract moisture, dirt and/or left over products from previous cargo, and microbes that thrive on either moisture, dirt or left over products and the moisture, dirt, and/or left over products and microbes may tend more to accumulate about the edges and become more difficult to clean once accumulated, since the accumulation may be more or less hidden. This may lead to contamination of the products or cross-contamination at the least, and may also render the load bearing surfaces non-reusable or dangerous to re-use without prior vigorous decontamination if the structure is being reused for cargos that are different from previous cargo, for example, different food types, such as poultry, fresh vegetables, and fresh fruits, or even same types of products. Even new load bearing structures that are not covered or properly stored prior to use may be susceptible to contamination or perception of contamination. Elimination or minimizing of contamination or perception of contamination in these hidden areas is therefore important for cargos, for example, food and drugs, electronics, or any products with exposed surfaces that may become contaminated.

In one exemplary embodiment, a sealing liquid may be used. The liquid may be applied, after the core is covered and bonded by the sheet or sheets, to the edges of the interface between the core and the sheet, or to the interface of the overlapping edges of the sheets. The sealing liquid may be any liquid that may soften or dissolve to a certain degree the polymeric material(s) of the interface between the sheet and the core or between the sheets to promote the firmly joining of the components at the edge. It may be desirable to dispense and apply the sealing liquid in a controllable manner or dosage, for example, by using a syringe-type dispenser or other metering device, to minimize overflowing or dripping or wasting of the liquid, or excessive dissolution of the material in the interface. Whatever the dispensing device, it may be desirable that the tip of the dispensing device, for example, the bore, be of a small cross-section, for example, just large enough for the liquid to be dispensed. The sealing liquid may be active at ambient temperature. The sealing liquid may be applied also prior to the bonding of the sheet to the core or another sheet by application of the liquid either to the outer edges of the sheet or sheets, or the core where such sealing is to take place.

In another exemplary embodiment, a sealing tape may be used. The tape may be applied to the edges of the sheet or one of the sheets or the core (when one sheet is used) prior to the bonding of the sheet or sheets to the core, so that the heat used for the bonding of the sheet or sheets may also activate the adhesive for bonding the tape to the core or sheet at the edges. The tape may include a non-tacky or solid heat activatable adhesive, for example, a hot melt adhesive, a heat curable adhesive, or a reactive adhesive, on one side and a contact or tacky adhesive on the other side. The contact or tacky adhesive may be covered with a liner prior to use and the tape may be wound up in a roll during storage. When applying to the sheet, the liner may first be separated from the contact or tacky adhesive side and bond to at least a portion of the top surface of the core or the edge of the sheet if one sheet is used, or to at least a portion of the side of the second sheet to be bonded together to the first sheet when two sheets are used or vice versa, or be substantially simultaneously separated and applied with the contact or tacky adhesive side onto the side of the sheet to be bonded to at least a portion of the top surface of the core or the edge of the sheet if one sheet is used, or to at least a portion of the side of the second sheet to be bonded together to the first sheet when two sheets are used or vice versa, so that the heat activatable adhesive side may be exposed prior to bonding either to the core or sheet, or to the first sheet or second sheet.

The sealing tape may include a sheet of heat activatable adhesive with one side coated with a contact or tacky adhesive, as noted above. In one embodiment, the heat activatable adhesive may be coated onto a liner, which forms a non-tacky adhesive sheet when cooled or dried. In one aspect, the adhesive may be solution coated onto the liner and after the solvent evaporates, the adhesive layer may form a non-tacky adhesive sheet. In another aspect, the adhesive may be extrusion coated onto a liner and cooled to a non-tacky adhesive sheet. In another embodiment, the heat activatable adhesive may be any film forming, for example, hot melt adhesive, which may be cast or extruded and cooled to a non-tacky adhesive sheet.

The heat activatable adhesive may be coated with a contact or tacky adhesive on the exposed side, if the heat activatable adhesive is presented on a liner, or on any one side, if there is no liner. The contact or tacky adhesive may be coated using any appropriate coating technique, including but not limited to solvent coating, extrusion coating or screen printing with patterns of dots or arrays of microdots, which may generally be densely populated. The thickness of the contact or tacky adhesive and the heat activatable adhesive may vary, but in general they may be sufficiently thin so as to create a less pronounced edge after edge bonding, which may in turn minimize any tendency for separation. The contact or tacky adhesive and the heat activated adhesive may be selected to form a good bond between the core and a polymeric sheet at the edges or a first polymeric sheet and a second polymeric sheet at the edges. The contact or tacky adhesive may also be selected with good bonding characteristics to form a good bond between it and the hot melt adhesive layer to minimize adhesive failure at their interface. The tape may also help to create a smoother transition at the exposed edge at the interface and may again help to minimize any separation tendency at the edge. The heat activatable adhesive may be any hot melt adhesive, heat curable adhesive, reactive adhesive, etc, that is heat activated at about the same temperature as the bonding temperature of the polymeric layer and the core, to form a good bond at the edges, as noted above.

During application, the separation of the liner from the tacky layer may be effected manually by peeling off the liner prior to application to the core or polymeric sheet, or by the use of a tape dispenser that may automatically separate the liner from the tacky adhesive during use, simultaneously or almost simultaneously with the attachment of the contact or tacky adhesive to the polymeric sheet.

In other embodiments, the tape may also be applied to the edges mentioned above after the polymeric sheet or sheets have been bonded so that the tape is present on the outside. In these embodiments, the adhesive may be a pressure sensitive or heat sensitive adhesive coated on a backing only on one side.

In still other embodiments, one side of the tape may include a heat activated adhesive while the other side may include a pressure and heat sensitive adhesive so that the tape may be held in place by pressure prior to heat activation during the bonding process.

In a further exemplary embodiment, a chemical sealing composition may be used. The edges of the sheet may be further bonded to the polymeric core when one polymeric sheet is used, or when two polymeric sheets are used, the overlapping areas of the first and second layers, with a chemical sealing composition that may be in liquid form prior to application. The chemical composition may be a liquid or a slurry that may be activated by drying or at the bonding temperature during the bonding process, or an adhesive in liquid form which may be activated at about the bonding temperature of the polymeric sheet and the core. The slurry may include a mixture of the liquid with dispersing particles of the polymeric sheet. The liquid chemical sealing composition may be applied in its native liquid form, slurry or semi solid form, or in a treated solid form. While the liquid in its native form may be applied in a similar manner as the sealing liquid as noted above. Treated slurry may be painted on or dispensed from a container, such as a squeeze bottle, as above, but with a larger opening on its dispensing end onto either the edges of the polymeric sheet either prior to or after the bonding process between the core and the sheet. When applied prior to the bonding process, the composition may aid to adhere the sheet to the core or the sheet to the sheet with the liquid and the particles may be activated during the bonding process. When the treated chemical sealing composition is in a solid form, it may include small encapsulated particles, encapsulating the liquid inside. The application of the solid form may include the use of a device for sprinkling the treated chemical composition onto the edges prior to the bonding process between the core and the polymeric sheet or sheets. In either form, the chemical sealing composition may be activated during the bonding process of bonding the polymeric core with the polymeric sheet or sheets, if desired.

The treatment material used to form the chemical sealing composition in the treated solid form may render it free flowing, i.e., the treated form does not adhere to each other, but may adhere to the core or sheet sufficiently, even if temporarily prior to the bonding process.

An example of slurry composition may include a mixture of a sealing liquid noted above mixed with heat activatable polymeric powder, such as with same or similar powder polymeric material used in the manufacturing of the polymeric sheet. For example, when the polymeric sheets are made from high impact polystyrene, then the powder is powdered polystyrene. The sealing liquid may be relatively non-volatile so that the liquid is not substantially evaporated prior to the bonding process between the sheet with the core and/or sheet.

As discussed in more detail below, a chemical sealing composition may also include a self-healing and/or self-repairing composition. The self-healing and/or self-repairing composition may also be present in any of the other sealing features.

In yet another exemplary embodiment, the edges may be sealed by a mechanical and/or heat sealing device, for example, an ultrasonic sealing device. For example, ultrasonic energy produced by, for example, an ultrasonic horn and/or an ultrasonic welder may be used. The ultrasonic energy level may be selected so as to affect, but not to distort the edges being bonded.

In some embodiments, the first and second polymeric sheets may be partially folded over each other as they are bonded to the polymeric core, and the folded area may be subjected to heat, pressure and/or a vacuum to create a sealed joining area. Excess material of the polymeric sheets may also be trimmed off away from the load surface.

In one embodiment, the polymer sheet or film layer may include an antimicrobial agent having some surface activity therein. In another embodiment, an antimicrobial coating having some surface activity may be applied to at least one of the exposed surfaces of the load bearing structure, whether or not the surface is covered by a sheet or film layer.

The antimicrobial agent may be in powder form or in liquid form. In any of the forms, the antimicrobial agent may be able to withstand the bonding temperature without degrading or losing its properties.

According to one embodiment, the polymeric film or sheet layer covering the core may have anti-microbial properties. In one aspect, the polymeric layer, for example, a high impact polymeric sheet may cover the bottom side, the entire thickness of the width and a portion of the top surface of the core. In another aspect, the polymeric film or sheet layer, for example, a high impact polymeric sheet having antimicrobial properties may cover the top and bottom side and substantially all of the thickness of the width of the core.

In one exemplary embodiment, at least one antimicrobial agent having some surface activity may be added to the material used for making the sheet. The antimicrobial agent may be in powder form or in liquid form. In another exemplary embodiment, at least one antimicrobial agent having some surface activity may be coated onto the exposed surface or surfaces of the load bearing structure, whether or not the surface is covered by a sheet or film layer. The antimicrobial agent may be in powder form or in liquid form. In any of the forms, the anti-microbial agent may be capable of withstanding the bonding temperature of the sheet or sheets to the core without degradation of its anti-microbial properties.

In another embodiment, a porous surface, which may be a porous sheet substrate discussed above, or surface of the polymeric core, for example, an expanded polystyrene core or polyurethane core, which may be covered with one polymeric sheet in a way that part of the top surface of the core may be exposed. The polymeric sheet may be impregnated with a water based antimicrobial composition having at least one polymeric carrier that may be in the form of an emulsion or dispersion and at least one substantially non-leaching antimicrobial component that is substantially free of environmentally hazardous material. The porous surface may or may not be further over coated or protected with a film layer after being impregnated with the antimicrobial composition.

In yet another embodiment, a porous surface, which may be a porous sheet substrate, may be impregnated with a water based antimicrobial composition, having at least one polymeric carrier that may be in the form of an emulsion or dispersion and at least one surface active antimicrobial component that is substantially free of environmentally hazardous material.

In still another embodiment, a non-porous sheet substrate may be coated with a water based antimicrobial composition, having at least one polymeric carrier that may be in the form of an emulsion or dispersion and at least one substantially non-leaching antimicrobial component that is substantially free of environmentally hazardous material.

For load bearing structures having one thermoplastic sheet over the core thereon, the exposed surfaces may be porous, as noted above. The porous material may be impregnated with a water based antimicrobial composition, also as mentioned above, the antimicrobial composition may itself form a film making the surface non-porous.

In some embodiments, the surfaces of the porous materials impregnated with an antimicrobial composition may be non-porous after drying or setting and may perform as if it has been coated or covered with a thermoplastic sheet or protective sheet mentioned above.

The same emulsion or dispersion mentioned above may also be coated onto the exposed surfaces of load bearing structures having two thermoplastic sheets over the core thereon, when the exposed surfaces are non-porous.

In any of the above disclosed embodiments, the antimicrobial agent may be added after the heat bonding process. In the embodiments where heat bonding is effected after the antimicrobial agent is added, the antimicrobial agents used may be capable of retaining or not losing its anti-microbial properties during the bonding process.

In any of the embodiments with anti-microbial properties, edge bonding may be effected either before or after coating with the antimicrobial layer.

The antimicrobial agent may aid in minimizing the accumulation of microbes on the load bearing structure. However, the edge sealing and antimicrobial agent may aid in minimizing the accumulation of dust, dirt or microbes.

In other embodiments, the core may include a structural metal mesh to resist piercing of the surface.

In a further embodiment, load bearing structures discussed above, having antimicrobial properties, and/or puncture resistant properties may also have fire retardant properties and/or ultra violet light barrier properties.

In one embodiment of the invention, a load bearing structure discussed above may be a dunnage platform having a top side, and a bottom side separated from each other by a width having a thickness. The platform may be of a substantially square or rectangular shape. A container may be assembled from a plurality of loading bearing structures such as dunnage platforms, each having a light weight polymeric core and a high impact polymeric sheet substantially covering the core, as discussed above. The dunnage platforms useful for assembling into a container may include interconnecting features which mate together to form a container.

The edges of the load bearing structures of the container may be bonded with a sealing tape, a sealing chemical composition, a sealing liquid, or a mechanical and/or heat seal, such as with an ultrasonic sealing device, as discussed above.

In one embodiment, when the load bearing structures discussed above may be assembled into a container having a base, top and walls, the extensions may be present in one or more of the base, top and walls.

The sheet or film layer covering the core of each of the walls, top and base of the container may also include anti-microbial properties described above. The walls may or may not include supports. In one exemplary embodiment, at least one antimicrobial agent having some surface activity may be added to the material used for making the polymeric sheet or film layer, for example, a high impact polymeric sheet. The antimicrobial agent may be in powder form or in liquid form. In another exemplary embodiment, at least one antimicrobial agent having some surface activity may be coated onto the exposed surface or surfaces of the sheet. The antimicrobial agent may be in powder form or in liquid form.

In any of these forms, the anti-microbial agent may be capable of retaining its properties during the bonding process.

In some aspects, a container that is light weight, strong, and assembled from a plurality of movable load bearing structures discussed above, may also be puncture resistant and/or having fire retardant properties and/or ultra violet light barrier properties, with or without antimicrobial properties.

One of the load bearing structures or dunnage platforms of the container may also have a plurality of feet extending from the bottom side of the structure, as noted above.

In another embodiment of the invention, the load bearing structures discussed above may be in the form of a substantially L-shaped cross-section, having an inner surface and an outer surface joined by a width having a thickness. The surfaces of the polymeric core may be partially or completely covered by a polymeric sheet. The edges of the sheet or sheets may be sealed with a tape, a sealing liquid, a sealing chemical composition or a mechanical and/or heat seal, which may include the use of an ultrasonic sealing device, as discussed above.

In one embodiment, a container may include two identical or mirror images substantially L-shaped cross-section halves each having at least two walls and a base or top component, each of the components having corresponding interlocking features to be mated together to form a container having for example, a closed enclosure therein. The foot print of the container is not larger than one of the substantially L-shaped cross-section halves.

One of the L-shaped load bearing structures or dunnage platforms of the container may also have a plurality of feet extending from the bottom side of the structure.

In still another embodiment of the invention, the load bearing structure discussed above may be in the form of a clam shell having an inner surface and an outer surface joined by a width having a thickness. The surfaces of the polymeric core may be partially or completely covered by a polymeric sheet. The edges of the sheet or sheets may be sealed with a tape, a sealing liquid, a sealing chemical composition or a mechanical and/or heat seal, which may include the use of an ultrasonic sealing device, as discussed above.

A container may include two clam shell halves, in mirror images, each having at least one wall and a base or top component, each of the halves having corresponding interlocking features to be mated together to form a container having for example, a closed enclosure therein. The container may also include a plurality of supports.

In either of the above embodiments where the load bearing structure may be in the form of a substantially L-shaped cross-section having at least two walls and a base or top component, or a clam-shell half and the containers may be assembled from the same, or mirror images of the same, each of the components having corresponding interlocking features to be mated together to form a container having an enclosure therein, The edges of the halves may also be sealed as discussed above. In one aspect, the footprint of the knock-down or collapsed container is not larger than the foot-print of each of the L-shaped or clam shell halves. In another aspect, the footprint of the knock-down or collapsed container is larger than the footprint of each of the L-shaped or clam shell halves.

In one embodiment, each half may be made of an inner light weight core covered by at least one layer of strengthened film or sheet. In one aspect, the layer of strengthened sheet or film may include antimicrobial properties, as discussed above. In another embodiment, the core may include antimicrobial properties, as discussed above.

In some embodiments, a structural metal mesh may be inserted into the core to resist piercing of the surface. The container may also have fire retardant properties and/or ultraviolet light barrier properties The load bearing structure of the present invention may be useful for loading, storing or transporting products that either cannot tolerate such contamination or cross-contamination, susceptible to spoilage, or in situations that the perception of non-cleanliness is not desirable. The present invention also relates to a load bearing structure for use directly in clean rooms for the manufacturing of electronic parts, micro-electronic devices, drugs and pharmaceuticals, food products such as snacks, or similar products that need to be kept clean from dust, dirt or microbes. The cargo may be directly loaded after making without additional steps of transferring the cargo to a load bearing structure after the cargo leaves the clean room, thus eliminating steps, saving time, minimizing manpower or robotics, or risk of contamination or damage. The edge sealing further adds to the cleanliness of the load bearing structures.

According to one embodiment, the container may include an enclosure having one undivided internal compartment. According to another embodiment, the container may include an enclosure having more than one internal compartment. In one aspect, the interior may have dividers molded into the side of the component structures. In another aspect, the dividers may be added to the container to form separate compartments. Channels or depressions may be present or molded into the components of the container to allow for placement of external dividers to adjust the size of the compartments.

According to one embodiment, features may be present or formed into the components of the container for placement of cargo or placement of other components for more secure location of cargo. According to another embodiment, the channels or depressions mentioned above may be used to locate the features.

In one aspect, the containers may be made of the size and shape to accommodate the cargo. In another aspect, the cargo may be contained in its own packaging and then inserted into the container. In a further aspect, features may be located in the container to aid in accommodating the cargo.

The present invention further relates to containers for shipping and/or storage of cargo in which the climate within the container is controlled.

According to the present invention, the polymeric core, for example, may be a closed cell foam core such as an expanded polystyrene core with a region proximal to its surface that is combined with a high impact polymeric sheet, for example, a polystyrene sheet, by heat and pressure. In one exemplary embodiment, at least one antimicrobial agent having some surface activity may be added to the material used for making the sheet. The antimicrobial agent may be in powder form or in liquid form. In another exemplary embodiment, at least one antimicrobial agent having some surface activity may be coated onto at least one of the exposed surfaces of the sheet. The antimicrobial agent may be in powder form or in liquid form.

The load bearing structures may also include a plurality of supports, as described above, which may generally space the bottom surface of the load bearing structure from the ground and/or other support surface. The supports may also be spaced from each other such that, for example, the load bearing structure may be manipulated with a forklift and/or other moving machinery fitting into the spaces between the supports. In some embodiments, runners, bridges and/or other connectors may also be included, such as, for example, connecting multiple supports, which may generally increase the strength and/or rigidity of the base. The runners or bridges may be manufactured from any suitable material. For example, the runners or bridges may be constructed from wood, metal and/or various plastics materials, including polyolefins, HIPS, polyesters, lead free PVC or any of the materials suitable for the polymeric sheet mentioned above. In some embodiments, the runners or bridges are manufactured from HIPS (high impact polystyrene) using an extrusion forming process. Further, the bridges may be configured so that they each span two or more supports of a row and may be affixed to the ends of the supports so that they interconnect. For example, the bridges may be affixed using a suitable adhesive. In addition, the bottom of the supports for affixing the bridges may include indentations for retaining the bridges so that the bridges are not protruded from, but flushed with the bottom of the supports.

The runners or bridges may extend between adjacent supports. In one embodiment, the bridges may be a plurality of wear resistant members that are affixed to an underside of at least some of said supports and which are adapted in use to bear against a foundation upon which the load bearing structure may rest. Further, the runners or bridges may be configured so that they each span two or more supports of a row and may be affixed to the end walls of each of the supports so that they interconnect same. For example, the runner or bridges may be affixed to abutting end walls using a suitable adhesive.

The load bearing structures may also include anti-skid members or further strengthening features, for example, the bottom surface of the load bearing structure, or base if it is used as a component of a container, and/or the supports may also include ridges, ribs, reinforcements and/or other surface modifications to which may, for example, aid in increasing the strength and/or rigidity of the structure of the base, especially under load. Some modifications also aid in reducing any unintended slippage of the container while at rest. In some aspects, the modifications may be roughening the bottom surface to reduce slippage. It is also believed that the ability of the supports and/or base to resist compressive loads may be greatly enhanced if each of the side walls includes a plurality of generally longitudinally extending ribs.

Other objects, features and advantages of the invention should be apparent from the following description of a preferred embodiment thereof as illustrated in the accompanying drawings.

BRIEF DESCRIPTION OF THE DRAWINGS

FIGS. 12, 12a-12g illustrate embodiments of a load bearing structure with extensions or supports of the present invention with at least one polymeric sheet bonded to it and with a sealing feature for the edges of the polymeric sheet;

FIGS. 12h-12m illustrate an embodiment of a load bearing structure of the present invention with two polymeric sheets bonded to it and with a folded sealing feature for the edges of the polymeric sheets;

FIGS. 14, 14a and 14a-1 illustrate embodiments of using a tape as a sealing feature in embodiments of the present invention;

FIG. 14d illustrates a one-sided tape at the edge of a polymeric sheet bonded to a polymeric core of a load bearing structure in an embodiment of the present invention;

FIG. 14e illustrates the edge of a single polymeric sheet bonded to a polymeric core of a load bearing structure in an embodiment of the present invention;

FIGS. 16 and 16a illustrate an embodiment of a container with tongue and groove interfaces in an embodiment of the present invention;

FIGS. 17 and 17a illustrate a base of the embodiment of a container of FIGS. 16 and 16a;

FIGS. 18, 18a and 18e illustrate a wall panel of the embodiment of a container of FIGS. 16 and 16a;

FIGS. 27 and 27a illustrate a load bearing structure with edge protectors with guide features in embodiments of the present invention.

DETAILED DESCRIPTION OF THE INVENTION

The detailed description set forth below is intended as a description of the presently exemplified systems, devices and methods provided in accordance with aspects of the present invention and are not intended to represent the only forms in which the present invention may be prepared or utilized. It is to be understood, rather, that the same or equivalent functions and components may be accomplished by different embodiments that are also intended to be encompassed within the spirit and scope of the invention. Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the exemplary methods, devices and materials are now described. All publications mentioned herein are incorporated herein by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figures 1, 1A:
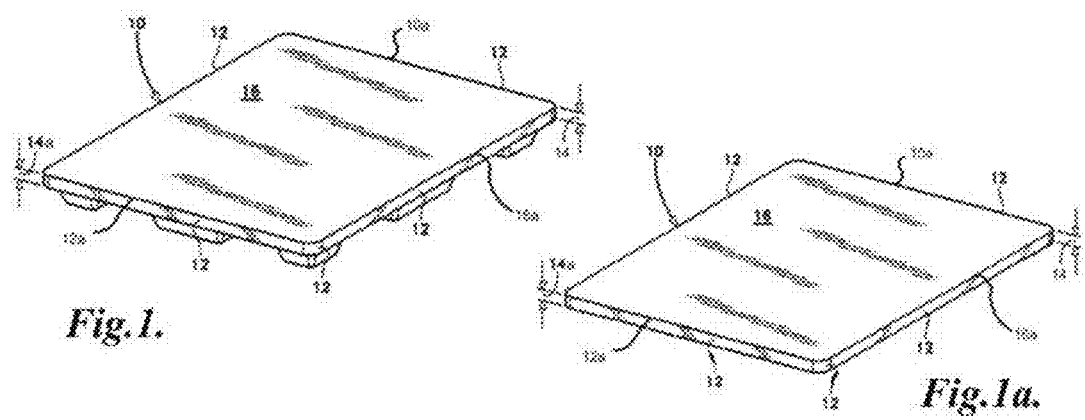
FIGS. 1 and 1a are perspective views of a top side of a core of a load bearing structure with extensions or supports and without, respectively, that is in accordance with the invention.
Figures 2, 2A:
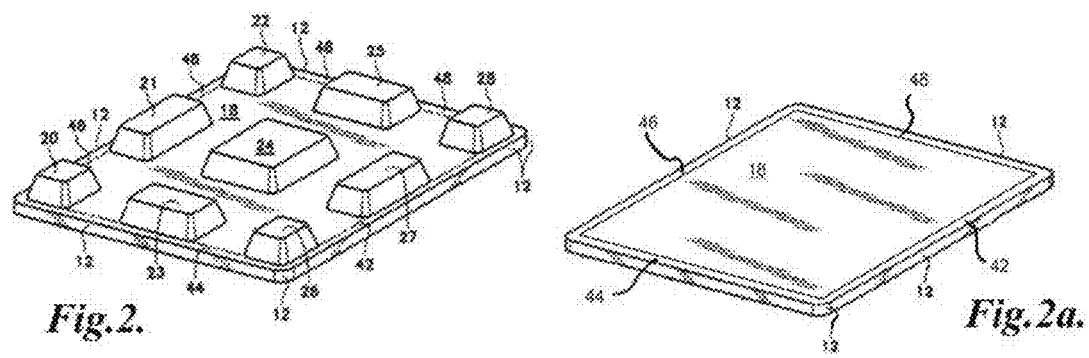
FIGS. 2 and 2a are perspective views of a bottom side of the core of FIGS. 1 and 1a, respectively.

In FIG. 1, an expanded polymer core 10a, for example, a polystyrene core, is in the general shape of a rectangular slab with a width 12 (FIG. 1) that has a thickness 14a which may be of any dimension, for example, approximately one and three-fourths to about two inches (about 4.5 cm to about 5 cm). The core 10a may have a smooth topside 16a which may be partially or completely covered with a polymeric layer, for example, a high impact polymeric sheet 67, such as a high impact polystyrene sheet, that may be in the order of approximately four feet long and forty inches wide. The smooth topside 16a may generally transition to the width 12 at its periphery with edge 12a. A bottom side 18a, as shown in FIG. 2 of the core 10a may include extensions or supports 20-28, though most of the embodiments may not include a plurality of extensions or supports. These extensions or supports, if present, may extend for a length, for example, approximately four to six inches (about 10 cm to about 20 cm) therefrom. Referring to FIG. 2, the edge 12a is proximal to spaces 42, 44, 46, 48 on the bottom side 18a. The marginal spaces 42, 44, 46, 48 separate the extensions or supports 26-28, the extensions or supports 20, 23, 26, the extensions or supports 20-22 and the extensions or supports 22, 25, 28, respectively, from the edge 12a.

FIGS. 1a and 2a are embodiments similar to FIGS. 1 and 2, but without a plurality of extensions or supports.

The load bearing structure 10 also has a width 12 having a thickness 14, which is the combined total thickness of the core 10a and sheet 67, mentioned above. Cargo may be loaded on the top side 16a of the load bearing structure 10. The cargo may be perishable or non-perishable and may include food such as fresh vegetables and fruits, poultry and meat products, pharmaceuticals and drugs, electronic components and devices, etc.

Moisture, dirt and/or left over products and microbes that thrive on either moisture, dirt or left over products may cause contamination of the products or cross-contamination at the least, and may also rendered non-useable or dangerous to re-use without prior vigorous decontamination when the structure is being reused for cargos that are different from previous cargo, for example, different food types, such as poultry, fresh vegetables, and fresh fruits, or even same types of products. Even if the load bearing structures are newly made, dirt and/or moisture and microbes that thrive on either dirt or moisture may cause contamination of the cargo loaded on the structure. The dirt and/or moisture and microbes may tend to hide, grow or accumulate in interfaces between layers of materials if there is imperfect joining and/or bonding of the layers.

In general, during the normal bonding of the polymeric film to the polymeric core, heat and/or pressure is used so that portions of the polymeric core proximal to the surface of the bottom side 18a with portions of the polymeric sheet 67 proximal to the surface of the bottom side of the sheet 67 to form a substantially strengthened composite. Additionally, a portion of the polymeric core that is proximal to the edge 12 and in a proximal relationship to the bottom side 18a is combined with portions of the polymeric sheet 67.

However, even though the bonding between the bulk of the polymeric core and the polymeric sheet is sufficiently strong, with or without imperfections, to produce a strengthened load bearing structure, the need to improve the bonding between the peripheral of the polymeric sheet and the polymeric core may still be present to minimize or eliminate any imperfections where the dust, dirt and/or moisture and microbes may tend to hide, grow or accumulate, generally in interfaces between layers of materials if there is imperfect joining and/or bonding of the layers.

Figure 12:
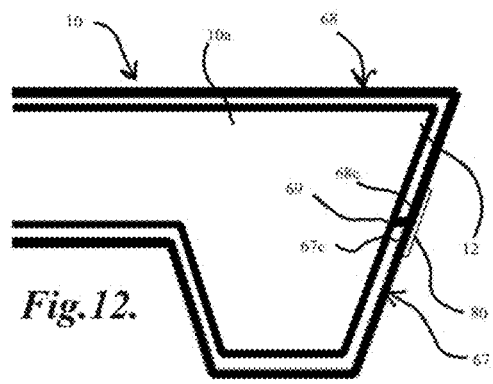
Figure 15:
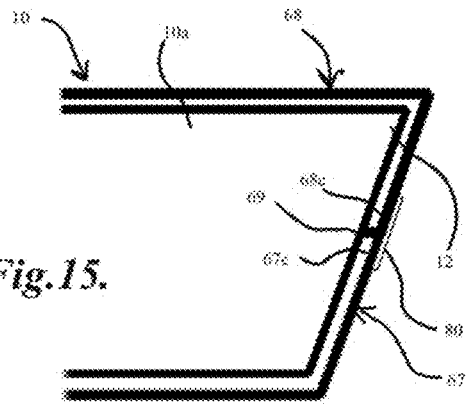
FIGS. 15-15h illustrate embodiments of a load bearing structure without extensions or supports of the present invention with at least one polymeric sheet bonded to it and with a sealing feature for the edges of the polymeric sheet.

The load bearing structure or the platform 10, as shown in FIG. 1, 1a, 2 or 2a, may include a light weight polymeric core 10a, covered by either one polymeric sheet or two polymeric sheet 67, as discussed above, and the interface between one polymeric sheet 67 or 68 (as shown in FIGS. 12 and 15) and the surface of the core, or the interface of the edges formed by the overlapping and/or abutment of one polymeric sheet with a second polymeric sheet may be sealed with sealing feature, such as a sealing liquid, a heat activatable adhesive, a sealing chemical composition, or a mechanical and/or heat seal, and may include an ultrasonic sealing device to minimize or eliminate areas where moisture, dirt and/or left over products and microbes that thrive on either moisture, dirt or left over products may hide, grow and/or accumulate.

Figure 13:
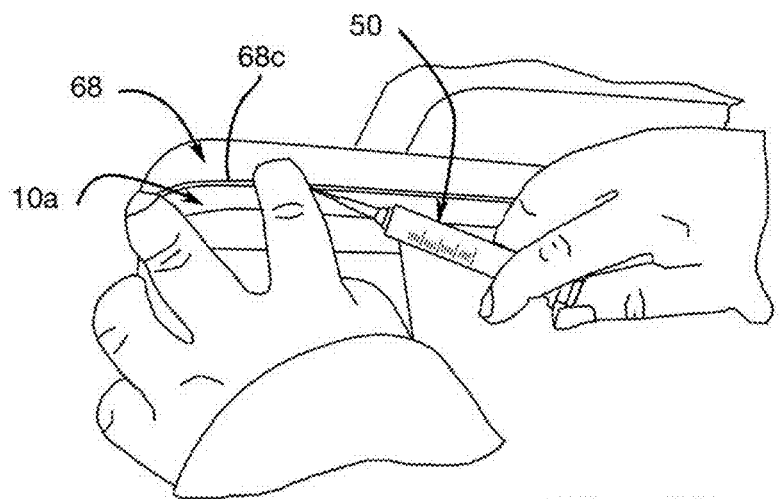
FIGS. 13 and 13a illustrate a method of sealing a polymeric sheet to a polymeric core using a sealing liquid in an embodiment of the invention.
Figure 13A:
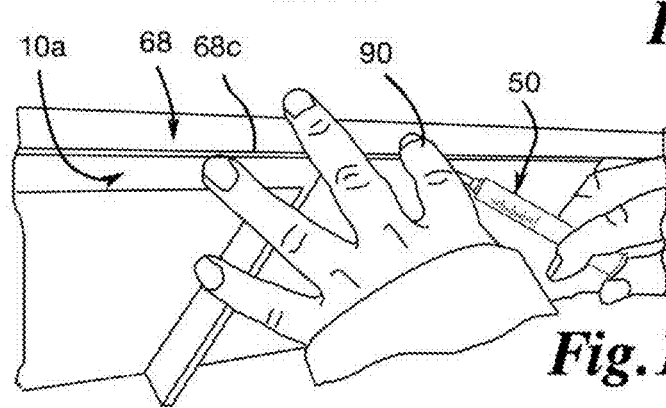

Any application of the sealing feature is close to the outer edges of the polymeric sheet or sheets, at the, for example, peripheral of the outer edges of the polymeric sheet 67 or sheets, 67, 68. It is sufficient that a relatively small portion of the outer edges may be sealed by the sealing feature, though a larger portion may also be sealed. For example, about 4 millimeters to about 12 millimeters from the edge, more for example, about 5 millimeters to about 10 millimeters from the edge, and more for example, about 5 millimeters to about 8 millimeters from the edge, of a polymeric sheet is sealed with the sealing feature. The rest of bonded area of the polymeric sheet including the outer edges is bonded with heat and/or pressure in the manufacturing process of the load bearing structure, as noted above. In FIGS. 13 and 13a, for example, the sealing feature is present at about 7 millimeters from the outer edge of the second sheet 68.

Examples of heat activatable adhesives may include, but not limited to adhesives containing ethylene alpha olefin interpolymers, such as those disclosed in U.S. Pat. Nos. 6,319,979, 6,107,430 and 7,199,180; Metallocene based adhesive including those containing substantially linear ethylene/1-octene copolymer, available from The Dow Chemical Company, those disclosed in U.S. Pat. Nos. 8,222,336 and 8,163,833; Metallocene hot melt adhesive including those disclosed in U.S. Pat. No. 8,476,359; propylene based hot melt adhesive including those containing nonmetallocene, metal-centered, heteroaryl ligand-catalyzed propylene and ethylene copolymer adhesives; reactive hot melt adhesive as disclosed in U.S. Pat. No. 8,507,604; heat activated hot melt adhesives including those disclosed in U.S. Pat. Nos. 8,475,046 and 8,240,915; adhesives containing metallocene and non-metallocene polymers, such as those disclosed in U.S. Pat. No. 8,475,621; adhesives containing ethylene .alpha.-olefin, such as those disclosed in U.S. Pat. No. 6,107,430; hot melt adhesives containing block copolymers, such as those disclosed in U.S. Pat. No. 8,501,869; Polyolefin adhesives such as those disclosed in U.S. Pat. Nos. 8,283,400 and 8,242,198, all of which are hereby incorporated by reference in their entirety.

The sealing liquid may be any solvent that may slightly dissolve the core and/or the polymeric sheet during sealing, provided the liquid is not toxic. It is also desirable that the liquid has a moderate to high a solubility index for the core and/or the polymeric sheet, so that a small amount of the liquid is adequate. The liquid may be slightly volatile or relatively non-volatile at ambient temperature. Examples may include chlorinated solvent such as Tetrachloroethylene; or some cyanoacrylate compositions. The liquid may be applied to the edges of the interface between the polymeric sheet and core or between two polymeric sheets via a dispensing device, as discussed above. An example is shown in FIG. 13. The application may be performed after the bonding process, especially if the liquid is relatively volatile and dries relatively quickly at ambient temperature.

The sealing chemical composition may include any liquid that is relatively non-volatile and may be in the form of a liquid, a treated form such as a semi-liquid composition including a mixture of liquid and solid particles, or a slurry, a solid form. such as a capsule of any liquid adhesive or sealing composition. Examples of useful liquid adhesives may include those containing cyanoacrylate or derivatives, or chlorinated solvents noted above mixed with polymeric particles.

Treated sealing chemical compositions such as a slurry may be less volatile than pure solvents or even chemical compositions and thus may be amenable to be painted on in addition to being dispensed from a dispensing device such as a container like a squeeze bottle or a syringe, as above, but with a larger opening on its dispensing end onto either the edges of the polymeric sheet either prior to or after the bonding process between the core and the sheet, depending on the activation temperature of the composition. In some embodiments, the slurry composition may include a mixture of a sealing liquid noted above with same or similar powder polymeric material used in the manufacturing of the polymeric sheet. For example, when the polymeric sheets are made from high impact polystyrene (HIPS), the powder may include powdered polystyrene. The sealing liquid may be relatively non-volatile so that the liquid is not substantially evaporated prior to the bonding process between the sheet with the core and/or sheet. One example may include a solvent mixed with a solid, such as tetrachloroethylene solvent mixed with HIPS powder, to form a slurry which may be applied as noted above. This slurry may dry after application and the particles may, for example, aid in sealing if heat activated in a later stage.

When the treated chemical sealing composition is in a solid form that may include small encapsulated particles, encapsulating any liquid that may be a solvent, a slurry or a sealing composition, inside, and the activation may be the application of pressure or heat and pressure, to crush or melt the capsules and release the adhesive.

FIGS. 12, 12a-f illustrate a section of an example of a load bearing structure 10 with extensions or supports, such as that described and shown in FIGS. 1 and 2, and FIGS. 15-15h illustrate a section of an example of a load bearing structure 10 without extensions or supports, such as that described and shown in FIGS. 1a and 2a, or others not previously described, which may also include a lightweight polymeric core 10a with a width 12. The load bearing structure 10 may further include at least one polymeric sheet, as discussed above, such as the polymeric sheets 67, 68 as illustrated, and may also include at least one sealing feature 70 or 80 for sealing the edges of the polymeric sheets 67, 68 to each other and/or to the polymeric core 10a, as may be the case as illustrated. In general, the sealing of the polymeric sheets to the polymeric core and/or to each other may be applied in an identical and/or similar manner to any of the load bearing structures and/or containers described herein.

FIGS. 12 and 15 illustrates an embodiment of a load bearing structure 10 with a first polymeric sheet 67 and a second polymeric sheet 68 which may abut at an interface with each other at abutment 69. The abutment 69 may generally be formed by the edges 67c, 68c of the polymeric sheets 67, 68, respectively, and may be a flush interface, or it may include some gap(s) and/or unevenness which may, for example, result from the manufacturing and/or joining process of bonding the polymeric sheets 67, 68 to the polymeric core 10a, as discussed above. In some embodiments, as illustrated in FIGS. 12 and 15, a sealing feature 80 may be utilized to seal and/or cover the abutment 69 between the two polymeric sheets 67, 68. The sealing feature 80 may generally cover and/or fill in any gap(s) and/or unevenness that may be present at the interface and may also generally extend a given amount onto each polymeric sheets 67, 68 to, for example, produce a more substantial and/or durable seal. In general, a sealing feature that covers the abutment 69, such as the sealing feature 80 as illustrated in FIGS. 12 and 15, may be applied after the polymeric sheets 67, 68 are bonded to the polymeric core 10a, as the sealing feature 80 lies atop the polymeric sheets 67, 68. The sealing feature useful for this application may include any of those mentioned above, for example, a sealing tape which may include an adhesive surface on one side of the tape.

Figure 12C:
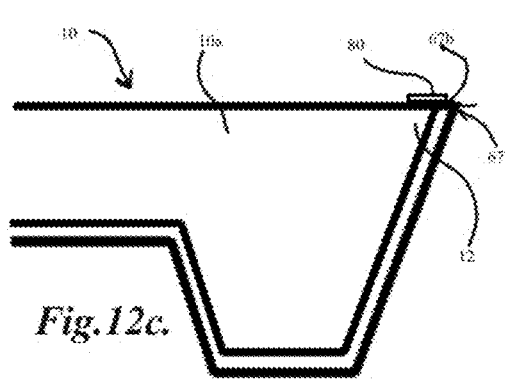
Figure 12A:
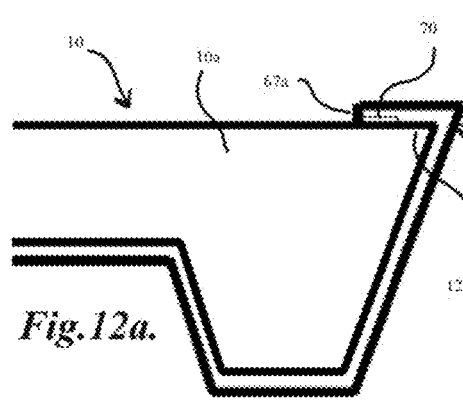
Figure 12D:
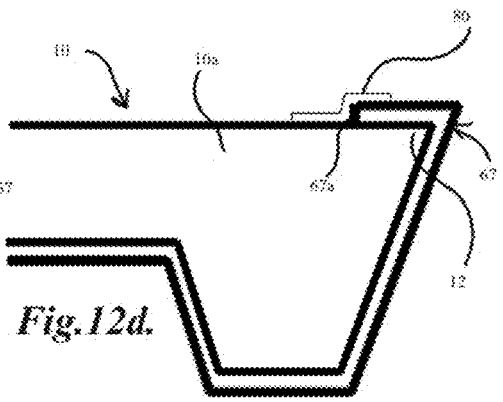
Figure 12B:
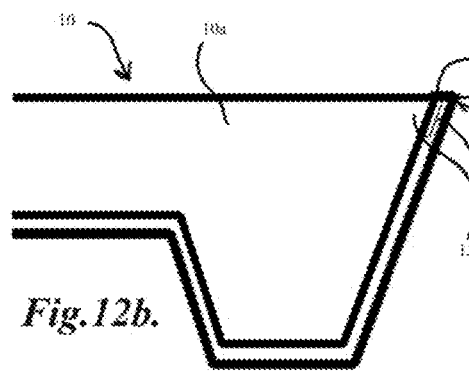
Figure 12E:
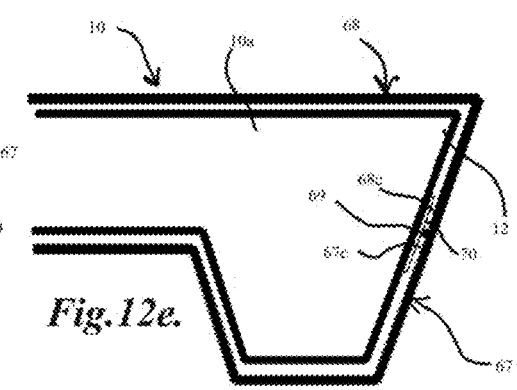
Figure 15C:
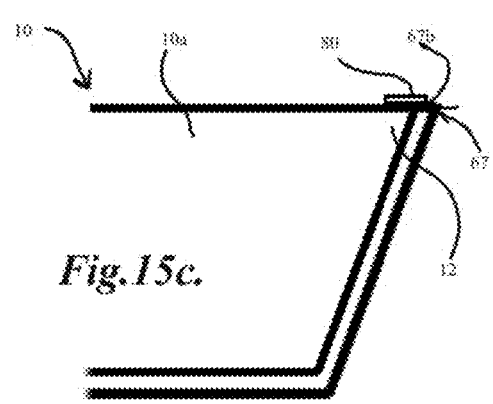
Figure 15A:
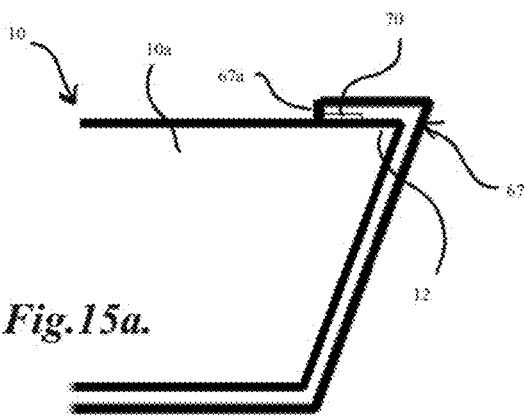
Figure 15D:
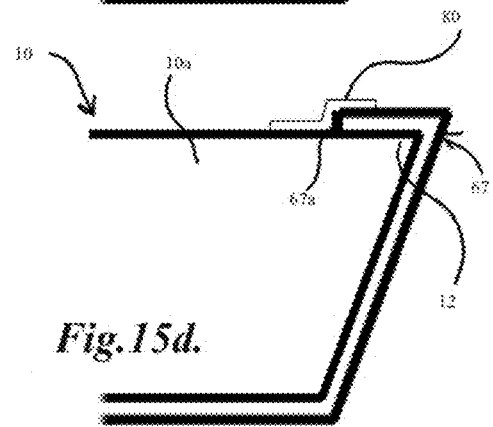
Figure 15B:
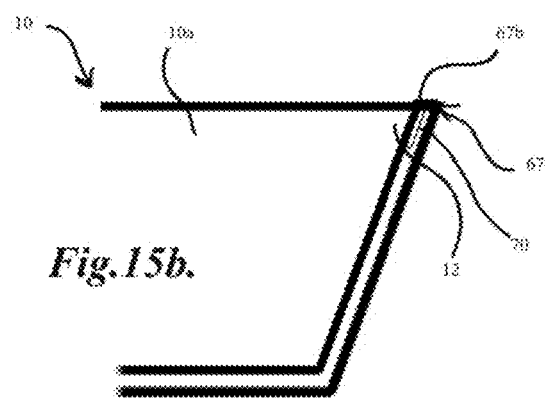
Figure 15E:
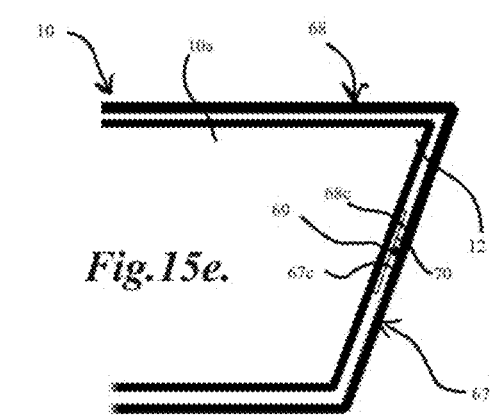

The sealing feature may also lie between the sheets 67, 68 at the edge, similar to that in FIGS. 12e and 15e where the sealing feature 70 is shown. The sealing feature 70 may be any of those listed above, for example, a double-side coated sealing tape, a sealing liquid, a sealing chemical composition, a mechanical and/or heat seal, which may include an ultrasonic seal.

In other embodiments, as illustrated in FIGS. 12a, 12b, 15a and 15b, a load bearing structure 10 may include a single polymeric sheet 67 which may extend and wrap around the entire thickness 14a (as in FIGS. 1 and 1a) of width 12 of the polymeric core 10a, or even extending to portions of the top surface 16 of the core, as illustrated in FIGS. 12a and 15a, or abut at the width 12 of the polymeric core 10a, as illustrated in FIGS. 12b and 15b. The edges 67a or 67b of the polymeric sheet 67 may be sealed to the polymeric core 10a by a sealing feature 70 which may be disposed between the polymeric sheet 67 and the polymeric core 10a, as illustrated in FIGS. 12a, 12b, 15a and 15b. The sealing feature 70 may, for example, be applied to the polymeric core 10a prior to bonding the polymeric sheet 67. The sealing feature 70 may also, for example, be applied to the polymeric sheet 67 and bonded to the polymeric core 10a at the same time as the polymeric sheet 67. In another example, the sealing feature 70 may be applied between the edges 67a, 67b of the polymeric sheet 67 and the polymeric core 10a after the polymeric sheet 67 has already been bonded to the polymeric core 10a. For example, the sealing feature 70 may include sealing liquid, chemical sealing composition, adhesive tape, etc., as discussed above, and may be inserted, injected, pressed-in and/or otherwise interposed between the polymeric sheet 67 and the polymeric core 10a. In another example, the sealing feature 70 may be provided by a heat sealing or may be an ultrasonic sealing device.

In still other embodiments, as illustrated in FIGS. 12c, 12d, 15c and 15d, a load bearing structure 10 with a single polymeric sheet 67 may abut at the width 12 of the polymeric core 10a, as illustrated in FIGS. 12c and 15c, or wrap around the width 12 of the polymeric core 10a, as illustrated in FIGS. 12d and 15d. The edges 67a, 67b of the polymeric sheet 67 in FIGS. 12d and 12c, or 15d and 15c, respectively, may be a flush interface, or it may include some gap(s) and/or unevenness which may, for example, result from the manufacturing and/or joining process of bonding the polymeric sheet 67 to the polymeric core 10a. A sealing feature 80 may then be utilized to seal and/or cover the edges 67a, 67b of polymeric sheet 67 and extend onto the polymeric core 10a. The sealing feature 80 may generally cover and/or fill in any gap(s) and/or unevenness that may be present at the interface and may also generally extend a given amount onto the polymeric sheet 67 and/or onto the polymeric core 10a to, for example, produce a more substantial and/or durable seal. In general, a sealing feature that covers the edge of the polymeric sheet and part of the polymeric core 10a, such as the sealing feature 80 as illustrated in FIGS. 12c, 12d, 15c and 15d, may be applied after the polymeric sheet 67 is bonded to the polymeric core 10a, as the sealing feature 80 lies atop the polymeric sheet 67. The sealing feature may include any of those mentioned above, for example, a single side coated tape.

FIGS. 12e and 15e illustrates an embodiment of a load bearing structure 10 with a first polymeric sheet 67 and a second polymeric sheet 68 which may abut at an interface with each other at abutment 69. The abutment 69 may generally be formed by the edges 67c, 68c of the polymeric sheets 67, 68, respectively, and may be a flush interface, or it may include some gap(s) and/or unevenness which may, for example, result from the manufacturing and/or joining process of bonding the polymeric sheets 67, 68 to the polymeric core 10a. In some embodiments, as illustrated in FIGS. 12e and 15e, a sealing feature 80 may be utilized to seal the edges 67c, 68c to the polymeric core 10a at the abutment 69 between the two polymeric sheets 67, 68. The sealing feature 80 may generally cover and/or fill in any gap(s) and/or unevenness that may be present at the interface and may also generally extend a given amount between the polymeric sheets 67, 68 and the polymeric core 10a. The polymeric sheets 67, 68 may also be pressed into the sealing feature 80 at the edges 67c, 68c to, for example, aid in filling in any gap(s) and/or unevenness at the abutment 69. In general, a sealing feature beneath the abutment 69, such as the sealing feature 80 as illustrated in FIGS. 12e and 15e, may be applied before the polymeric sheets 67, 68 are bonded to the polymeric core 10a, as the sealing feature 80 lies beneath the polymeric sheets 67, 68. The sealing feature 80 may include a sealing liquid, a sealing composition or a sealing tape and may also, in another example, be inserted, injected, pressed-in and/or otherwise interposed between the polymeric sheets 67, 68 and the polymeric core 10a after the polymeric sheets 67, 68 are bonded to the polymeric core 10a. In still another example, the sealing feature 80 may also be applied to one or both of the polymeric sheets 67, 68 prior to bonding and may thus bond to the polymeric core 10a at the same time the polymeric sheets 67, 68 are bonded to the polymeric core 10a. The sealing feature may include any of the above mentioned features, for example, a double side coated tape, a sealing liquid, a chemical sealing composition, a seal produced by a mechanical and/or heat sealing device, including an ultrasonic sealing device.

FIGS. 12f and 15f illustrate an embodiment of a load bearing structure 10 with a first polymeric sheet 67 and a second polymeric sheet 68 which may interface with each other at an overlap 69'. The overlap 69' may generally be formed by one of the edges 67c, 68c of the polymeric sheets 67, 68, respectively, overlapping the other, as illustrated with edge 68c lying atop edge 67c and may result, for example, from a second polymeric sheet being bonded to the polymeric core 10a after a first polymeric sheet. In some embodiments, as illustrated in FIGS. 12f and 15f, a sealing feature 70 may be utilized to seal an edge of a polymeric sheet to the polymeric core 10a, and/or to seal one edge of a polymeric sheet to the edge of the other polymeric sheet, such as the edge 68c to the polymeric core 10a and the edges 67c, 68c to each other, as illustrated. The sealing feature 70 may generally cover and/or fill in any gap(s) and/or unevenness that may be present at the overlap 69' and may also generally extend a given amount beneath one of the polymeric sheets 67, 68 and/or atop one of the polymeric sheets 67, 69. The polymeric sheets 67, 68 may also be pressed into the sealing feature 70 at the edges 67c, 68c to, for example, aid in filling in any gap(s) and/or unevenness at the overlap 69'. The sealing feature 80 in FIGS. 12g and 15g may be applied after one polymeric sheet is bonded to the polymeric core 10a and before the second polymeric sheet is bonded, such after polymeric sheet 67 is bonded and before polymeric sheet 68 is bonded. The sealing feature 80 may also be bonded to one polymeric sheet and applied with it, such as, for example, by applying the sealing feature 80 to the edge of polymeric sheet 68 prior to bonding the polymeric sheet 68 to the polymeric core 10a and to the polymeric sheet 67, which may be bonded before polymeric sheet 68. In another example, the sealing feature 80 may also be applied to one or both of the polymeric sheets 67, 68 prior to bonding and may thus bond to the polymeric core 10a at the same time the polymeric sheets 67, 68 are bonded to the polymeric core 10a. Suitable sealing features that may be applied prior to the complete bonding of one film to another and/or to the core may include a heat activatable composition or tape that is activatable at the temperature and/or pressure used for bonding the polymeric sheet 67 or 68 to the core 10a or to each other. The sealing feature 80 may also, in still another example, be inserted, injected, pressed-in and/or otherwise interposed between the polymeric sheets 67, 68 and/or the polymeric core 10a after the polymeric sheets 67, 68 are bonded to the polymeric core 10a. The sealing feature may or may not be activatable at the temperature and/or pressure of the bonding of the sheet 67 or 68 to the core 10a, as discussed above.

In another embodiment, as shown in FIGS. 12f-1 and 15h, the sealing feature 70 is present between the overlap portions 69' of sheets 67, 68. The sealing feature 70 may be any of the features described above. For a double-sided adhesive tape, it may generally be applied prior to the bonding of the second sheet 68 to the core and first sheet and the adhesive may be activated by the bonding process. The adhesive may be applied to the edge of the side of the second tape to be bonded to the core. For a sealing liquid, it may be applied after the bonding process.

FIGS. 12g and 15g illustrate an embodiment of a load bearing structure 10 with a first polymeric sheet 67 and a second polymeric sheet 68 which may interface with each other at an overlap 69'. The overlap 69' may generally be formed by one of the edges 67c, 68c of the polymeric sheets 67, 68, respectively, overlapping the other, as illustrated with edge 68c lying atop edge 67c and may result, for example, from a second polymeric sheet being bonded to the polymeric core 10a after a first polymeric sheet. In some embodiments, as illustrated in FIGS. 12g and 15g, a sealing feature 80 may be utilized to seal the edges of the polymeric sheets to each other, as illustrated with the edges 67c, 68c to each other. The sealing feature 80 may generally cover and/or fill in any gap(s) and/or unevenness that may be present at the overlap 69' and may also generally extend a given amount atop the polymeric sheets 67, 68. The sealing feature 70 in FIGS. 12g and 15g may be applied after the polymeric sheets are bonded to the polymeric core 10a, as the sealing feature 80 lies atop the overlap 69'. The sealing feature may or may not be activatable at the temperature and/or pressure of the bonding of the sheet 67 or 68 to the core 10a, as discussed above. A sealing liquid may be contained in a bottle or container having a dispensing tip or end. The liquid may be dispensed into the edges where the edges of the thermoplastic sheet meet the core surface or where the edges of the one thermoplastic sheet meet with the edges of a second thermoplastic sheet after the load bearing structure is made. As noted before, the sealing liquid may be a solvent for the core 10a and/or the thermoplastic film 67 or 68, and may slightly dissolve the material close to the surface of the core 10a or film 67 or 68.

In still other embodiments, as illustrated in FIG. 14e, a load bearing structure 10 with polymeric sheets 67, 68 and 68 may cover the top of the polymeric core 10a. The edge 68c of the polymeric sheet 68 may be overlapped with the edge of the sheet 67 (not visible here) to form a relatively flush interface, or it may include some gap(s) and/or unevenness which may, for example, result from the manufacturing and/or joining process of bonding the polymeric sheet 68 to the polymeric sheet 67 and the core 10a. A sealing feature may then be utilized to seal and/or cover the edge 68c of polymeric sheet 68 and/or extend onto the polymeric core 10a, as discussed above. The sealing feature may generally cover and/or fill in any gap(s) and/or unevenness that may be present at the interface and may also generally extend a given amount onto the polymeric sheet 68 and/or onto the polymeric core 10a to, for example, produce a more substantial and/or durable seal. In general, a sealing feature that covers the edge of the polymeric sheets whether there is an overlap portion 69a or not, and may be part of the polymeric core 10a, may be applied after the polymeric sheets 67, 68 is bonded to the polymeric core 10a, as the sealing feature lies atop the polymeric sheet 68. The sealing feature may include any of those mentioned above, for example, a single side coated tape.

Figure 26:
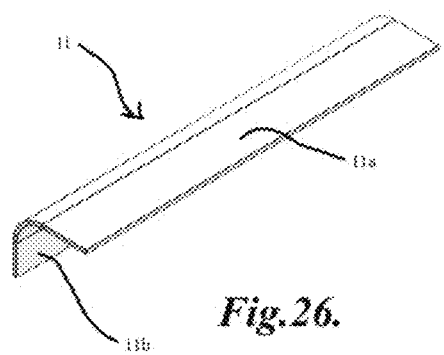
FIGS. 26 and 26a illustrate examples of L- and C-shaped edge protectors, respectively in embodiments of the present invention.
Figure 26A:
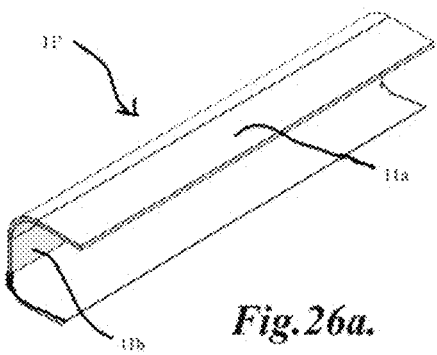

Also, in FIG. 14e, an indent may be present from the bottom edge or the core 10a to a portion of the width close to the bottom edge, to accommodate an edge protector 11, as shown in FIG. 26, or the indent may extend the entire width to a portion of the top (not shown here) to accommodate an edge protector 11', as shown in FIG. 26a. The indent may not be visible if the edge protector lies between the core and the polymeric sheet or sheets.

The sealing liquid may be applied as a sealing feature 70, 80, as described above, and may be applied before or after a polymeric sheet is bonded to the polymeric core. The sealing liquid may also be applied to the polymeric sheet(s). If the liquid is applied prior to the completion of the bonding of the film 67 or 68 to the core 10a or to each other, the sealing liquid may be activatable at the temperature and/or pressure of the bonding of the sheet 67 or 68 to the core 10a, as discussed above. In some embodiments, as described above, the sealing liquid may also be injected beneath the polymeric sheet after completion of the bonding of the sheet 67 or 68 to the core and/or each other and thus may not need to be activatable at the temperature and/or pressure of the bonding of the sheet 67 or 68 to the core 10a, as discussed above. FIGS. 13 and 13a illustrate an example of injecting a sealing liquid under a polymeric sheet 68 which is already bonded to a polymeric core 10a. FIG. 13 shows an overlap portion between sheets 67, 68 (though not visible here) and the sealing liquid being injected using a syringe 50 beneath the edge 68c to bond the edge 68c to the edge of the sheet 67 and/or part of polymeric core 10a. The edge 68c may then be pressed down, such as by hand or using a pressing tool and/or device, as illustrated in FIG. 13a with a person's finger 90 pressing, to, for example, reduce any unevenness and/or gaps at the edge 68c and/or to create a more continuous seal.

A sealing chemical composition may be in treated solid or native liquid form, or even in slurries, and may generally be applied to the edges of the polymeric sheet before its bonding to the core and its sealing property may generally be activated during the bonding process, as discussed above. In one embodiment, the chemical composition in liquid form may be encapsulated in a capsule. The capsules do not adhere to each other so that they come in free flowing forms. However, the capsules may adsorb or be attracted to the surface of the foam or polymeric sheet so that they may be applied, for example, by sprinkling onto the surfaces to be sealed prior to the bonding process. The composition may be activated by heat and/or pressure during the bonding process of the core to the sheet. In another embodiment, the chemical composition may be applied directly in liquid form, similar to the application of the sealing liquid, discussed above, and may or may not need to be activatable at the temperature and/or pressure of the bonding of the sheet 67 or 68 to the core 10a, as also discussed above. For example, as noted above, the liquid chemical composition may also be mixed with polymeric particles to form slurry. In this embodiment, when the polymeric sheets are made from high impact polystyrene, then the powder is powdered polystyrene. The sealing liquid may be relatively non-volatile so that the liquid is not substantially evaporated prior to the bonding process between the sheet with the core and/or sheet. The chemical sealing composition may also include a self-healing and/or self-repairing composition. This may be desirable as the sealing features may be present in high stress, high damage and/or high wear areas and may increase in effectiveness and/or usage life of the load bearing structures through the use of self-healing/self-repairing materials.

Figure 14:
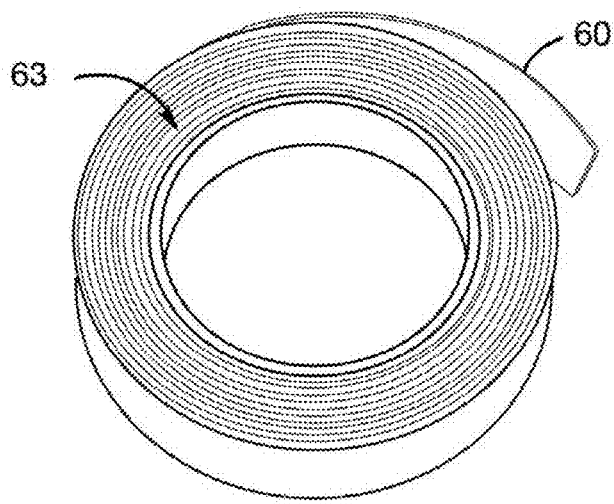
Figure 14A:
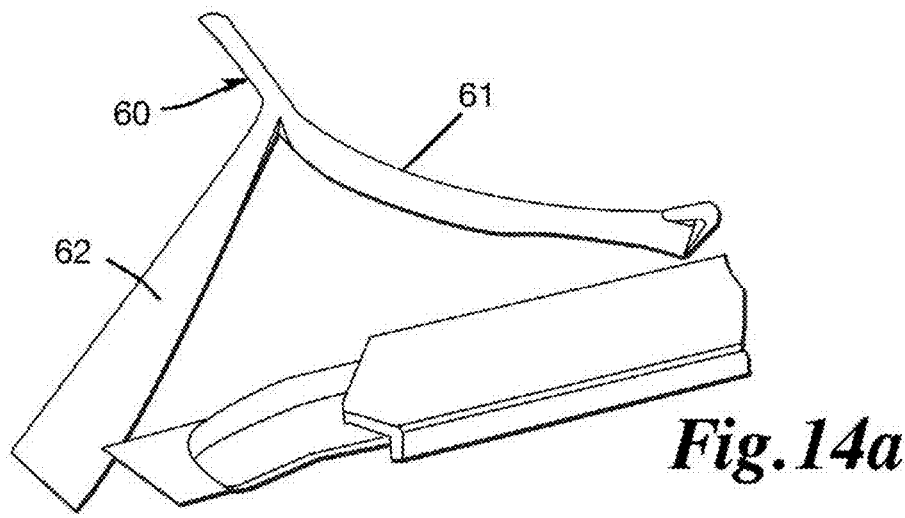
Figures 1, 14A:
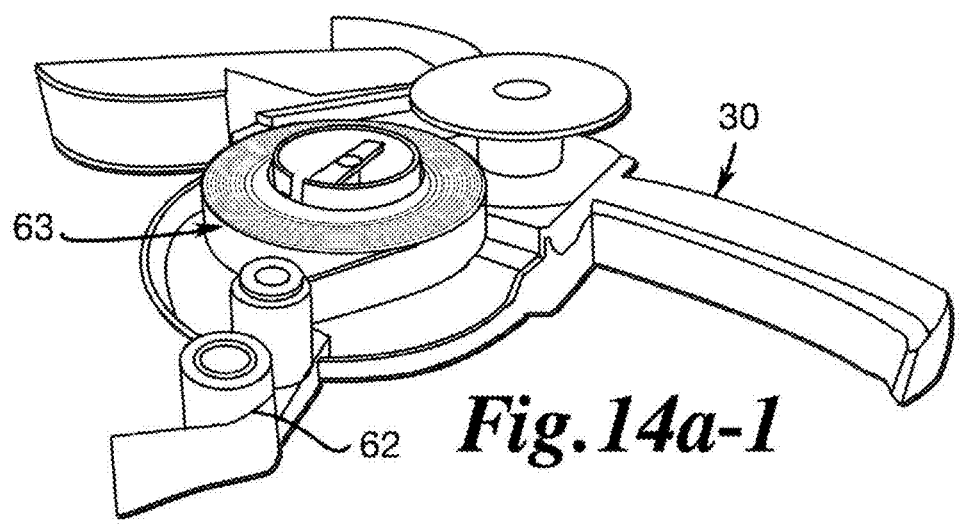
Figure 14B:
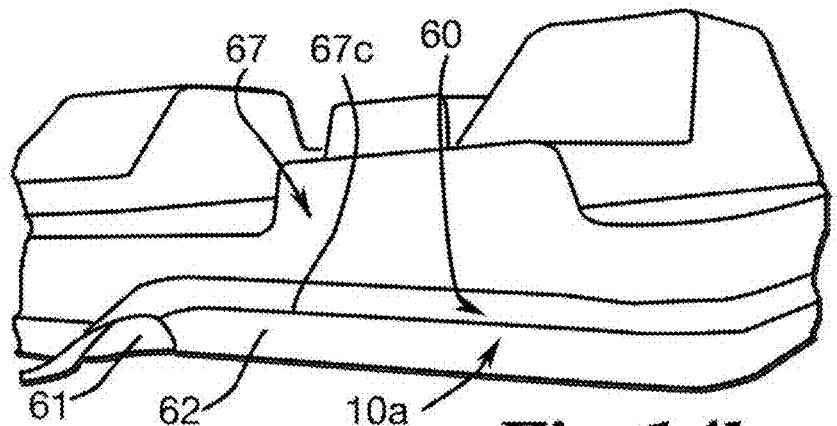
FIGS. 14b and 14c illustrate application of a tape at the edge of a polymeric sheet bonded to a polymeric core of a load bearing structure in an embodiment of the present invention.
Figure 14C:
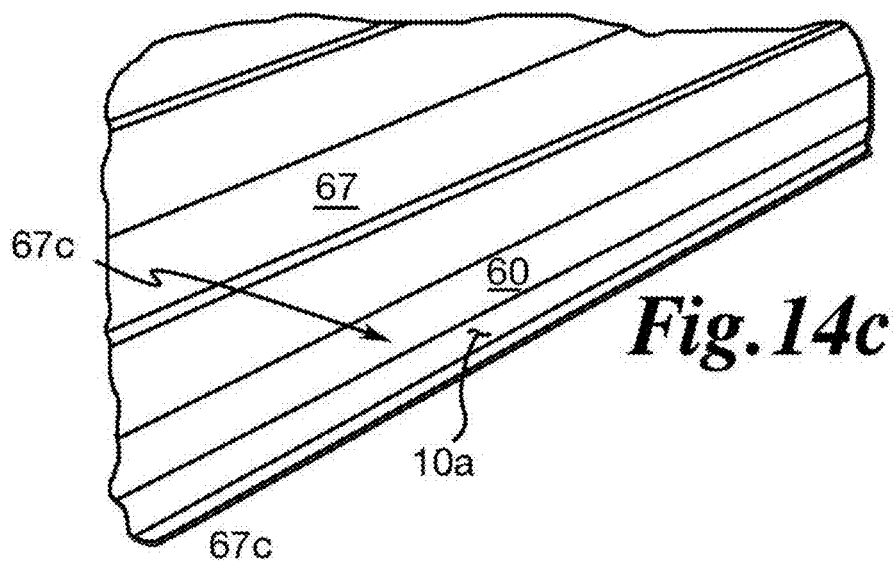

When a sealing tape is used, the tape may include one side having a contact or tacky adhesive and another side with a heat activatable adhesive. The tacky or contact adhesive side may be covered by a liner and the tape may be wound into a roll, as shown in FIG. 14. The roll 63 of tape 60 may then be unrolled and the liner 61 removed, either manually or using a tape dispenser, to expose the tacky or contact adhesive surface 62, as shown in FIG. 14a and with an example of a tape dispenser 30 in FIG. 14a-1. The tape 60 as shown may be double-coated or single-coated tape and may include a liner, may then act as a sealing feature, such as the sealing features 70, 80, and be applied to the edge of a polymeric sheet and/or polymeric core, as discussed above and as shown with the tape 60 applied over the edge 67c of polymeric sheet 67 and onto polymeric core 10a with the liner 61 being removed to expose the tacky or contact adhesive surface 62 in FIGS. 14b and 14c. In some embodiments, the tape 60 may be double-sided and in other embodiments, the tape 60 may be one-sided, such as the tape 60 in FIG. 14d and may be applied over the bonded interface.

The heat activatable adhesive may include hot melt adhesive, a heat curable adhesive, or a reactive adhesive, on the other side. The heat activatable adhesive may be selected to be activated at the temperature during the bonding process.

In some embodiments, the sealing features 70, 80 may include a self-healing and/or self-repairing composition, as mentioned above. This may be desirable as the sealing features 70, 80 may be present in high stress, high damage and/or high wear areas and may increase in effectiveness and/or usage life of the load bearing structure through the use of self-healing/self-repairing materials. For example, some polymers are capable of healing and/or repairing tears and/or other damage by contact repolymerization and/or contact adhesion of adjacent edges of the polymer material. This may include, for example, polymers which repolymerize with themselves when exposed to ultraviolet light and/or other electromagnetic radiation and/or heat. For example, polyurethane-chitosan blended polymers may repolymerize using ultraviolet light to heal tears and/or other discontinuities. For further example, a new class of polymers formed from a condensation reaction between paraformaldehyde and 4,4'-oxydianiline developed by IBM may also be utilized. As noted above, the self-healing and/or self-repairing composition may be present in any of the various sealing features discussed.

In other embodiments, the sealing features 70, 80 may include a melted, welded, sintered and/or other heat/pressure joining of the materials in the polymeric sheet(s), such as polymeric sheets 67, 68, and/or the polymeric core 10a. For example, ultrasonic welding may be utilized to melt and/or join the edges of the polymeric sheet(s) together and/or to the polymeric core 10a by localized heating. The joining area may also be subjected to pressure.

In some embodiments, as illustrated in FIGS. 12h-12m, the polymeric sheets may be folded over each other at an interface. The interface may further be subjected to heat, pressure and/or a vacuum to assist in the joining the polymeric sheets together at the fold and/or to bond them to the polymeric core. In one embodiment, a retaining device may be utilized to hold at least one of the polymeric sheets and/or the polymeric core in place to accomplish the folding and sealing of the polymeric sheets, as illustrated with retaining device 40 in FIG. 12h. The polymeric core 10a may sandwich a first polymeric sheet 67 against the retaining device 40. The first polymeric sheet 67 may, for example, be rigid enough at this stage to remain substantially vertical during the bonding process until subjected to additional heat, pressure and/or mechanical force to cause it to fold. The first polymeric sheet 67 may, for example, be held in place vertically while it is being bonded to the polymeric core 10a (not shown), such that it may be in the proper vertical orientation at its edge when it cools and regains rigidity. In some embodiments, as illustrated in FIG. 12h, the polymeric core 10a may also include a chamfered edge 12', which may, for example, be chamfered at approximately 45 degrees, such as, for further example, to assist in folding of the polymeric sheets. A second polymeric sheet 68 may be placed on the polymeric core 10a and it may also be draped over the vertical edge of the first polymeric sheet 67 to form a pocket area 45, as shown in FIG. 12i. The second polymeric sheet 68 may also be affixed to the retaining device 40, such as at edge 68d, for example, to aid in holding the polymeric sheet 68 in place during folding. Once the polymeric sheets 67, 68 are in position, they may be folded over each other, an example of which as illustrated in FIG. 12j. For example, the end portion 67d of the polymeric sheet 67 may be folded toward the chamfered edge 12' while a crease 68e of the polymeric sheet 68 may be folded into the pocket area 45. This folding operation may be assisted by heating the polymeric sheets 67, 68, applying pressure and/or mechanical force to the area, and/or applying a vacuum, such as at pocket area 45. Once the folding is completed, as illustrated with the sandwiched fold of end portion 67d and crease 68e in FIG. 12k, the fold may be sealed using heat and/or pressure, such that, for example, the polymeric sheets 67, 68 bond together, such as by melting, welding, and/or otherwise adhering to each other. Adhesives, such as heat activated adhesives, may also be present in the area and activated by heat application to the fold to assist in creating a sealed interface. The excess material of the polymeric sheet 68 may then be trimmed off, leaving a trimmed edge 68f, which may be away from the load bearing area, as shown in FIG. 12l. The finished interface, as illustrated in a close up view in FIG. 12m, may thus include, for example, the polymeric sheet 67 sandwiched between 2 layers of polymeric sheet 68 at the chamfered edge 12', with trimmed edge 68f away from the interface. The edges may also be bonded with a sealing feature to aid in bonding imperfections, as discussed above.

Figure 25:
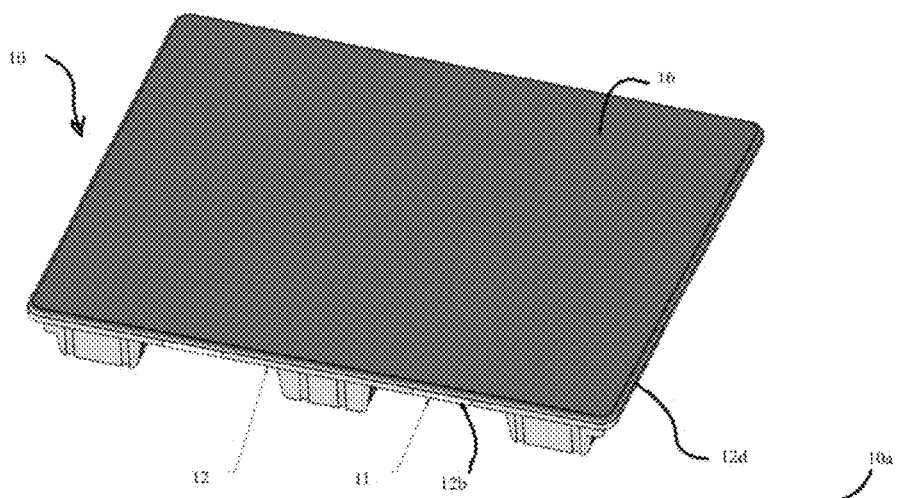
FIG. 25 illustrates a load bearing structure with edge protectors and a guiding groove in an embodiment of the present invention.

In some embodiments, the load bearing structure 10 may also include grooves, détentes, and/or other physical features for denoting where the polymeric sheet(s) may be trimmed and/or cut, an example of which is illustrated with groove 12d in FIG. 25. The groove 12d may be present around the entire periphery of the width 12, such that, for example, there may be a physical feature to guide trimming the polymeric sheet(s). This may be desirable, for example, where there may be only one polymeric sheet bonded to the polymeric core, and the edge of the polymeric sheet may thus be trimmed short of the load bearing surface 16 such that the edge does not cover part of the load bearing surface 16, such that the edge of the polymeric sheet may not catch cargo while it is loaded and/or unloaded.

Figure 24:
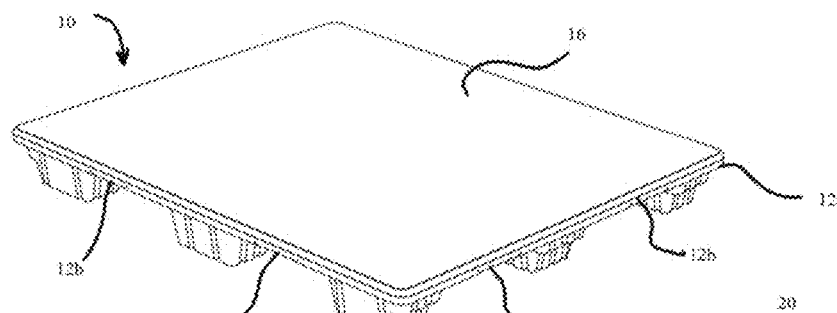
FIGS. 24 and 24a-24c illustrate a load bearing structure with depressions for accommodating edge protectors to accommodate cargo-holding items in an embodiment of the present invention.
Figure 24A:
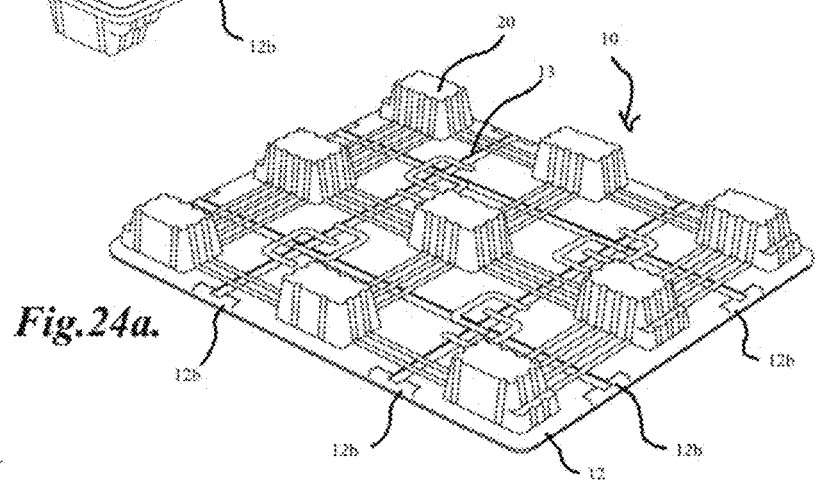
Figure 24B:
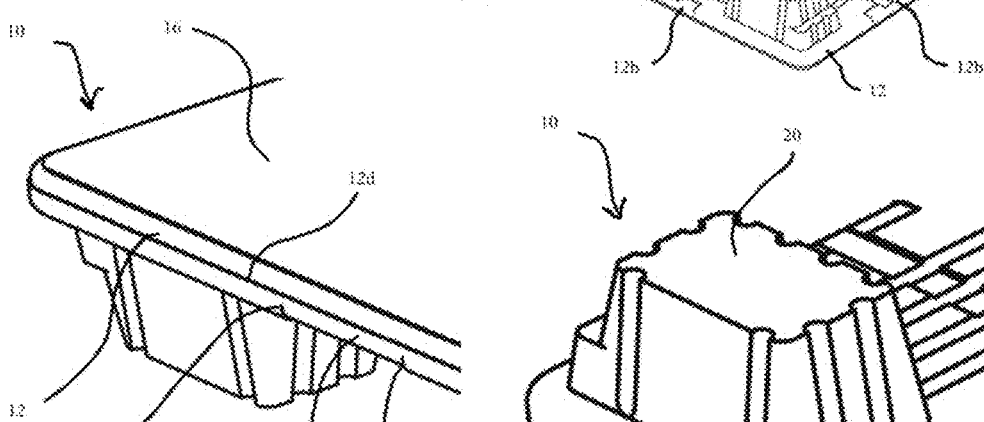
Figure 24C:
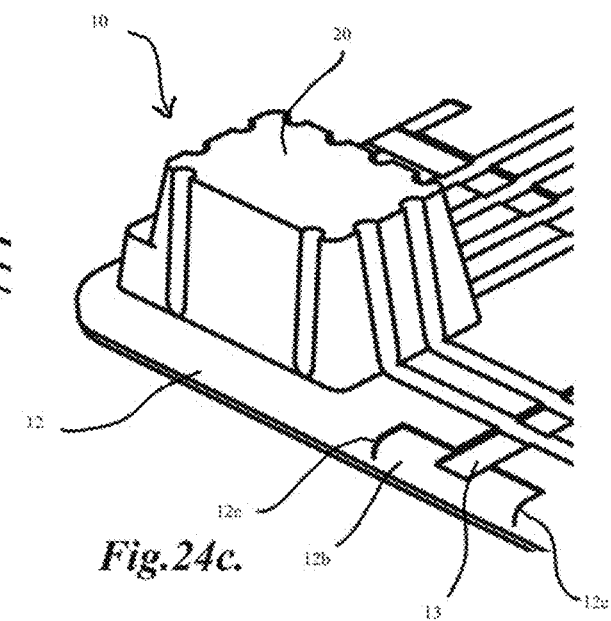
Figure 24D:
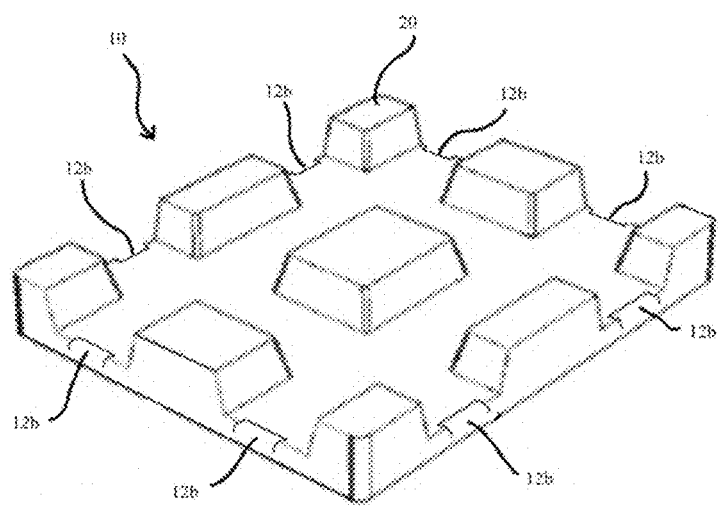
FIG. 24d illustrates a load bearing structure with extensions or supports and depressions for accommodating edge protectors without guide grooves in an embodiment of the present invention.
Figure 24E:
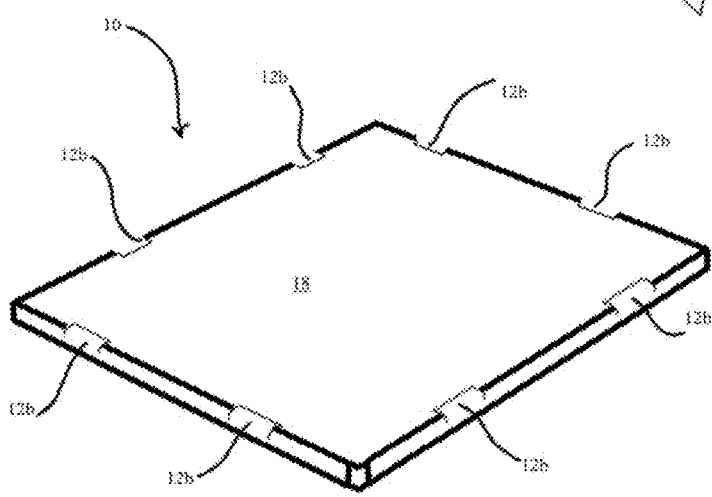
FIG. 24e illustrates a load bearing structure with depressions for accommodating edge protectors without guide grooves or extensions or supports in an embodiment of the present invention.

In some embodiments, as discussed above, edge protecting features, including but not limited to such as shown in FIGS. 26 and 26a, may also be used on the load bearing structures. In one aspect of the invention, when cargo is loaded onto the load bearing structure, the cargo on its surface may be, for example, held in place by cargo-holding items, such as straps, tiedowns, cables, ropes and/or other items. In an exemplary embodiment, the load bearing structure may be reinforced at places or continuously with protectors 11 or 11', such as where the cargo-holding items contact and/or wrap around the load bearing structure in predetermined areas or anywhere on the load bearing structure. In some embodiments, the protectors may be edge protectors which may be located substantially at the periphery of the load bearing structure. This may be desirable as, for example, the bottom edge and portion of the width close to the bottom edge of the load bearing structure generally bear the substantial force of the cargo-holding items when used. In one embodiment, the protectors may be present intermittently at predetermined positions on the load bearing structure 10, as shown in FIG. 25 with depressions 12b and edge protectors 11, where reinforcement may be needed. For example, the protectors may distribute force and/or pressure from cargo-holding items across a larger area on the load bearing structure and/or reinforce the areas where the cargo-holding items are used. The protectors may also, for example, be harder than the underlying portion of the load bearing structure which may, for further example, better distribute the force onto the load bearing structure without significant flexing, deformation or damage. In other embodiments, the protectors may be present on the entire periphery of the load bearing structure rather than intermittently. Cargo-holding items may be used at these same predetermined locations or other locations to help keep the cargo in place. FIG. 24 illustrates an embodiment of a load bearing structure 10 which may generally include a top side 16 where cargo may be loaded (not shown), and a width 12 which may be perpendicular or substantially perpendicular to the top side 16. In some embodiments, the load bearing structure 10 may also be utilized with edge protectors. FIG. 24 illustrates the load bearing structure 10 which may include multiple depressions 12b along the width 12 where edge protectors may be placed. In general, the depressions 12b may be sized to accommodate the edge protectors, such as for example, such that the edge protectors lie flush with the surface of width 12. The depressions 12b may be placed at regular and/or predetermined intervals about the width 12 and may generally be located where cargo-holding items may be in contact with the load bearing structure 10. In some embodiments, as illustrated in FIG. 24a, the bottom side of the load bearing structure 10 may include channels 13 which cargo-holding items may rest in. The depressions 12b may thus be located at the ends of the channels 13, as illustrated. The depressions 12b may generally have end edges 12c, as shown in FIGS. 24b and 24c. In other embodiments, the load bearing structure 10 may include depressions 12b and the bottom side of the load bearing structure 10 may not include the channels 13, as illustrated in FIGS. 24d and 24e. The edges 12c may be somewhat more visible than the rest of the depression 12b and may aid in locating the depression 12b and/or the edge protector when it is in place.

FIG. 25 illustrates an example of a load bearing structure 10 with edge protectors 11 in place at the depressions 12b, as noted above.

As discussed, the end edges 12c of the depressions 12b may be present on the polymeric core 10a and the edge protectors may be placed in the depressions 12b between the end edges 12c, such that they may be flushed or substantially flushed with the rest of the polymeric core 10a. After covering with the polymeric film or sheet, the protectors may or may not be easily visible and/or discernable. If the protectors themselves are not visible or discernable when in place on the polymeric core 10a, indicator features may be present, such as, for example, the end edges 12c may be visible as lines and/or discernable by tactile inspection as a thin indentation.

Figure 25A:
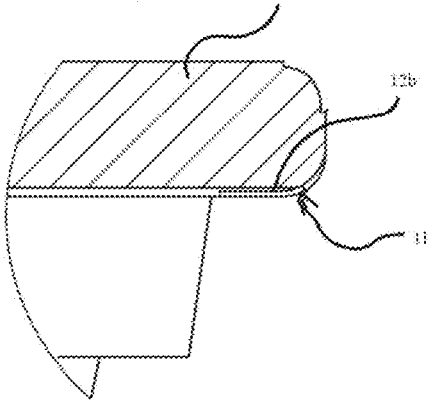
FIGS. 25a, 25b and 25c show partial cross-section views of load bearing structures with examples of edge protectors sitting in depressions in an embodiment of the present invention.

In some embodiments, the edge protectors may have an L-shaped cross-section, such as illustrated with the L-shaped edge protector 11 with an outer surface 11a which may, for example, contact the cargo-holding item, and an inner surface 11b which may contact the depression 12b, as shown in FIG. 26. The L-shaped edge protector 11 may be present either intermittently or continuously around the bottom and width of the core in a fashion that they envelope a portion of the bottom side near the outer edge to wrap around the edge and extending to cover a portion of the width close to the bottom side, as illustrated partial cross-sectional view of a load bearing structure 10 in FIG. 25a with the L-shaped edge protector 11 sitting in depression 12b on the core 10a.

Figure 25B:
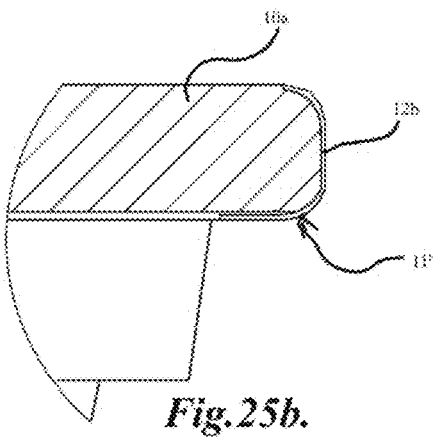
Figure 25C:
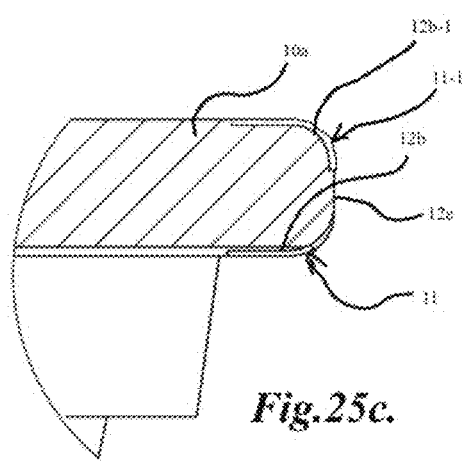

In other embodiments, the edge protectors may have a substantially C-shaped cross-section, as illustrated with C-shaped edge protector 11' with an outer surface 11a which may, for example, contact the cargo-holding item, and an inner surface 11b which may contact the depression 12b, as shown in FIG. 26a. The C-shaped edge protector 11' may be present either intermittently or continuously around the bottom, width and top of the core in a fashion that they envelope a portion of the bottom side near the outer edge to wrap around the edge and extending to cover the width and a portion of the top side close to the width, as illustrated in the partial cross-sectional view of load bearing structure 10 with the C-shaped edge protector 11' wrapped around the width 12 and sitting in depression 12b in FIG. 25b. According to a further embodiment, the edge protectors may come in pairs each having a substantially L-shaped cross-section, and may be present either intermittently or continuously around the bottom, width and top of the core in a fashion that one of the pair envelopes a portion of the bottom side near the outer edge to wrap around a portion of the edge and the other extending to cover a portion of the width near the top side and a portion of the top side close to the width, which may then appear similar to the C-shaped edge protector 11'. The pair may or may not meet when placed on the load bearing structure 10. In other embodiments, the load bearing structure 10 may include separate depressions for the upper and lower edges of the width 12, such as shown in the partial cross-sectional view of the load bearing structure 10 in FIG. 25c with upper depression 12b-1 and lower depression 12b, with an edge protector 11-1 and 11 sitting in each, respectively, with a separating portion 12e of width 12 being exposed between the edge protectors 11, 11-1.

In some embodiments, edge protectors may also include guides and/or other features for holding a cargo-holding item, as illustrated in FIGS. 27 and 27a. As illustrated, the edge protector 11" may include guides 11c which may be utilized to guide and keep in place cargo-holding items, such as the strap 9 holding cargo 490 on the load bearing structure 10 as illustrated in FIG. 27a. This may be desirable to, for example, aid in preventing the strap 9 from moving or sliding laterally. The guides 11c may also protrude and aid in visibility of the edge protector 11" such that the cargo-holding items may be positioned over them.

In some embodiments, the protector(s) may be present on the core prior to the covering of the core by the polymeric sheet, as discussed above. In one aspect, the core may be indented to accommodate the protectors so that the protectors are flushed with the core so that the sheet may cover the core with protectors as if the protectors are not present, as discussed and illustrated above with FIGS. 24-26a. In another aspect, the core may be indented but not sufficiently to accommodate the entire thickness of the protectors so that after covering with the sheet, there may be a slight bulge where the protectors are present, which can be seen with edge protectors 11" protruding as a bulge in FIGS. 27 and 27a. In another embodiment, the protectors may be added after the core is covered with the polymeric sheet or sheets.

The protectors may be constructed from any polymeric or metallic materials, or combinations thereof, that may be easily molded or cast into the desired shape and are rigid or substantially rigid or possess sufficient reinforcement for the edges. In one embodiment, when the protectors are present on the core prior to the covering of the core by the polymeric sheet or sheets, the protectors may be made of same or material having similar bonding properties as the sheet to facilitate the bonding of the protector both to the sheet and/or core at the bonding temperature of the sheet to the core. This may be further desirable as the load bearing structure may be more easily and/or readily recycled when composed of substantially a single material. When the edge protectors are present on the core, the polymeric sheet or sheets may or may not be combined or bonded to the edge protectors if the edge protectors are not made with similar material or the edge protectors are not combined or bonded to the polymeric sheet or sheets, the outer edges of the sheet may be bonded to the edge protector by the sealing feature.

In another embodiment, when the protectors are added to the load bearing structure after bonding of the sheet or sheets to the core, any material may be used for the protectors.

In addition to the same or similar materials to the polymeric sheets, suitable materials for the edge protectors, especially those that are present on the load bearing structure after the bonding of the core to the sheet or sheets, may include any metallic and polymeric material, as long as such material may be fabricated into the resulting rigid or substantially rigid parts. Examples of appropriate materials may include, but are not limited to, for example, a polymer that may be molded, thermoformed or cast. Suitable polymers include polyethylene; polypropylene; polybutylene; polystyrene; polyester; polytetrafluoroethylene (PTFE); acrylic polymers; polyvinylchloride; Acetal polymers such as polyoxymethylene or Delrin (available from DuPont Company); natural or synthetic rubber; polyamide, or other high temperature polymers such as polyetherimide like ULTEM®, a polymeric alloy such as Xenoy® resin, which is a composite of polycarbonate and polybutyleneterephthalate, Lexan® plastic, which is a copolymer of polycarbonate and isophthalate terephthalate resorcinol resin (all available from GE Plastics); liquid crystal polymers, such as an aromatic polyester or an aromatic polyester amide containing, as a constituent, at least one compound selected from the group consisting of an aromatic hydroxycarboxylic acid (such as hydroxybenzoate (rigid monomer), hydroxynaphthoate (flexible monomer), an aromatic hydroxyamine and an aromatic diamine, (exemplified in U.S. Pat. Nos. 6,242,063, 6,274,242, 6,643,552 and 6,797,198, the contents of which are incorporated herein by reference), polyesterimide anhydrides with terminal anhydride group or lateral anhydrides (exemplified in U.S. Pat. No. 6,730,377, the content of which is incorporated herein by reference) or combinations thereof Some of these materials are recyclable or be made to be recyclable. Compostable or biodegradable materials may also be used and may include any biodegradable or biocompostable polyesters such as a polylactic acid resin (comprising L-lactic acid and D-lactic acid) and polyglycolic acid (PGA), polyhydroxyvalerate/hydroxybutyrate resin (PHBV) (copolymer of 3-hydroxy butyric acid and 3-hydroxy pentanoic acid (3-hydroxy valeric acid) and polyhydroxyalkanoate (PHA) copolymers, and polyester/urethane resin. Some non-compostable or non-biodegradable materials may also be made compostable or biodegradable by the addition of certain additives, for example, any oxo-biodegradable additive such as D2W™ supplied by (Symphony Environmental, Borehamwood, United Kingdom) and TDPA® manufactured by EPI Environmental Products Inc. Vancouver, British Columbia, Canada.

In addition, any polymeric composite such as engineering prepregs or composites, which are polymers filled with pigments, carbon particles, silica, glass fibers, or mixtures thereof may also be used. For example, a blend of polycarbonate and ABS (Acrylonitrile Butadiene Styrene) may be used. For further example, carbon-fiber and/or glass-fiber reinforced plastic may also be used.

Useful metals or metallic materials may include metal and metal alloys such as aluminum, steel, stainless steel, nickel titanium alloys and so on.

To aid to keep the protectors on the core prior to bonding and during the bonding process, an adhesive or double-coated adhesive tape may be used. This may be desirable as, for example, the protectors may not significantly adhere and/or grip the load bearing structure prior to the bonding process. Examples of the adhesive may include pressure sensitive adhesive, for example, a hot melt pressure sensitive adhesive or a non-hot melt pressure sensitive adhesive. Examples of double-coated tape may include double coated pressure sensitive adhesive tape, for example, a double-coated hot pressure sensitive tape or a double-coated non-hot melt pressure sensitive tape. The thickness of the adhesive or tape may be thin so that it does not contribute to the thickness of the edge protectors substantially and/or to prevent the edge protectors from protruding significantly from the surface of the load bearing structure. In some embodiments, the adhesive or tape may be substantially melted during the bonding process. The amount of adhesive or tape may also be minimal as to not contribute significantly to the overall material composition of the load bearing structure, as this may be further desirable as the load bearing structure may be more easily and/or readily recycled when composed of substantially a single material.

In other embodiments, the protectors may use friction fits, roughened and/or textured contact surfaces and/or other mechanical means for attaching and/or holding them in place on the load bearing structure.

To keep the edge protectors firmly in place when the protectors are present after the bonding process, a structure adhesive may be used, such as those used in edge sealing described above or later, so that the edge protectors do not detach or move about during and after strapping to keep the cargo in place.

The protectors may have any thickness, as long as they provide the needed reinforcement for the edges. Some materials possess higher rigidity than others and therefore thinner protectors may have sufficient rigidity. For those that are more flexible, thicker components may be needed to provide sufficient rigidity.

The edge protectors may be manufactured by molding or casting. In one embodiment, the edge protectors may be made in bulk and then cut to size. In another embodiment, the edge protectors may be individually made to size. The substantially L-shaped edge protectors 11 and the substantially C-shaped edge protectors 11' may also be desirable as the continuous cross-sectional shape may allow them to formed by extrusion as a continuous length which may be cut to size.

The loading bearing structure of the present invention, which may be a dunnage platform or container, may have anti-microbial properties. Antimicrobial means an agent that is active against one or more organisms including bacteria, viruses, fungi, protists, helminths and insect larvae. Foreign hosts mean a microbe, pathogen or organisms that can be transported on a surface of a load bearing structure. The antimicrobial agent may be in powder form or in liquid form.

In one exemplary embodiment, an antimicrobial agent capable of eliminating, preventing, retarding or minimizing the growth of microbes may be present on the exposed surfaces, for example, top side 16, the width 12a and/or the bottom side 18 of loading bearing structure 10, as shown in FIG. 1.

In any of the embodiments, the antimicrobial properties may be generated from materials including chemical antimicrobial materials or compounds that are capable of being substantially permanently bonded, at least for a period such as the useful life of the load bearing structures, either when at least one antimicrobial agent is added to the material used for making the polymeric layer, for example, a sheet mentioned above, or when at least one antimicrobial agent having some surface activity is coated onto the exposed surface of the polymeric layer, for example, sheet mentioned above; or maintain their anti-microbial effects when at least one antimicrobial agent is coated with the aid of coating agents, onto the exposed surface of the polymeric layer, for example, sheet mentioned above. In one example, the chemicals may be deposited on the surface of the loading bearing structures by covalent linkage.

When the antimicrobial agent or agents are incorporated in the material used in making the polymeric layer, for example, a sheet, the agent or agents maybe dispersed directly into the material, or with the aid of an appropriate carrier, for example, a binding agent, a solvent, or a suitable polymer mixing aid. These carriers may also be useful for coating aids mentioned above. Effective binding agents are those that do not interfere with the antimicrobial activities of the antimicrobial agent. In one embodiment, when the anti-microbial agent is incorporated into the material used for making the polymeric layer, for example, a sheet mentioned above, the antimicrobial agent maybe master batch in the material, or an appropriate carrier at a higher concentration prior to adding to the material for making the polymeric layer, for example, a sheet in desired proportions. In another embodiment, the antimicrobial agent may be added directly to the material for making the polymeric layer, for example, a sheet without the intermediate step.

In other embodiments, the antimicrobial agents, either in coatings or incorporated into the materials for making the polymeric layer, may include chemical antimicrobial materials or compounds that may be deposited in a non-permanent manner such that they may slowly dissolve, slowly leach or otherwise deliver antimicrobial substances during use. The material may be adequately incorporated, though temporarily and/or in sufficient amounts to last at least for a period such as the useful life of the load bearing structures, either when at least one antimicrobial agent is added to the material used for making the polymeric layer mentioned above, or when at least one antimicrobial agent is coated onto the exposed surface of polymeric layer, for example, the sheet mentioned above; or maintain their anti-microbial effects when at least one antimicrobial agent is coated with the aid of coating agents, onto the exposed surface of the polymeric layer, for example, a sheet mentioned above. The suitable agent or agents are those that tend to slowly migrate or non-leaching, as defined herein, to the surfaces to provide antimicrobial properties to the surfaces.

In still other embodiments, the antimicrobial agent either in coatings or incorporated into the material used for making the polymeric layer, may include sources of anti-microbial agents which may leach and/or release agents in a moist environment or upon contact with moisture. These sources may be incorporated into the substrate materials used for manufacturing the polymeric layer, for example, sheet mentioned above. Incorporation of these sources may be especially suited to polymeric substrates.

Chemical antimicrobial materials or compounds may include a variety of substances including, but not limited to antibiotics, antimycotics, general antimicrobial agents, quaternary ammonium cations, a source of metal ions such as metal ion generating materials, triclosan, chlorhexidine or any other materials capable of generating an antimicrobial effect, and/or any other appropriate compound or mixtures thereof.

In yet further embodiments, antimicrobial activity may be achieved by utilizing the antimicrobial properties of various metals, especially transition metals which have little to no effect on humans. Examples may include sources of free silver ions, which are noted for their antimicrobial effects and few biological effects on humans. Metal ion antimicrobial activity may be created by a variety of methods that may include, for example, mixing a source of a metal ion with the polymeric layer, for example, sheet material during manufacture, coating the surface by methods such as plasma deposition, loosely complexing the metal ion source by disrupting the surface of the polymeric layer, for example, coating or sheet to form affinity or binding sites by methods such as etching or coronal discharge, and depositing a metal onto the surface by means such as electroplating, photoreduction and precipitation. The coated surface may then slowly release free metal ions during use that may produce an antimicrobial effect.

In some embodiments, the source of metal ions may be an ion exchange resin. Ion exchange resins are substances that carry ions in binding sites on the surfaces of the material. Ion exchange resins may be impregnated with particular ion species for which it has a given affinity. The ion exchange resin may be placed in an environment containing different ion species for which it has a generally higher affinity, causing the impregnated ions to leach into the environment, being replaced by the ion species originally present in the environment.

In one embodiment, the polymeric layer may include an ion exchange resin containing a metal ion source, such as, for example, silver. Ion exchange resins containing metal ion sources may include, for example, Alphasan® (Milliken Chemical), which is a zirconium phosphate-based ceramic ion exchange resin containing silver. An ion exchange resin may be coated onto the polymeric layer or it may be incorporated into the material of the sheet or sprayed coating, as discussed above.

In some embodiments, a layer of substantially non-permanent coating including an anti-microbial compound may be present on top of a layer of a substantially permanent coating including an anti-microbial compound.

The substantially permanent anti-microbial coating may be, for example, substantially flexible so that the coating substantially covers the working surfaces of the loading bearing structure during use even if the structure flexes. If the anti-microbial compound is not capable of forming a substantially flexible coating by itself, then a binding agent capable of forming a substantially flexible coating may be used to aid in the flexibility of the resulting coating.

The details of antimicrobial coatings and agents can be found in U.S. patent application Ser. No. 13/549,474, entitled "A LOAD BEARING STRUCTURE HAVING ANTIMICROBIAL PROPERTIES", the contents of which are hereby incorporated by reference in their entirety.

The load bearing structure may also include a plurality of bridges, runners, wear resistant members and/or connectors that may be affixed to the second side of at least some of the extensions or supports 20-28 of all of the embodiments of loading bearing structures described herein. Wear resistant members may generally be attached to the bottom of some of the plurality of supports so that they may protrude from the bottom of the supports and aid in the wear of the supports. Details of the wear resistant members may be found in U.S. Pat. Nos. 7,908,979, and 5,868,080, the contents of all of which are hereby incorporated by reference.

These wear resistant members may be similar to bridges or runners that extend between adjacent extensions or supports. In some embodiments, only one of these members may be present. In other embodiments, two of these may be arranged in the shape of a cross. In further embodiments, one of each may be attached to each pair of adjacent extensions or supports around the peripheral of the load bearing structure. In still other embodiments, they may be attached to every pair of extensions or supports of the load bearing structure.

Figure 21:
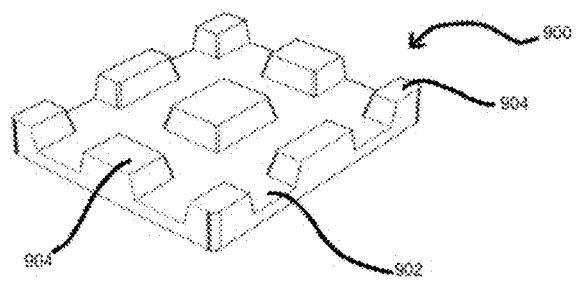
FIGS. 21 and 21a-e illustrate embodiments of the present invention of bases with different extensions or supports.
Figure 21A:
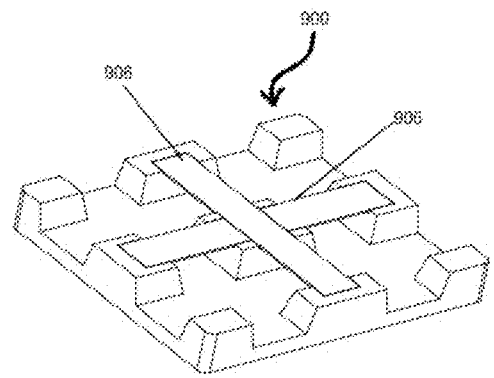
Figure 21B:
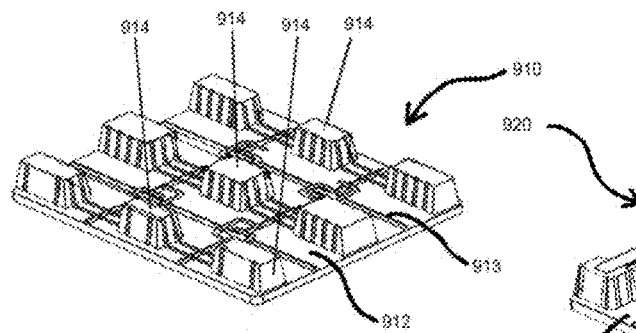

Runners, bridges and/or other connectors may also be included, such as, for example, connecting multiple supports, which may generally increase the strength and/or rigidity of the base. FIG. 21*a* illustrates an example of crossed runners 906 connecting multiple extensions or supports 904. FIG. 21 illustrates an example of runners 926 connecting sets of three extensions or supports 924 along two edges. FIG. 21*d* illustrates an example of runners 916 connecting three sets of extensions or supports 914 in a parallel arrangement. In general, any desired combination of extensions or supports may be connected by runners or bridges. The runners or bridges may be manufactured from any suitable material. For example, the bridges may be constructed from wood, metal and/or various plastics materials, including those mentioned above for manufacturing the film covering, including polyolefins, polyesters, lead free PVC, etc. In some embodiments, the runners or bridges are manufactured from HIPS (high impact polystyrene) using an extrusion forming process. Further, the bridges may be configured so that they each span two or more supports of a row and may be affixed to the ends of said supports so that they interconnect. For example, the bridges may be affixed using a suitable adhesive.

Figure 21C:
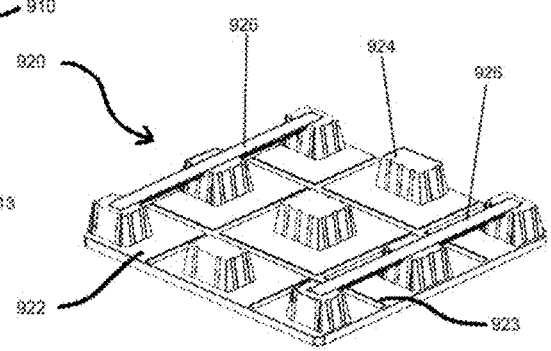
Figure 21D:
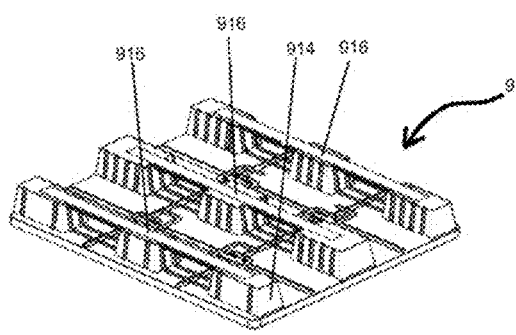

As mentioned above, the runners or bridges may be attached to the bottom of the supports, either flushed with the bottom portions of the supports, for example, attached within an indented portion formed in the bottom of the supports, such as shown in FIGS. 21c and 21d, or protruded from the bottom portions of the supports, such as shown in FIG. 21a, and thus improves the wear and tear of the supports. In addition, the bottom of the runners or bridges may also be roughened to improve slip resistance of the base.

For light weight load bearing structures, the core 10a is generally made of foam, for example, a closed cell foam core 10a such as an expanded polystyrene core 10a with a region proximal to its surface that is combined with a polymeric layer, for example, high impact polymeric sheet 67, for example, a polystyrene sheet, by heat and/or pressure.

The foam core 10a may be made from already manufactured bulk form, such as expanded polystyrene foam which may be cut to the desired shape and size. The foam density may also be varied, depending on the degree of expansion of the beads used to make the foam. The foam density may also decide the suitable load or cargo to be loaded.

The foam core in general by itself, unless it is of higher density, for example, the beads are not highly expanded, may not have sufficient structural strength to be useable as a load bearing platform. A dunnage platform with sufficient strength may be formed by combining the core 10a with a high impact polymeric sheet 67, for example, a polystyrene Sheet. In one embodiment, the sheet 67 may include an antimicrobial agent, which may be added to the material used for making the sheet 67. The antimicrobial agent may be in powder form or in liquid form. In another embodiment, at least one antimicrobial agent may be coated onto the exposed surface 16 of the sheet 67. The antimicrobial agent may be in powder form or in liquid form. When the agent is coated, the coating may take place before the sheet 67 is combined with the core 10a or after the load bearing structure 10 is made.

The combination may be effected by heat and/or pressure. In one specific example of a load bearing structure, a combination process may cause portions of an expanded polystyrene core 10a proximal to the bottom side 18a to be combined with the high impact polystyrene sheet 67 to form a strengthened polystyrene by heat and pressure. Additionally, a portion of the expanded polystyrene that is proximal to the edge 12a and in a proximal relationship to the bottom side 18a may be combined with the high impact polystyrene by heat and pressure to form the strengthened polystyrene, if desired. Details of this combination process may be found in U.S. Pat. No. 6,786,992, the content of which is incorporated herein by reference in its entirety.

Another specific example of a load bearing structure 10 may be as disclosed in U.S. Pat. No. 7,908,979, WO04041516 and U.S. Pat. No. 7,413,698, the contents of all of which are incorporated herein by reference in their entirety.

In another exemplary embodiment, any of the load bearing structures described above, as shown for example, in FIGS. 1, 12, 12a-f, including those having an antimicrobial coating capable of eliminating, preventing, retarding or minimizing the growth of microbes may be present in the materials making up the polymeric layer, for example, sheets or coated on the exposed surface or surfaces may be assembled into a container, with the load bearing structures discussed above forming any of the walls, top and base components of the container, as shown in FIG. 5-FIG. 7, and FIGS. 8, 8A-FIG. 8E the base having a plurality of supports extending therefrom the underside of the core 10a The walls and top may or may not include supports.

Figures 3, 4:
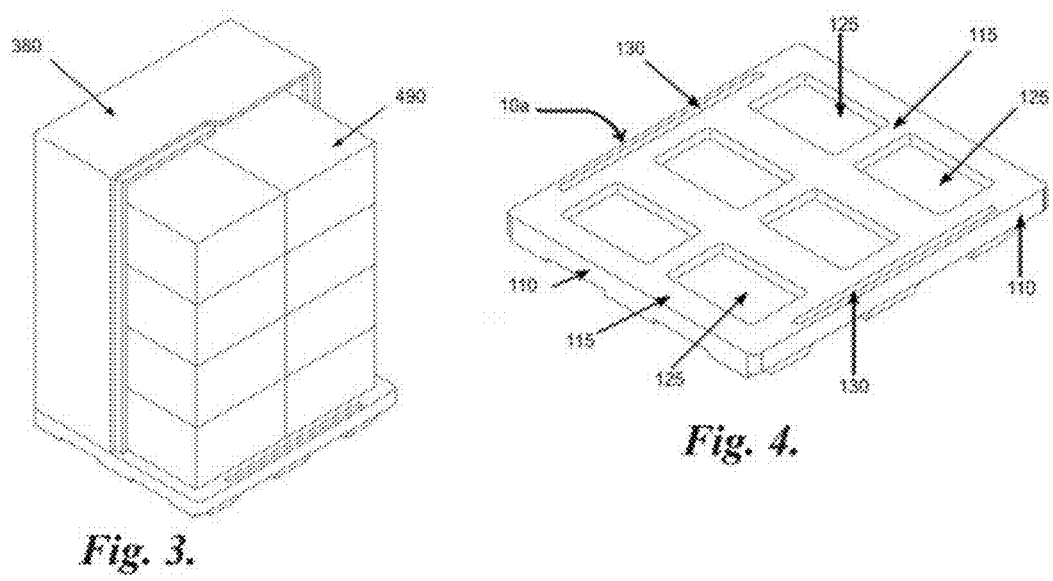
FIG. 3 shows a line drawing of a loaded cargo carrier dunnage platform with a half enclosure positioned on the cargo carrier dunnage platform, according to an embodiment of the invention.
FIG. 4 are shows an embodiment of a load bearing structure of the present invention.
Figure 4A:
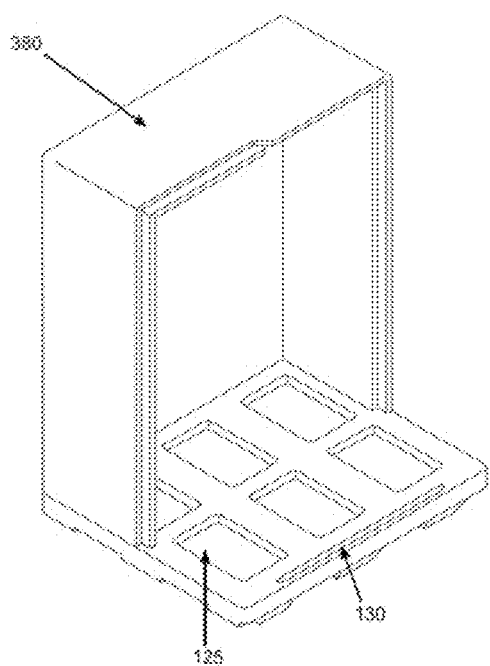
FIG. 4A shows a line drawing of the empty cargo carrier dunnage platform with a half enclosure positioned on the cargo carrier dunnage platform, according to an embodiment of the invention.
Figure 4B:
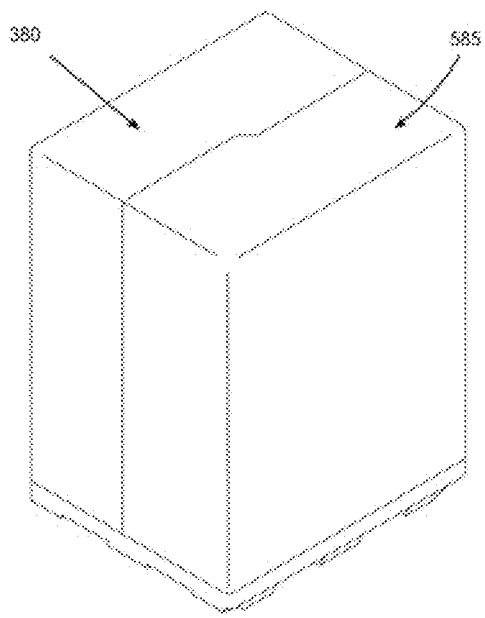
FIG. 4B shows a line drawing of a closed cargo carrier dunnage platform with a both-half enclosures positioned on the cargo carrier dunnage platform, according to an embodiment of the invention

The containers may have a base in the structure of, for example, FIG. 4, which may also be made either by combining the core 10a with a polymeric sheet 67, as noted above for FIG. 1, In FIG. 3, a line drawing of a loaded cargo carrier dunnage platform with a half enclosure 380 positioned on the cargo carrier dunnage platform loaded with cargo 490, according to an embodiment of the invention. Referring again to FIG. 4, the cargo carrier dunnage platform 10 may be useful as a base of the container of FIG. 3, with a top surface 115 and edges 110 is shown. In this embodiment, the dunnage platform 10a shown has six (6) pockets 125 and two (2) grooves or recesses 130 penetrating the top surface 115, each of which may extend into the core 10a (not shown) of the dunnage platform 10. In an embodiment of the invention, the pockets 125 may be used to locate phase change materials. In an embodiment of the invention, the grooves or recesses 130 are used to locate one or more enclosures. FIG. 4(A) shows the container of the embodiment of FIG. 3, devoid of cargo.

Figure 3A:
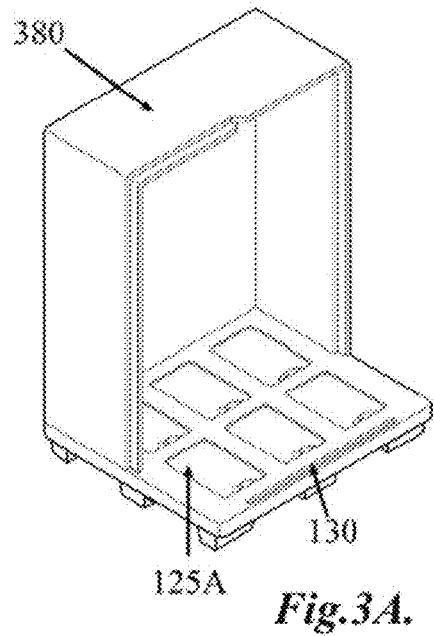
FIG. 3A shows a line drawing of the cargo carrier dunnage platform with phase change material containers positioned in pockets.

FIG. 3A shows the cargo carrier dunnage platform with phase change material containers or pouches 125a positioned in pockets 125 and a half enclosure positioned on the cargo carrier dunnage platform, according to an embodiment of the invention. These containers or pouches are shown here in substantially rectangular form, but they may be in other forms.

Figure 9:
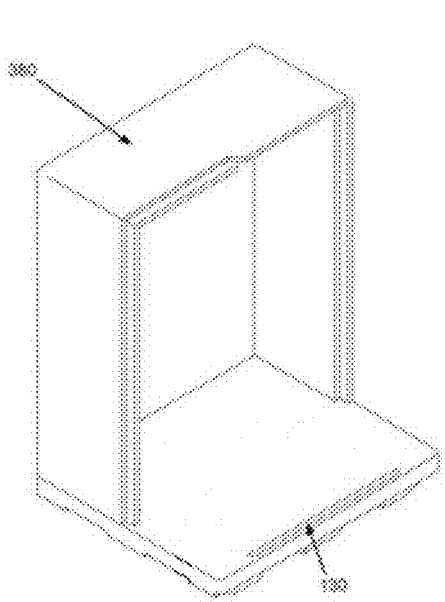
FIG. 9 shows a line drawing of the empty cargo carrier dunnage platform with a half enclosure positioned on the cargo carrier dunnage platform, according to another embodiment of the invention.

In another embodiment, as shown in FIG. 9, the base may also be such as shown in FIG. 1, but again with groove 130.

Figure 6:
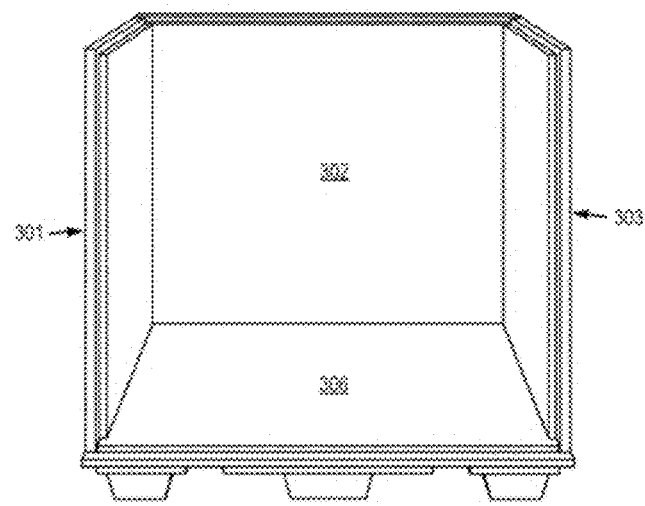
Figure 7:
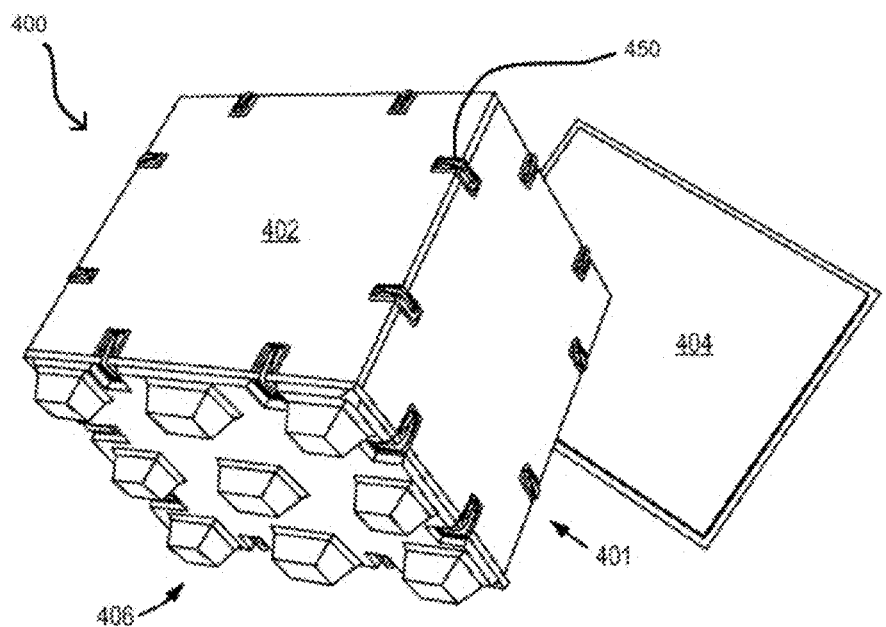

In one exemplary embodiment, a container 100 (FIG. 5) or 300 (FIG. 6) may be a knock-down or collapsible shipping container made up of a plurality of surfaces including a base 106 or 306, four walls 101 (103) or 301 (303) and a top panel 404 (as shown in FIG. 7), each being made from a light weight polymeric core bonded or laminated with a thermoplastic sheet. In one embodiment of the invention structural metal mesh can be inserted into the core 101a (not shown) to resist piercing of any of the surfaces. In another embodiment of the invention, the walls may be held together with clasps 450, as shown in FIG. 7. The shipping and/or storage container 400 is modular, lightweight, and may be thermally insulating, and/or tamper proof, and provides a sanitary surface coating and thermal capacity for transportation of foodstuffs and other valuable products. Upon delivery and unloading, the walls and top of the container can be disassembled and stacked on the dunnage base to reduce the volume of the container for storage or further shipment. The detail of this container is as described in U.S. Pat. No. 7,963,397, the content of which is hereby incorporated by reference in its entirety.

In another exemplary embodiment of the invention, a knock down or collapsible container for storage and/or shipping having a base, four walls extending therefrom and a top panel to form an enclosure therein, each of which having an inside surface, an outside surface, a width joining the inside and outside surfaces, and four inside edges and four outside edges. The container when collapsed or knockdown, has a foot print not larger than the foot print of the largest individual component, as shown in FIG. 8, FIG. 8A-FIG. 8E. In an embodiment of the invention, each of the base, four walls and top includes a continuous feature extending substantially along a surface no more than approximately 80 percent, of any of the four inside edges of the walls, base and top of each of the components of the container, the features on adjacent members are of opposite interlocking characteristics, as shown in FIG. 8, FIG. 8A-FIG. 8E. That is, if an edge has a groove, the groove is less than 80 percent of the length of the edge.

In an alternative embodiment of the invention, each of the base, four walls and top includes a continuous feature extending substantially along a surface no more than approximately 90 percent of any of the four inside edges of the walls, base and top of each of the components of the container, the features on adjacent members are of opposite interlocking characteristics. That is, if an edge has a groove, the groove is less than 90 percent of the length of the edge.

Figure 8:
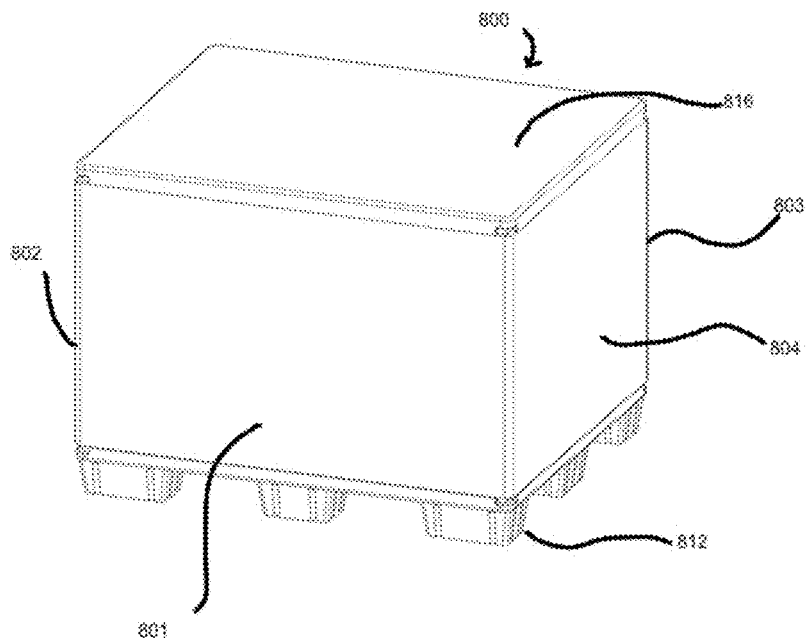
FIG. 8 shows an embodiment of a container of the present invention during assembly, depicting the interconnecting features.
Figure 8A:
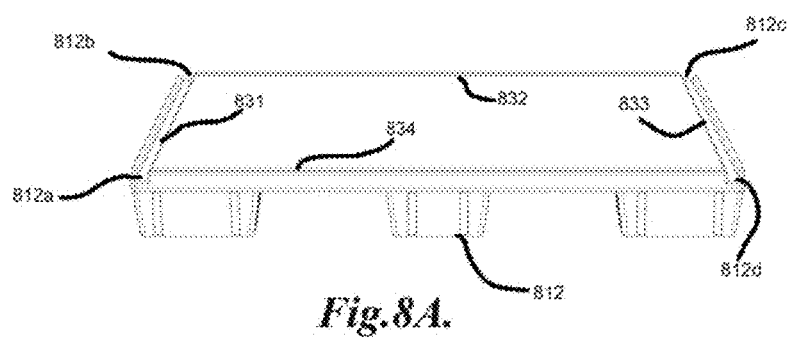
FIGS. 8A-8E show embodiments of a container of the present invention depicting the interconnecting features during assembly.
Figure 8B:
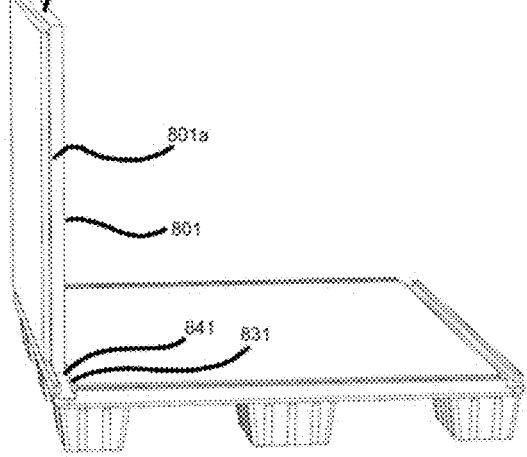

Interlocking features characteristics may also be defined as a depression in a wall of a container corresponding to a protrusion in the cargo such that the container 'mates' with the cargo without requiring a fastener. Interlocking characteristics may include respective depression and protrusion features on adjacent connecting components. For example, when the features along one side have a receiving characteristic, the features on the adjacent member are of a protruding characteristic so that the interlocking features mate to form a container without any aid from additional clips or fasteners. The phrase 'without requiring a fastener' means that the interlocking features are interlocked without the aid of any component that is not the base, the four walls or the top. Additional securing devices may be employed to insure further integrity of the container, if needed, and such additional securing devices may include straps and/or shrink wrap packaging. In one embodiment, each of the walls, top and base of the container may be made of a light weight core substantially covered with a polymeric layer, for example, high impact sheet, having antimicrobial properties or having at least one antimicrobial agents incorporated therein or thereon, on at least one of its surfaces to form a load bearing structure having a width as noted above. In another embodiment, a structural metal mesh may be inserted into the core to resist piercing of the surface, and each of the walls, top and base of the container may be made of a light weight core substantially covered with a polymeric layer, for example, high impact sheet, with or without antimicrobial properties or having at least one antimicrobial agents incorporated therein or thereon, on at least one of its surfaces to form a load bearing structure having a width as noted above. FIG. 8 illustrates a perspective view of an assembled container 800 which may generally include a base 812, side pieces 801, 802, 803 and 804, and a top 816. In general, the container 800 may be assembled into the form illustrated in FIG. 8 without the use of adhesives, fasteners and/or other assembly aids and may substantially assemble in a predetermined fashion and retain the illustrated form. In one embodiment, as shown in FIG. 8A, the base 812 may generally be rectangular and may include a plurality of channels or grooves 831, 832, 833 and 834, each adjacent to an edge of the base 812. The grooves 831, 832, 833 and 834 may each terminate at a corner which is substantially open to the edge, as shown with corners 812*a, b, c* and *d*, such that the grooves are open at least one end to insert a side piece. The corners 812*a, b, c* and *d* may also include a closed edge which may thus act as a stop such that, for example, a side piece(s) may abut against the closed edge of the corner and be substantially retained and prevented from advancing beyond the corner. As illustrated in FIG. 8B, a side piece, such as side piece 801, may include a corresponding ridge 841, which may slide into and be retained in a corresponding groove, such as groove 831 as illustrated. The side pieces, such as illustrated with side piece 801, may further include a ridge 841*a* opposite ridge 841 which may correspond and be retained in a corresponding groove of the top 816.

Figure 8C:
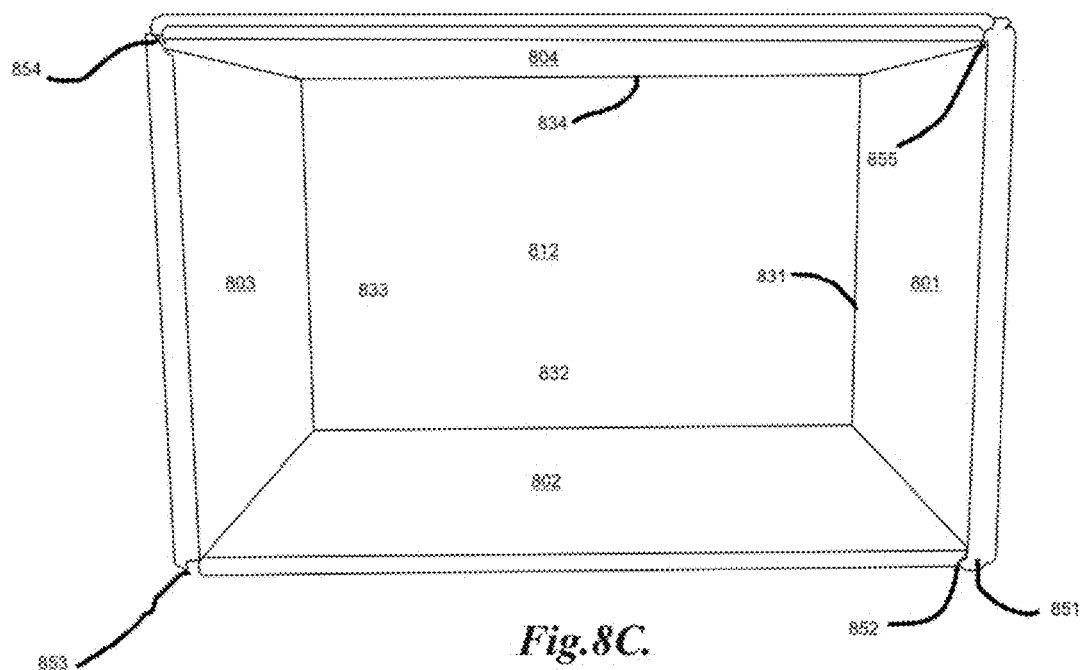
Figure 8D:
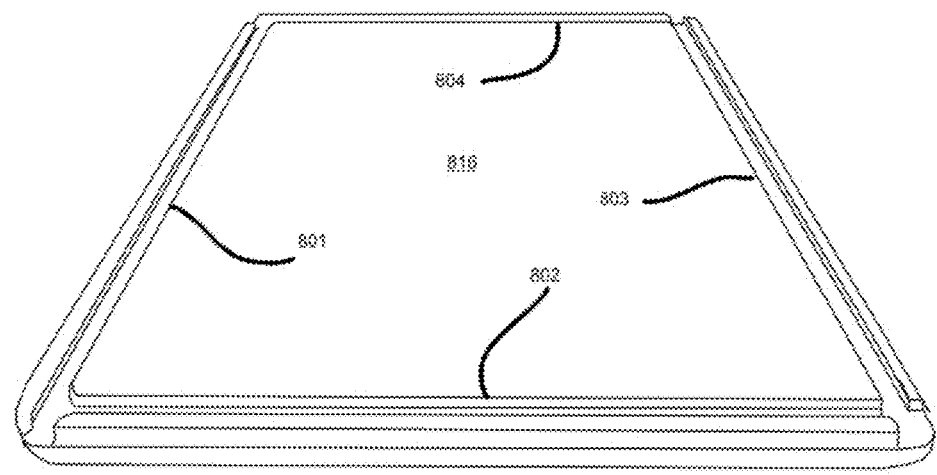
Figure 8E:
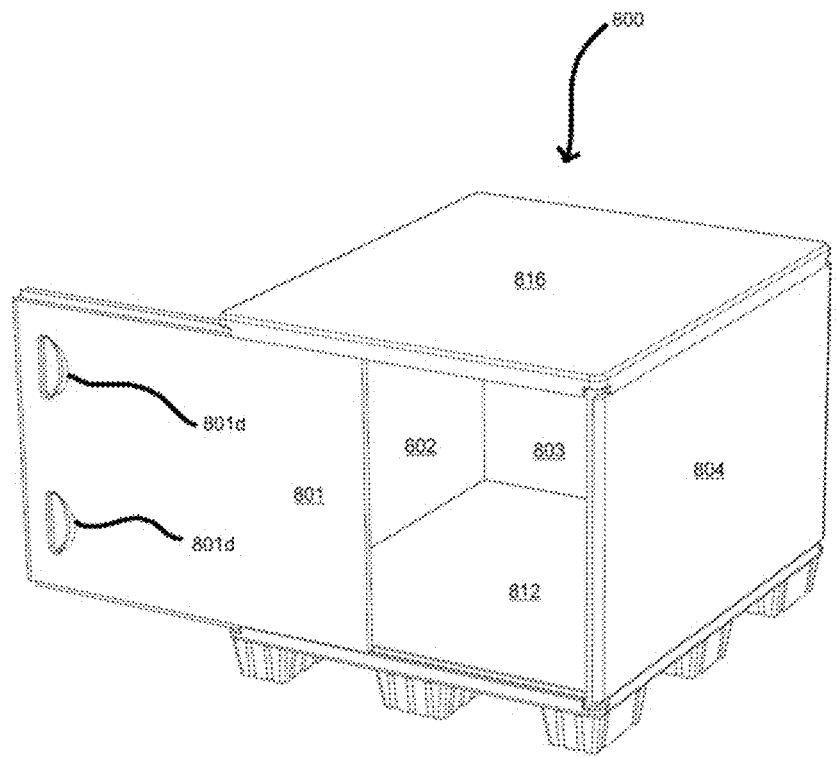

In general, the side pieces 801, 802, 803 and 804 may include edges orthogonal to ridges which correspond to the grooves of the top 816 and base 812, as illustrated in the top view of the container 800 in FIG. 8C. In general, the orthogonal edges may mate to each other with interlocking connections, as illustrated with connections 853, 854 and 855. In general, to assemble the container 800, for example, the side piece 804 may be inserted into the groove 834, followed by side piece 803 in groove 833, side piece 802 in groove 832 and then side piece 801 in groove 831. Side pieces 801 and 802 may include a non-interlocking junction, as illustrated with abutting edges 851 and 852, such that side piece 801 may be inserted without interference from a protruding piece. The top 816 as illustrated in FIG. 8D, which may include grooves 833*a*, 833*b*, 833*c* and 833*d*, which may correspond to ridges 842*a*, 842*b*, 842*c* and 842*d* of the side pieces, respectively, may then be placed such that the corresponding ridges fit into the grooves of the top 816, closing the container 800. The top 816 may also, for example, be placed before all of the side pieces are placed, such as illustrated in FIG. 8E. The side pieces, such as side piece 801 as illustrated in FIG. 8E, may also include handling features, such as the handle depressions 801*d*, such that the side pieces may be manipulated with greater ease.

These embodiments of the container are described in detail in U.S. patent application Ser. Nos. 13/549,472, and 14/158,488, both entitled "Cargo Container for Storing and Transporting Cargo", the contents of all of which are hereby incorporated by reference in their entirety.

In a further exemplary embodiment, the container includes two identical substantially L-shaped cross-section halves, 380, each having at least two walls and a base or top component, each of the components having corresponding or complementary interlocking features to be mated together to form a container having an enclosure therein, as shown in FIG. 4A. In other embodiments, the base may not have pockets. Each of the halves having an inner surface and an outer surface joined by a width. The footprint of the knockdown or collapsed container is not larger than the substantially L-shaped cross-section halves. In one embodiment, each half is made of an inner light weight core covered by at least one layer of strengthened coating. In another embodiment, a structural metal mesh may be inserted into the core to resist piercing of the surface. In one aspect, the container may have thermal insulating property for minimizing exposure of cargo to cold temperatures. In another aspect, the container may have thermal insulating property for minimizing exposure of cargo to high temperatures. In a further aspect, the container may have a combination of any of the properties described in the previous aspects. According to one embodiment, the container may include an enclosure having one undivided internal compartment. According to another embodiment, the container may include an enclosure having more than one internal compartments. These embodiments are also disclosed in U.S. patent application Ser. Nos. 13/549,472, and 14/158,488, both entitled "Cargo Container for Storing and Transporting Cargo", and U.S. patent application Ser. No. 13/254,127, entitled "Climate control Cargo Container for Storing, Transporting and Preserving Cargo", the contents of which are incorporated herein by reference in their entirety.

Figure 5:
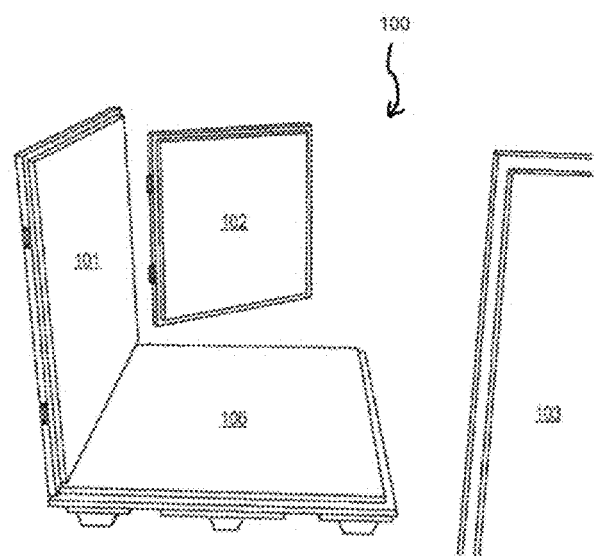
FIGS. 5-7 show embodiments of a container of the present invention during assembly.

As noted above, the containers include those as described in FIGS. 5, 6 and 7, (and also disclosed in U.S. Pat. No. 8,672,137, the contents of which is incorporated herein in its entirely) at least one of the exposed surfaces thereof may also have antimicrobial properties and pockets may be added for containing phase change materials.

Figure 10:
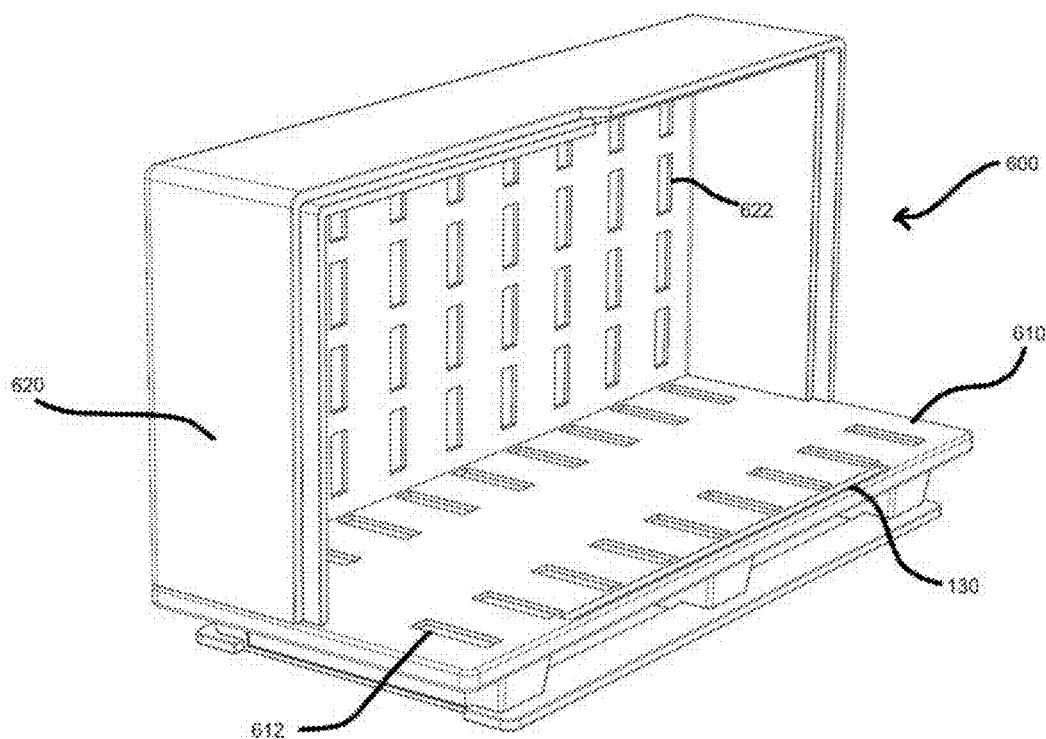
FIG. 10 shows an L-shaped half of an embodiment of the container of the present invention having features for locating cargo or partitions.

According to one embodiment, the container may include an enclosure having one undivided internal compartment, as shown in FIG. 3, FIG. 8C or FIG. 10. According to another embodiment, the container may include an enclosure having more than one internal compartments, not specifically shown. In one aspect, the interior may have dividers molded into the side of the component structures (not specifically shown). In another aspect, the dividers may be added to the container to form separate compartments. Features 612 or 622, as shown in FIG. 10, FIG. 10A and FIG. 11A, may be present or molded into the components of the container to allow for placement of dividers to adjust the size of the compartments.

Figure 10A:
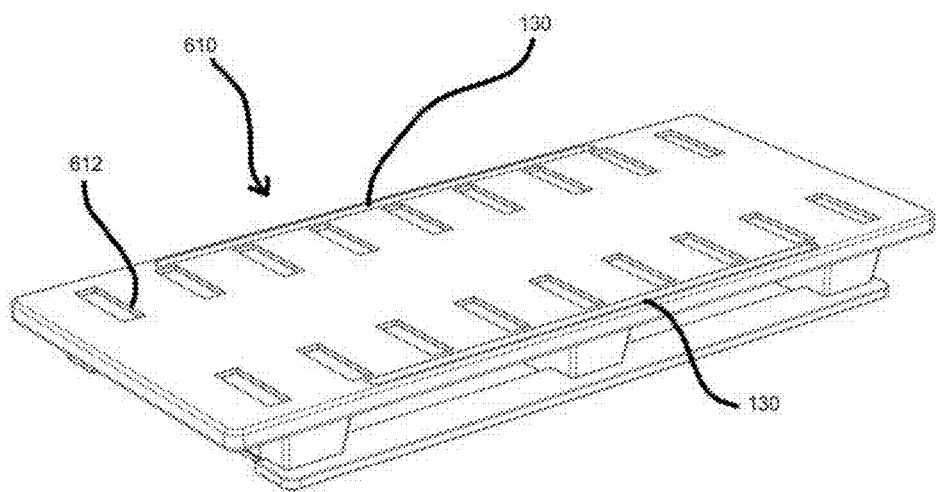
FIG. 10A show a full view of the inside bottom of an embodiment of the container of the present invention having features for locating cargo or partitions.
Figure 11:
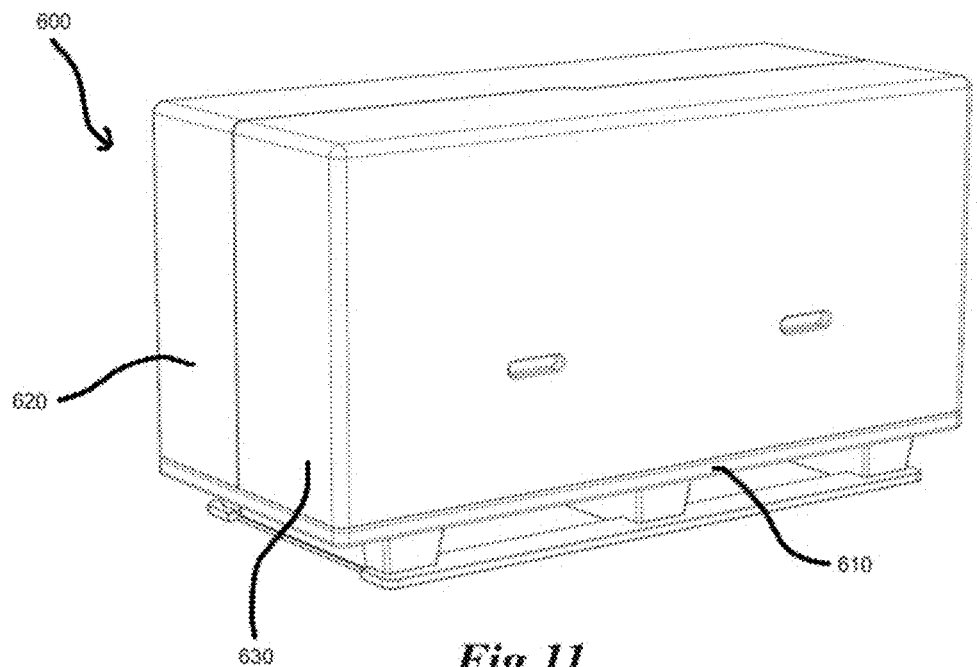
FIG. 11 shows fully assembled container of an embodiment of the present invention.
Figure 11A:
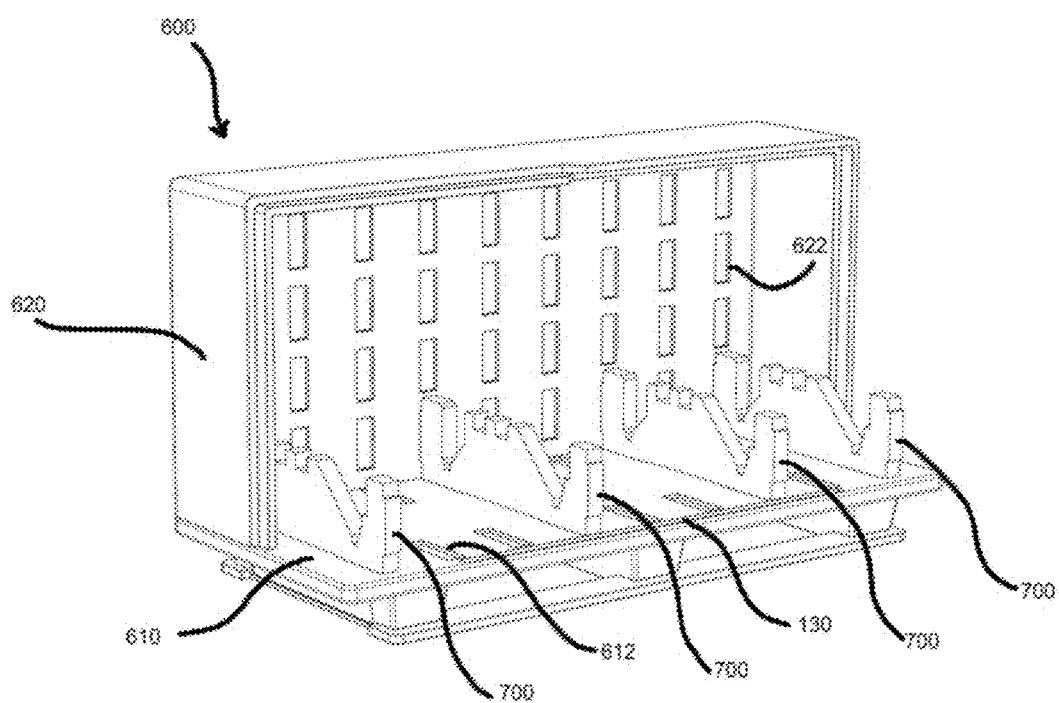
FIG. 11A shows an L-shaped half of an embodiment of the container of the present invention having features for locating cargo.

FIG. 10, FIG. 10A and FIG. 11A show embodiments of a substantially L-shaped cross-section half of a container 600, having channel or groove, 130, molded or formed on the various sides. Slots 612 or 622, are molded or formed on the interior of all side, base or top components, 610 or 620 of FIG. 10, 10a or 11a, for attaching dividers (not shown) to create various compartments inside the enclosure, or for attaching shaped features 700 for resting cargo, as shown in FIG. 11A. In one embodiment, the slots 612 or 622, may be formed or molded in fixed distance apart, as shown in FIG. 10, FIG. 10A and FIG. 11A so that same size or multiples of one size compartments may be formed. In another embodiment, they may be formed or molded in varied distance apart (not specifically shown), so that different size compartments may be formed which may or may not be multiples of one size. In one aspect, the slots are formed at corresponding positions on the inside surfaces of the side, top or bottom components to form compartments that are either substantially parallel to the horizontal or vertical. In another aspect, the slots are formed at an angle with respect to the horizontal or vertical.

According to one embodiment, features 700 may be formed or molded into the components of the container for placement of cargo or placement of other components for more secure location of cargo.

FIG. 11 shows a closed container 600 by mating two substantially L-shaped cross-section halves, such as that shown in FIG. 10 or FIG. 11A.

The containers may be made of the size and shape to accommodate the cargo, or the cargo may be contained in its own packaging and then inserted into the container 380 or 600.

In some embodiments, the container having an enclosure may also be made up of a knock down or collapsible container 200 for storage and/or shipping, as illustrated in FIG. 16, having a base, four walls extending therefrom and a top panel to form an enclosure therein, where the four walls are substantially similar in shape and feature identical interlocking features such that the container 200 may have a minimum of three different components: a top panel, a base and a wall panel. The identical interlocking features on the wall panels may also generally aid in forming a rigid, resilient and easy to assemble/disassemble container 200.

FIG. 16 illustrates a perspective view of a container 200 which may include a top panel 210, four wall panels 220 and a base 230. The wall panels 220 may generally join to each other at side interfaces 204 to form a substantially rectangular enclosure with a space 201 as shown in FIG. 16a, which in turn may join with the base 230 at base interface 206 and with the top panel 210 at top interface 202.

In general, the base 230, as illustrated in FIGS. 17 and 17a, may include a main platform 232 on which cargo and/or other material may rest when the container 200 is assembled. As noted above, the main platform portions of all the components define the inner space of the container 200 when assembled. The base 230 may also generally include a plurality of supports, such as extensions or supports 238, which may extend from the bottom surface 231, as shown in FIG. 17a. At the base interface 206 with the wall panels 220, the base 230 may generally include an interface feature, such as the circumferential groove 236 between the main platform 232 and an outer circumferential ring or edge portion 234, as shown in FIG. 17. In general, a portion of the wall panels 220 may interface with the base 230 by insertion into the circumferential groove 236. A portion of the wall panels 220 may also rest on the top surface 235 of the circumferential ring 234, such that, for example, the wall panels 220 and the base 230 may interface with a minimal gap or space at base interface 206. The base 230 may also feature rounded, chamfered and/or otherwise smooth shaped edges such that sharp and/or pointed portions of the container 200 may be minimized, such as with chamfered edge 237 and rounded corners 239 of the circumferential ring 234, and with rounded corners 233 of the main platform 232, as illustrated in FIG. 17.

Figure 19:
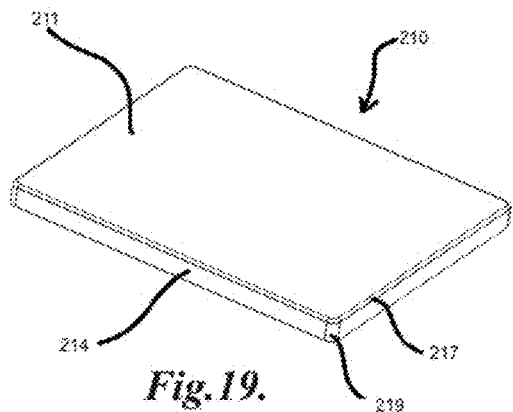
FIGS. 19 and 19a illustrate a top panel of the embodiment of a container of FIG. 16.
Figure 19A:
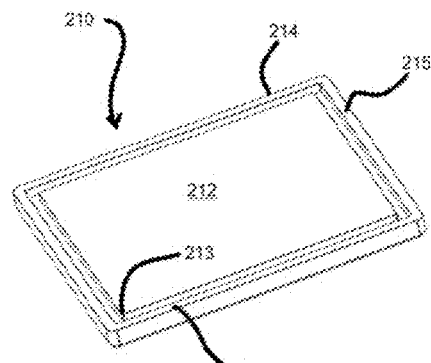

In general, the top panel 210, as illustrated in FIGS. 19 and 19a, may include a main platform portion 212 which may form the roof when the container 200 is assembled, and an outer surface 211. At the top interface 202 with the wall panels 220, the top panel 210 may generally include an interface feature, such as the circumferential groove 216 between the inner main platform portion 212 and an outer circumferential ring 214, as shown in FIG. 19a. In general, a portion of the wall panels 220 may interface with the top panel 210 by insertion into the circumferential groove 216. A portion of the wall panels 220 may also rest on the bottom surface 215 of the circumferential ring 214, such that, for example, the wall panels 220 and the top panel 210 may interface with a minimal gap or space at base interface 202. The top panel 210 may also feature rounded, chamfered and/or otherwise shaped edges such that sharp and/or pointed portions of the container 200 may be minimized, such as with chamfered edge 217 and rounded corners 219 of the circumferential ring 234, and with rounded corners 213 of the main platform portion 212, as illustrated in FIGS. 19 and 19a.

Each of the wall panels 220 may generally include a rectangular panel 222 with four edges with interfacing features. In some embodiments, three of the four edges may be formed as stepped edges with a portion of the overall thickness of the rectangular panel 222 extending outward, such as to form a partially circumferential step, such as illustrated in FIGS. 18 and 18e with the stepped edges 226a, 226b, and 226c forming step 226. The fourth edge may be formed as a wrap-around extension, such as illustrated with the extension 224 with a portion of the overall thickness of the rectangular panel 222 in FIGS. 18 and 18a, that extends out from the edge 223 and wraps at a substantially 90° angle to the plane of the rectangular panel 222 towards the inner surface 228 of the rectangular panel 222, which may generally form a channel or groove between the wrap-around portion of the extension 224 and the unextended edge 223a of the rectangular panel 222, such as the groove 225 as illustrated in FIGS. 18 and 18*a*.

Figure 18C:
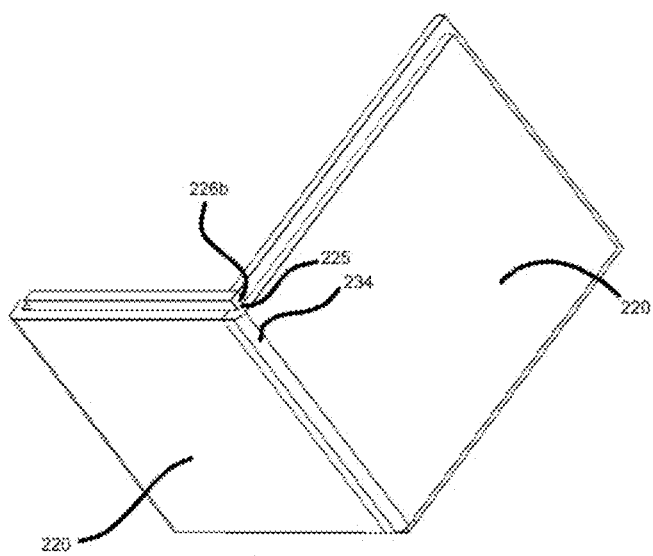
FIGS. 18b, 18c and 18d illustrate a wall panel interfacing with a top panel, another wall panel and a base, respectively in an embodiment of the present invention.
Figure 18D:
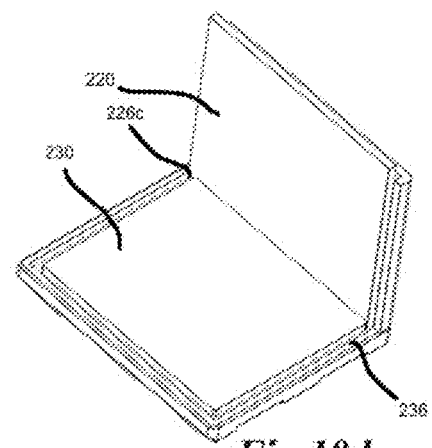
Figure 18E:
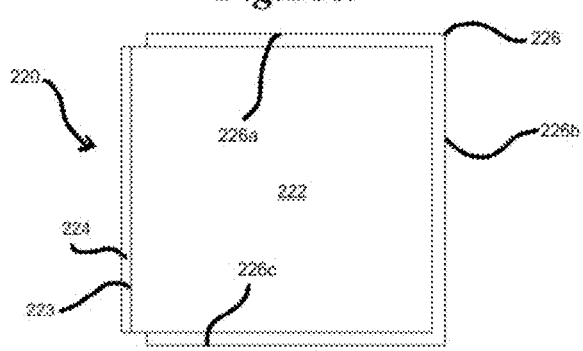
Figure 18B:
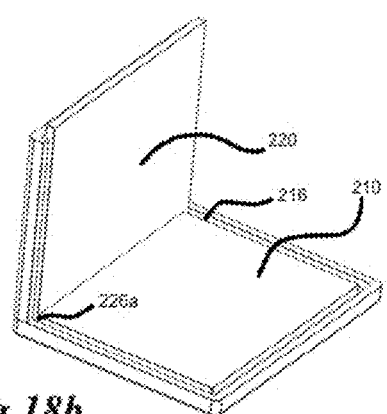

The stepped edges 226*a*, 226*b*, and 226*c* may generally be shaped to fit into grooves of other components of the container 200, such as, for example, the edge 226*a* fitting into circumferential groove 216 of top panel 210 shown in FIG. 18*b*, edge 226*b* fitting into the groove 225 of another wall panel 220 shown in FIG. 18*c*, and edge 226*c* fitting into the circumferential groove 236 of base 230 shown in FIG. 18*d*, which may generally form substantially continuous interfaces between the components at top interface 202, side interfaces 204 and base interface 206, with minimal space and/or gaps between the components. The interfacing grooves, extensions and/or corner interfaces may also generally act as tongue and groove interfaces, and may thus provide rigid and/or largely self-supporting connections between the components which may require minimal if any reinforcement when assembled. The interfaces may also generally resist loads in all directions.

In other embodiments, the wall panels 220, as illustrated in FIGS. 18 and 18*a*, may also include an outer panel 222 joined and/or formed as a unitary component with an inner panel 226. The outer panel 222 may generally include an interface feature on one side, such as the corner interface 234, which may generally extend past the edge of the inner panel 226, as illustrated. In some embodiments, the corner interface 234 may generally include a substantially L-cross section such that it may substantially span a 90° corner for interfacing with another wall panel 220. The L-cross section of the corner interface 234 may generally form a groove 225 between the corner interface 234 and the inner panel 226.

The inner panel 226 may generally include interfaces which extend past the edges of the outer panel 222 except on the edge with the corner interface 234, such as with extensions 226*a*, 226*b* and 226*c*, as illustrated. The extensions 226*a*, 226*b* and 226*c* may generally be shaped to fit into grooves of other components of the container 200, such as, for example, the extension 226*a* fitting into circumferential groove 216 of top panel 210 shown in FIG. 18*b*, extension 226*b* fitting into the groove 225 of another wall panel 220 shown in FIG. 18*c*, and extension 226*c* fitting into the circumferential groove 236 of base 230 shown in FIG. 18*d*, which may generally form substantially continuous interfaces between the components at top interface 202, side interfaces 204 and base interface 206, with minimal space and/or gaps between the components. The interfacing grooves, extensions and/or corner interfaces may also generally act as tongue and groove interfaces, and may thus provide rigid and/or largely self-supporting connections between the components which may require minimal if any reinforcement when assembled. The interfaces may also generally resist loads in all directions.

In some embodiments, the wall panels 220 may be identical and may form a container with a square cross-section. This may be desirable as the total number of different components required is three (top panels, bases and wall panels). In other embodiments, wall panels 220 of different dimensions may be used, for example, with two wall panels of one length and two wall panels of another length, such that the container cross-section will be a rectangle. In general, the dimensions of the top panel 210 and the base 230 may determine the required type of wall panel 220 to be used.

Figure 20:
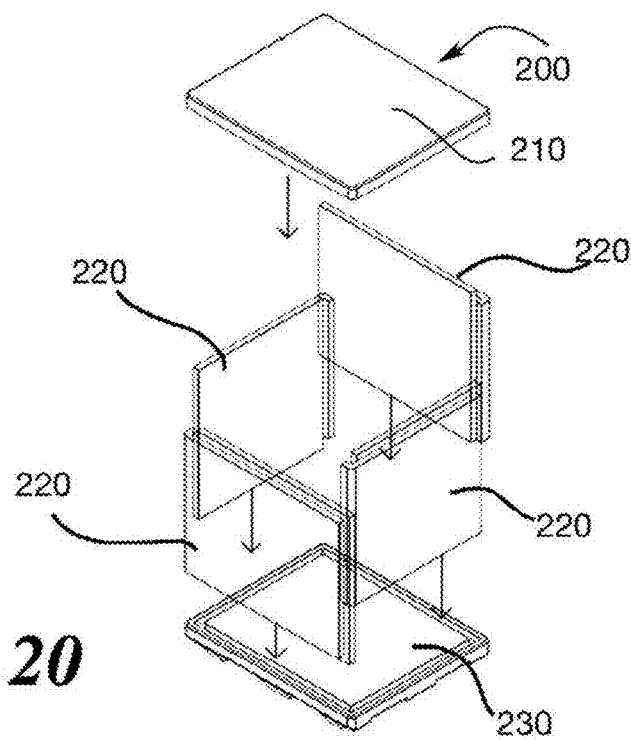
FIG. 20 illustrates the assembly of the embodiment of a container of FIG. 16.

In general, the container 200 may be assembled by interfacing the wall panels 220 with the base 230 and capping with the top panel 210, as illustrated in FIG. 20. Since all of the corner interfaces 224 and the extensions 226*a*, 226*b* and 226*c* project from a single plane, the wall panels 220 may be inserted into the base 230 one at a time, such as by a single assembler, and the wall panels 220 may interface with each other and the base 230 through purely vertical translation, as illustrated in FIG. 20, which may be desirable to reduce awkward and/or difficult assembly steps.

The base of a container may generally include a plurality of supports, such as extensions or supports, which may take various forms or shapes, such as illustrated with the extensions or supports of bases 900, 910 920 and 930 in FIGS. 21, 21*a*, 21*b*, 21*c*, 21*d*, 21*e*. The supports may generally space the bottom surface of the base from the ground and/or other surface. The supports may also be spaced from each other such that, for example, the base may be manipulated with a forklift and/or other moving machinery fitting into the spaces between the supports.

FIGS. 21 and 21*a* illustrate a plurality of extensions or supports 904 extending from the bottom surface 902 of the base 900. In some embodiments, the extensions or supports may have some angled walls and may have outer walls on the periphery of the base substantially perpendicular to the bottom surface 902, as illustrated with extensions or supports 904.

In some other embodiments, the extensions or supports may be have angled walls and be spaced inward from the outer periphery of the base, such as the extensions or supports 914, 924 and 934 of bases 910, 920 and 930, respectively, illustrated in FIGS. 21*b*, 21*c*, 21*d* and 21*e*.

Figure 21E:
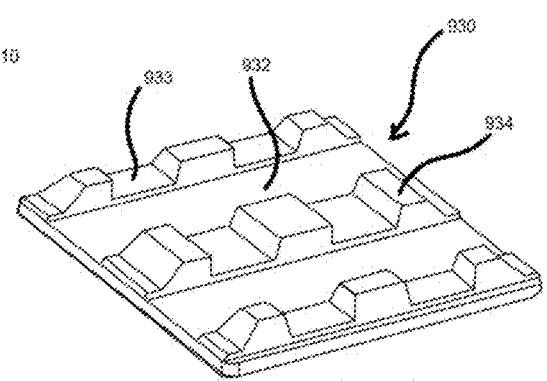

The bottom surface of the base and/or the sides of the supports may also include ridges, ribs, reinforcements and/or other surface modifications, as shown in FIGS. 21*b*, 21*c* and 21*d*, to which may, for example, aid in increasing the strength and/or rigidity of the structure of the base, especially under load. It is also believed that the ability of the supports and/or base to resist compressive loads is greatly enhanced if each of the side walls includes a plurality of generally longitudinally extending ribs. FIGS. 21*b* and 21*d* illustrate an example of ridges or ribs 913 interconnecting on the walls of the extensions or supports 914 and the bottom surface 912. FIG. 21*c* illustrates an example of grooves 923 on the bottom surface 922, with unconnected ridges or ribs on the extensions or supports 924. FIG. 21*e* illustrates an example of larger raised ribs 933 on the bottom surface 932 from which the extensions or supports 934 extend. The cargo containers may also include a desiccant to control the humidity of the interior.

Figure 22:
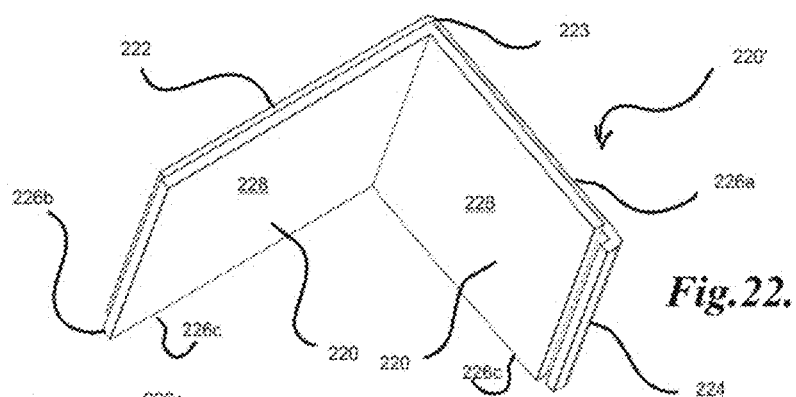
FIGS. 22, 22a and 22b illustrate integrally formed or joined wall panels in a substantially L-shaped configuration for interfacing with a top panel and a base in an embodiment of the present invention.
Figure 22A:
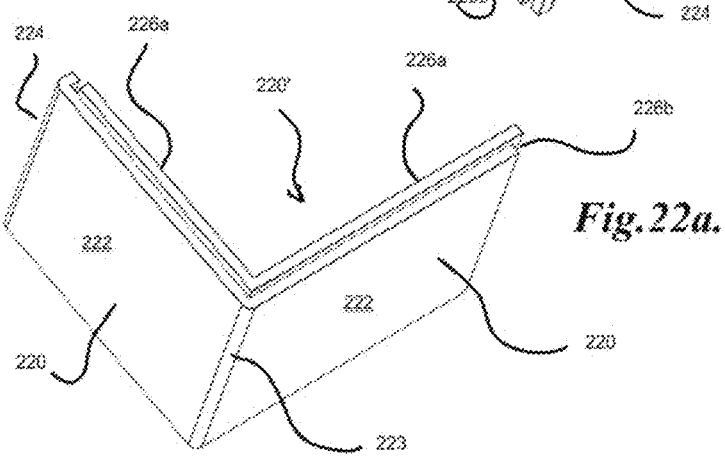
Figure 22B:
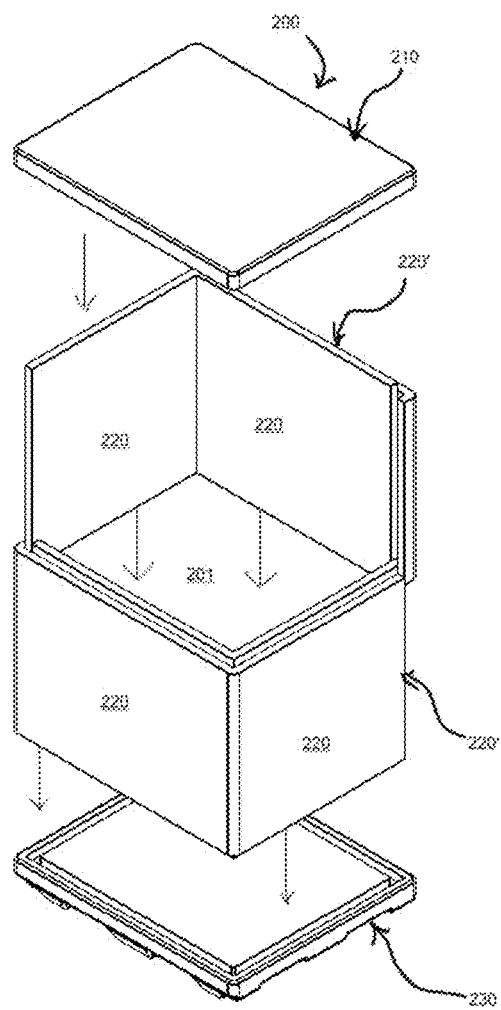

In another exemplary embodiment of the invention, the container 200 is formed from two halves, and each of the halves may or may not include the top or the bottom components. The interfacing locking features on the components may include any or all combinations of those described above. In one embodiment, the container 200 includes two identical or mirror images substantially L-shaped cross-sectional halves, such as the halves 220' illustrated in FIGS. 22 and 22*a*, each having at least two wall components 220, each of the components having corresponding interlocking features to be mated together to form a container having for example, a closed enclosure therein when mated with the top 210 and bottom 230 components, as shown in FIG. 22*b*.

Figures 23, 23A:
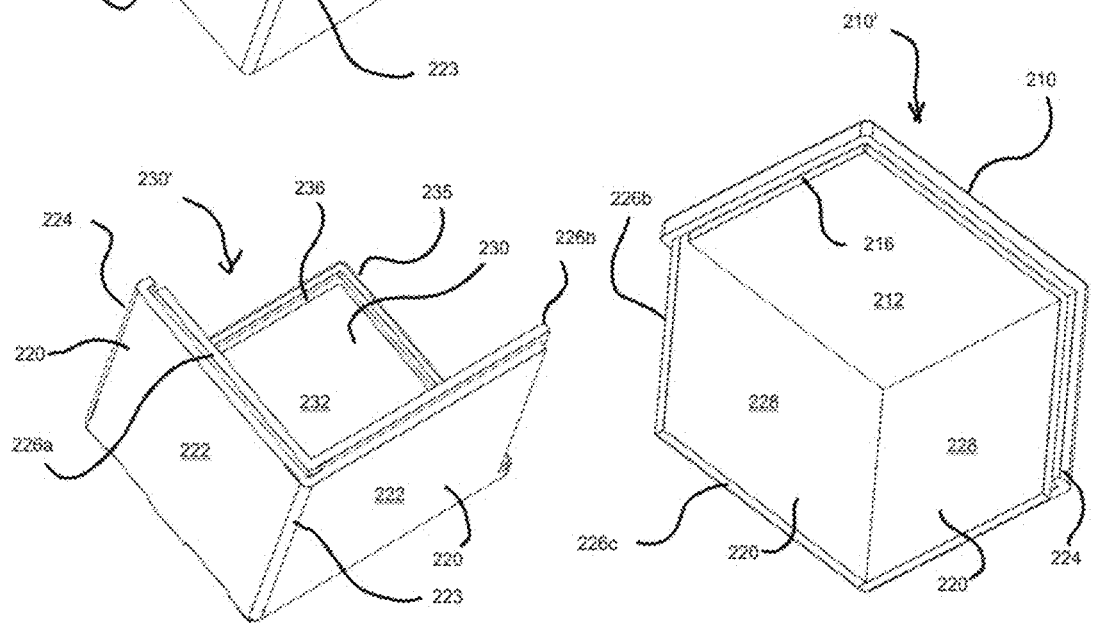
FIGS. 23, 23a and 23b illustrate a pair of integrally formed or joined wall panels in a substantially L-shaped configuration, one of which is integrally formed or joined with a top panel and the other of which is integrally formed or joined with a base in another embodiment of the present invention.

In another embodiment of the invention, the container 200 includes two identical or mirror images of substantially L-shaped cross-sectional halves, such as the halves 210' and 230' as illustrated in FIGS. 23 and 23*a*, each having at least two walls 220 and a top component 210 or a base 230, respectively, joined to halves, each of the components having corresponding interlocking features to be mated together to form a container having for example, a closed enclosure therein.

For a container formed from two identical, substantially L-shaped cross-sectional halves 220', or walls, each half 220' may be integrally formed or joined from two of the wall sections 220, as discussed above, to interface with a top 210 and a base 230 component. The wall sections may generally be identical or similar in shape and size, and though integrally formed or joined together, each still kept its distinct platform portion 228. The halves 220' may further include all of the features of the constituent wall sections 220, as above, except where the halves 220' are integrally formed, the features that would normally interface the two constituent wall sections 220 may be absent and may instead form a solid continuous structure. In these embodiments, each half 220' includes two vertical edges, such as interfaces 224 and 226b, and two horizontal edges, such as 226a and 226c, to interconnect with other components, for example, with each other and with the top 210 and base 230 to form the container 200 with internal space 201, as illustrated in FIG. 22b. The halves 220' may, such as by virtue of their shape and by being identical, may nest together which may generally conserve space during storage in knocked down form.

Figure 23B:
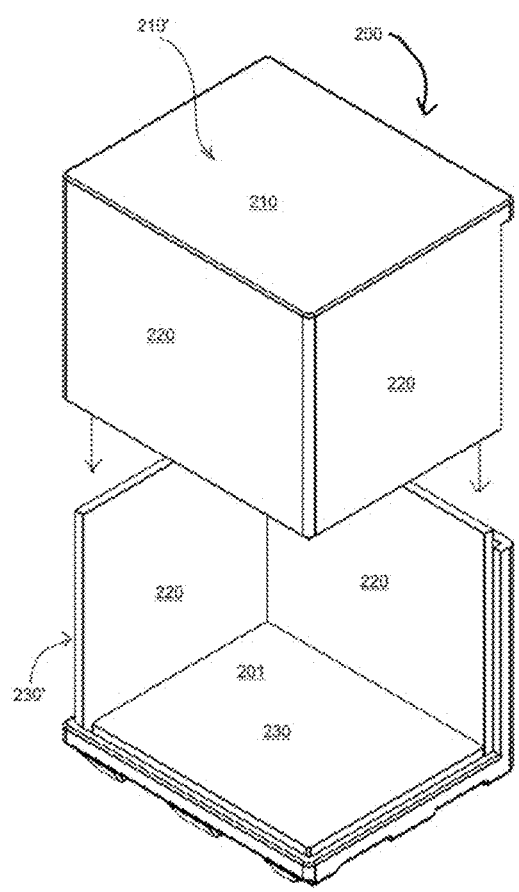

In one embodiment, one substantially L-shaped cross-sectional half may be integrally formed or joined with a top component, as shown with half 210' formed from wall sections 220 joined to the top 210 as illustrated in FIG. 23a, while another substantially L-shaped cross-sectional half may be integrally formed or joined with a bottom or base component, as illustrated in FIG. 23 with half 230' formed from wall sections 220 joined to the base 230, such that the two halves 210', 230' may be assembled to form a complete enclosed container 200, as illustrated in FIG. 23b. As with the halves 220', the wall sections in the halves 210', 230' may generally be identical or similar in shape and size, and though integrally formed or joined together, each still kept its distinct platform portion 228. The halves 210', 230' may further include all of the features of the constituent wall sections 220, as above, except where the halves 210', 230' are integrally formed, the features that would normally interface the two constituent wall sections 220 and the top 210 or base 230 may be absent and may instead form a solid continuous structure. In these embodiments, each half 210', 230' includes two vertical edges, such as interfaces 224 and 226b, and two horizontal edges, such as 226a and 226c, to interconnect with other components, for example, with each other, and the base 230 may include a groove 236 to interface with the edges of the half 210' while the top 210 may include a groove 216 to interface with the edges of the half 230' to form the container 200 with internal space 201, as illustrated in FIG. 23b. The halves 210', 230' may, such as by virtue of their shape and by being similar, may nest together with other halves of the same type or the other type, which may generally conserve space during storage in knocked down form.

For the halves 210', 220', 230' as described above, the edges may be rounded or chamfered, as illustrated with, for example, the rounded edges 223, or they may also be substantially 90 degree interfaces which are not rounded or smoothed (not shown).

As noted above, the interfacing features may be formed during any step of the manufacturing process. In one example, the features may be molded when the components are made. The base, top or walls may include a light weight core, for example, a closed cell foamed core, combined with or surrounded by a polymeric film to form a strengthened structure. The core may include the interfacing features and the polymeric film may then conform to the features in the core during the combining or surrounding step or process. In another embodiment, the features may be forged into the components after the components are made. For example, the base, top or walls may include a light weight core, for example, a closed cell foamed core, combined with or surrounded by a polymeric film to form a strengthened structure. The core does not include any of the interfacing features. The interfacing features may then be forged after the core and film are combined, and the exposed surface of the core may either remain exposed or a spray coating made be added to cover the exposed surface of the core.

In various embodiments of the invention, one or more of the dunnage platform, the first enclosure and second enclosure are formed from a core, from one or more of the materials including expanded polystyrene, polyurethane, polyphenylene ether, polystyrene impregnated with pentane, a blend of polyphenylene ether and polystyrene impregnated with pentane, polyethylene, and polypropylene. In various embodiments of the invention, one or more of the dunnage platform, the first enclosure and second enclosure are formed from a core containing one or more materials mentioned above. In various embodiments of the invention, one or more of the dunnage platform, the first enclosure and second enclosure are formed from one or more thermoplastic sheets or layers including high impact polystyrene; polyolefins such as polypropylene, low density polyethylene, high density polyethylene, polyethylene, polypropylene; polycarbonate; acrylonitrile butadiene styrene; polyacrylonitrile; polyphenylene ether; polyphony ether alloyed with high impact polystyrene; polyester such as PET (polyethylene terephthalate), APET, and PETG; lead free PVC; copolymer polyester/polycarbonate; or a composite HIPS structure, as mentioned above.

In various embodiments of the invention, one or more of the dunnage platform, the first enclosure and second enclosure thermoplastic sheets are a blend of any of the polymers mentioned above. In various embodiments of the invention, one or more of the dunnage platform, the first enclosure and second enclosure are formed from a core with an embedded strengthening material selected from the group consisting of a mesh, a perforated sheet and a barrier is embedded in the core. In various embodiments of the invention, one or more of the dunnage platform, the first enclosure and second enclosure are formed from a core with an embedded strengthening material selected from the group consisting of metal, carbon fiber, Kevlar, basalt-web blanket and Formica. As noted above, when used in facilitating security check of air cargo transport of cargo that is transparent to magnetic scanners, non-metal containers may be used.

As noted above, the polymeric layer, for example, sheets or the coatings thereon the polymeric layer, may include chemical anti-microbial materials or compounds that are capable of being substantially permanently bonded, at least for a period such as the useful life of the loading bearing structure or maintain their anti-microbial effects when coated with the aid of processing aids or coating agents, onto the exposed surfaces of the polymeric layer, for example, sheet or coating 67. In one example, the chemicals may be deposited on the surface of the polymeric layer, for example, sheet or coating 67 or incorporated into the material of the polymeric layer, for example, sheet or coating 67. Antimicrobial activity may be built into the surface 16 itself by, for example, covalently bonding antimicrobial agents to the surface of the polymeric layer, for example, sheet or coating 67, or if incorporated into the bulk of the material for making the polymeric layer, for example, sheet or sprayed coating, may migrate to the surface. These covalently bonded materials may act to minimize microbial growth on the surface, either disposable or reusable. In addition, any microbial organisms that may chance to be attached to the material may be killed by interaction with the coating. For example, quaternary ammonium cations, such as N-alkyl-pyridiniums, may be used as antimicrobial moieties in covalently attached polymeric surface coatings. In one case, poly(4-vinyl-N-hexylpyridinium) (N-alkylated-PVP) was previously noted to have an optimum alkyl side chain length for antimicrobial activity. Polyethylenimine (PEI) was also previously used as a bacteriocidal coating when both N-alkylated on its primary amino group and subsequently N-methylated on its secondary and tertiary amino groups to raise the overall number of cationic quaternary amino groups. Any such covalently bonded quaternary ammonium cation polymeric coatings may be used to give an antimicrobial property to the surface or surfaces of the loading bearing structures. Further examples of quaternary ammonium compounds include, but are not limited to, benzalkonium chloride, benzethonium chloride, methylbenzethonium chloride, cetalkonium chloride, cetylpyridinium chloride, cetrimonium, cetrimide, dofanium chloride, tetraethyl ammonium bromide, didecyldimethylammonium chloride and domiphen bromide.

For bulk incorporation of the antimicrobial agent or agents into the material used in making the polymeric layer, for example, sheet or sprayed coating, the agent or agents maybe dispersed directly into the material, or with the aid of an appropriate carrier, for example, a binding agent, a solvent, or a suitable polymer mixing aid. These carriers maybe chosen so that they are mixable with the material for making the polymeric layer, for example, sheets or sprayed coatings and compatible with the antimicrobial agent or agents used. Effective binding agents are those that do not interfere with the antimicrobial activities of the antimicrobial agent.

As noted above, an additional enclosure, such as bag like enclosure may be used to cover any of the load bearing structures described above. The present invention also discloses a system designed to facilitate the security checking process, including a light weight load bearing structure for loading perishable or non-perishable cargo, the load bearing structure having a top deck, a bottom deck and a width joining the top and the bottom, the bottom deck having a plurality of extensions or supports extending therefrom and the cargo is loaded onto the top deck of the load bearing structure; and a bag-like enclosure for covering the cargo and at least a portion of the width of the load bearing structure, with the bag-like enclosure having an opening with an elastic property about its circumference for stretching about the width of the load bearing structure. The load bearing structure and bag-like enclosure in this configuration are both transparent to magnetic imaging scanners used in security scanning to facilitate the security check of perishable cargo or non-perishable cargo, large or small, without the need for unloading and reloading of the cargo from the load bearing structure.

The bag like enclosure may be made from a film, a woven sheet or a non-woven sheet having sufficient strength for stretching over and covering a cargo and light weight enough not to add unnecessary weight to the cargo. It may be closed on three sides and opened at one end, with the open end having some elastic property circumferentially about the opening. The cargo may be packed and the bag-like material stretched over the entire cargo with the open end stretched under the edge of base and tagged at the origin and the complete structure may be shrink-wrapped. The surfaces of the bag-like material may also have antimicrobial properties. Any of the antimicrobial embodiments described above may be suitable. More details are found in U.S. patent application Ser. No. 13/549,477, entitled "SYSTEM FOR FACILITATING SECURITY CHECK OF SHIPMENT OF CARGO", the content of which is hereby incorporated by reference in its entirety.

While the invention has been particularly shown and described with reference to exemplary embodiments, it should be understood by those skilled in the art that changes in form and detail may be made therein without departing from the spirit and scope of the invention.

The invention claimed is:

1. A loading bearing structure comprising:
   an expanded polymer core having a top side, a bottom side and a width having a thickness therebetween joining the top side and the bottom side;
   at least one polymer sheet having a first side with outer edge portions, said first side of said polymeric sheet including the outer edge portions are combined with said bottom side, the width and at least a portion of said top side of said expanded core; and
   at least one edge protector positioned about a portion of the bottom side and a portion of the width close to the bottom side of the load bearing structure for accommodating at least one cargo-holding feature;
   wherein said outer edges of said first side of the polymeric sheet is sealed to portions of the polymeric core by at least one sealing feature.

2. A loading bearing structure having a top side, a bottom side and a width therebetween, comprising:
   an expanded polymer core with a top side, a bottom side and a width having a thickness therebetween joining the top side and the bottom side;
   a first polymer sheet having a first side and a second side, with outer edges, said first side and its outer edges are combined with said bottom side and at least part of said thickness of said width of said expanded polymer core;
   a second polymer sheet having a first side and a second side, with outer edges, said second side and its outer edges are combined with said expanded polymer core on said top side and at least part of the thickness of the width of said expanded polymer core, forming an overlap between said outer edges of said first sheet and said outer edges of said second sheet about the width;
   wherein at least a portion of said overlapped outer edges between the first and second the polymeric sheets are sealed by at least one sealing feature; and
   at least one edge protector positioned about the bottom edge and a portion of the width close to the bottom edge of the load bearing structure for accommodating at least one cargo-holding feature.

3. The load bearing structure of claim 2, wherein said outer edges of said first side of the polymeric sheet is sealed to portions of the polymeric core by at least one sealing feature.

4. The load bearing structure of claim 2 wherein said at least one sealing feature comprise a sealing liquid, a sealing chemical composition, a self-healing composition, a sealing tape, a mechanical sealing device, a heat sealing device or combinations thereof.

5. The loading bearing structure of claim 2, wherein said at least one sealing feature comprises a good solvent of said core or said polymeric sheet.

6. The load bearing structure of claim 2 wherein at least a portion of said overlapped outer edges between the first and second the polymeric sheets are sealed by at least one sealing feature.

7. The loading bearing structure of claim 6, wherein said at least one sealing liquid comprises tetrachloroethylene.

8. A load bearing structure for loading, transporting or storing cargo, comprising:
an expanded polymer core having a top side, a bottomside and a width having a thickness therebetween joining the top side and the bottom side, said bottom side having a bottom edge close to said width and said bottom side, and said top side having a top edge close to said width;
at least one polymer sheet having a first side with outer edges is combined with said expanded polymer core on said bottom side, and at least a portion of the thickness of the width of said expanded polymer core; and
at least one edge protector positioned about the bottom edge and a portion of the width close to the bottom edge of the load bearing structure for accommodating at least one cargo-holding feature.

9. The load bearing structure of claim 8 wherein said edge protectors are positioned continuously or intermittently around the loading bearing structure.

10. The load bearing structure of claim 8 further comprising another edge protector positioned about the top edge and a portion of the width close to the top edge.

11. The load bearing structure of claim 8, wherein said outer edges of said first side of the polymeric sheet is sealed to portions of the polymeric core by at least one sealing feature.

12. The load bearing structure of claim 8, wherein said edge protector is flushed with the rest of the structure.

13. The load bearings structure of claim 8, wherein the edge protector protrudes from the rest of the structure.

14. The load bearing structure of claim 8, wherein said edge protector is placed onto the core prior to covering the core with at least one polymeric sheet.

15. The load bearings structure of claim 8, wherein said edge protector is placed onto the structure after the core is covered with at least one polymeric sheet.

16. The load bearing structure of claim 8 further comprising an antimicrobial agent.

17. The loading bearing structure of claim 8, wherein said loading bearing structure is adapted for receiving cargo generated in a clean room to facilitate shipping and minimizing risk of contamination or damage.

18. The loading bearing structure of claim 8 wherein said cargo comprises electronic parts or pharmaceuticals.

19. The load bearing structure of any of claim 8, wherein said at least one polymer sheet are combined with said expanded polymer core on said bottom side, the width and at least a portion of said top side of said expanded polymer core.

20. The load bearing structure of any of claim 8 further comprising a second polymeric sheet with outer edges are combined with said expanded polymer core on said top side and at least a portion of portion of the thickness of the width of said expanded polymer core, forming an overlap between said outer edges of said first sheet and said outer edges of said second sheet about the width.

* * * * *